United States Patent [19]

Tsukamoto et al.

[11] Patent Number: 5,748,585
[45] Date of Patent: May 5, 1998

[54] DISC APPARATUS FOR SELECTIVELY OUTPUTTING DATA FROM A DISC AND A MEMORY

[75] Inventors: Manabu Tsukamoto; Nobuaki Hirai; Kazuhito Endo; Yoshinobu Ishida; Masayuki Ishida, all of Nagaokakyo, Japan

[73] Assignee: Mitsubishi Denki Kabushiki Kaisha, Tokyo, Japan

[21] Appl. No.: 261,949

[22] Filed: Jun. 17, 1994

Related U.S. Application Data

[63] Continuation of Ser. No. 168,384, Dec. 17, 1993, abandoned.

[30] Foreign Application Priority Data

| Dec. 25, 1992 | [JP] | Japan | 4-359213 |
| Feb. 10, 1993 | [JP] | Japan | 5-022556 |
| Feb. 16, 1993 | [JP] | Japan | 5-026469 |
| Apr. 12, 1993 | [JP] | Japan | 5-084534 |
| Apr. 12, 1993 | [JP] | Japan | 5-084535 |
| Sep. 24, 1993 | [JP] | Japan | 5-238353 |

[51] Int. Cl.$^6$ ............................................. G11B 7/00
[52] U.S. Cl. ........................ 369/47; 369/48; 369/32; 369/60
[58] Field of Search .................. 369/47, 48, 49, 369/32, 41, 60, 84, 33, 34

[56] References Cited

U.S. PATENT DOCUMENTS 4,977,550 12/1990 Furuya et al. .
5,235,575 8/1993 Han ............................................. 369/32
5,363,362 11/1994 Maeda et al. ............................. 369/60

FOREIGN PATENT DOCUMENTS

| 0138246 | 4/1985 | European Pat. Off. . |
| 3825938 | 2/1989 | Germany . |
| 3934631 | 6/1990 | Germany . |
| 334156 | 2/1991 | Japan . |
| 3273586 | 12/1991 | Japan . |
| 421947 | 4/1992 | Japan . |

Primary Examiner—Thang V. Tran

[57] ABSTRACT

A disc apparatus includes a readout unit, an audio signal output unit, a memory, a switch, and a controller. The readout unit reads out data from a disc wherein the data includes at least digital audio data. The audio signal output unit produces an audio signal output in accordance with the digital audio data. The memory stores the digital audio data read from the disc by the readout unit. The switch switches the digital audio data supplied to the audio signal output unit between the digital audio data stored in the memory and the digital audio data currently being read by the readout unit. Furthermore, the controller controls the readout unit and the memory so that, prior to a playback start operation, the digital audio data of a first predetermined period from a beginning of at least one program is read out by the readout unit and stored in the memory; controls the switch so that, at a beginning of the playback start operation, the audio signal output unit produces the audio signal output based on the digital audio data stored in the memory; and controls the switch so that, a second predetermined period after the start operation, the audio signal output unit produces the audio signal output based on the digital audio data currently being read out by the readout unit.

14 Claims, 57 Drawing Sheets

FIG. 6 (a)  FIG. 6 (b)
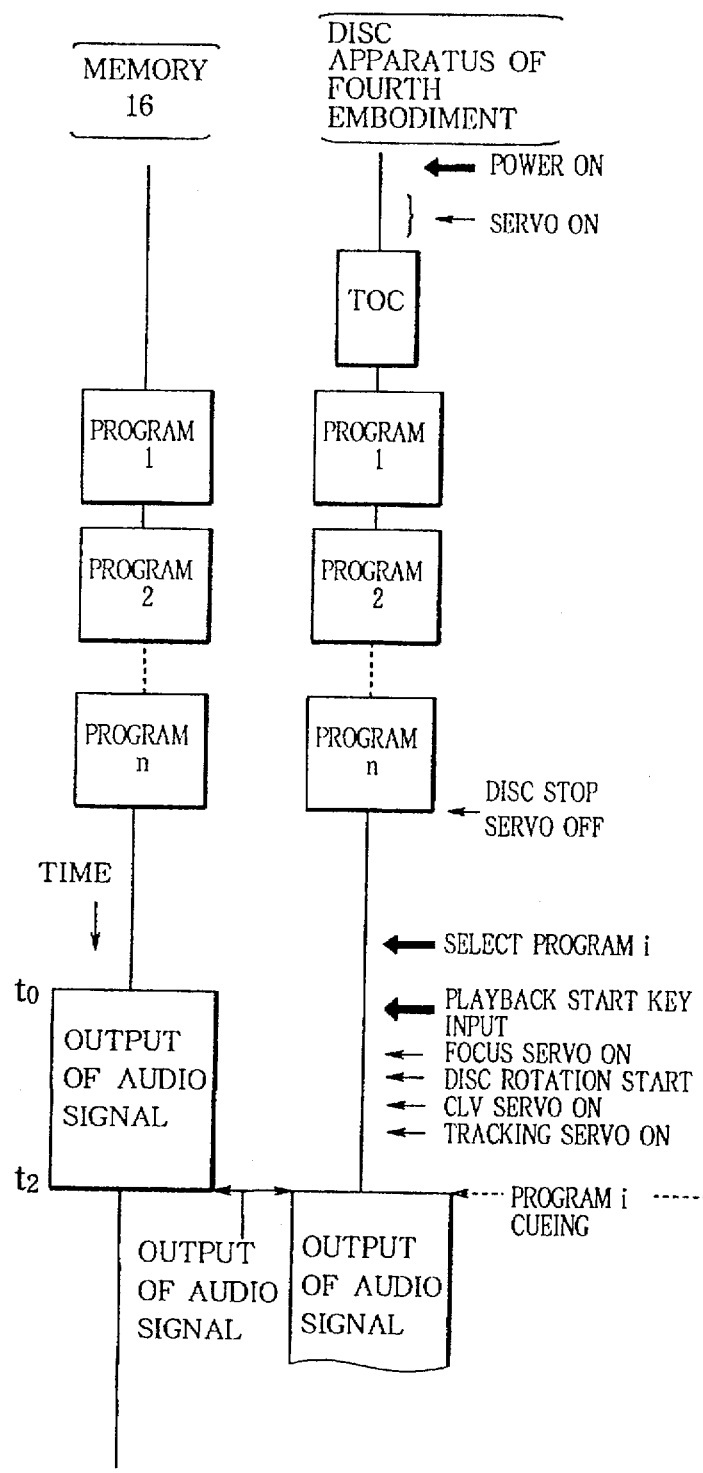
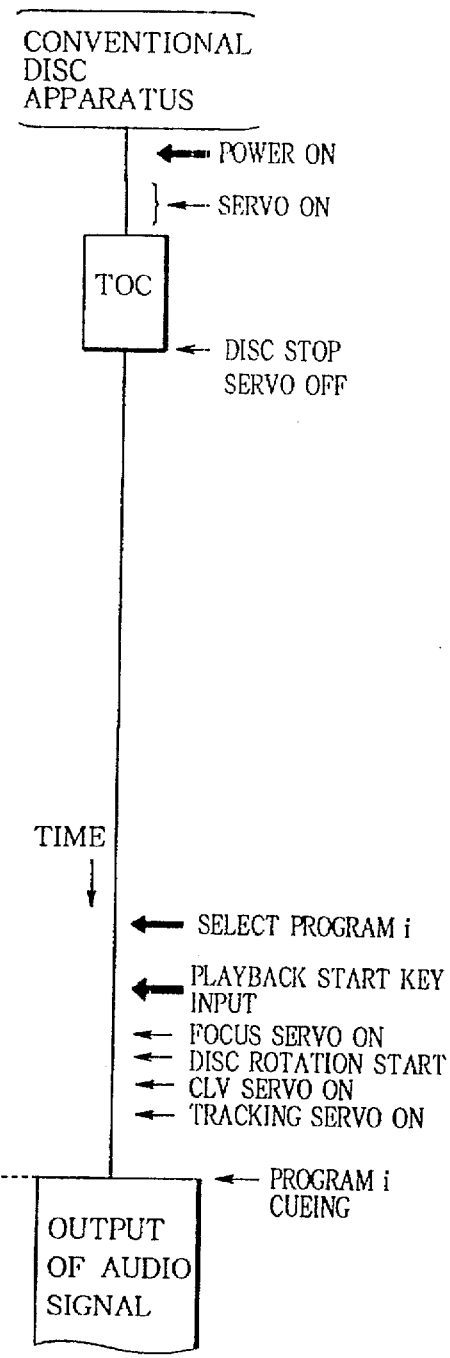

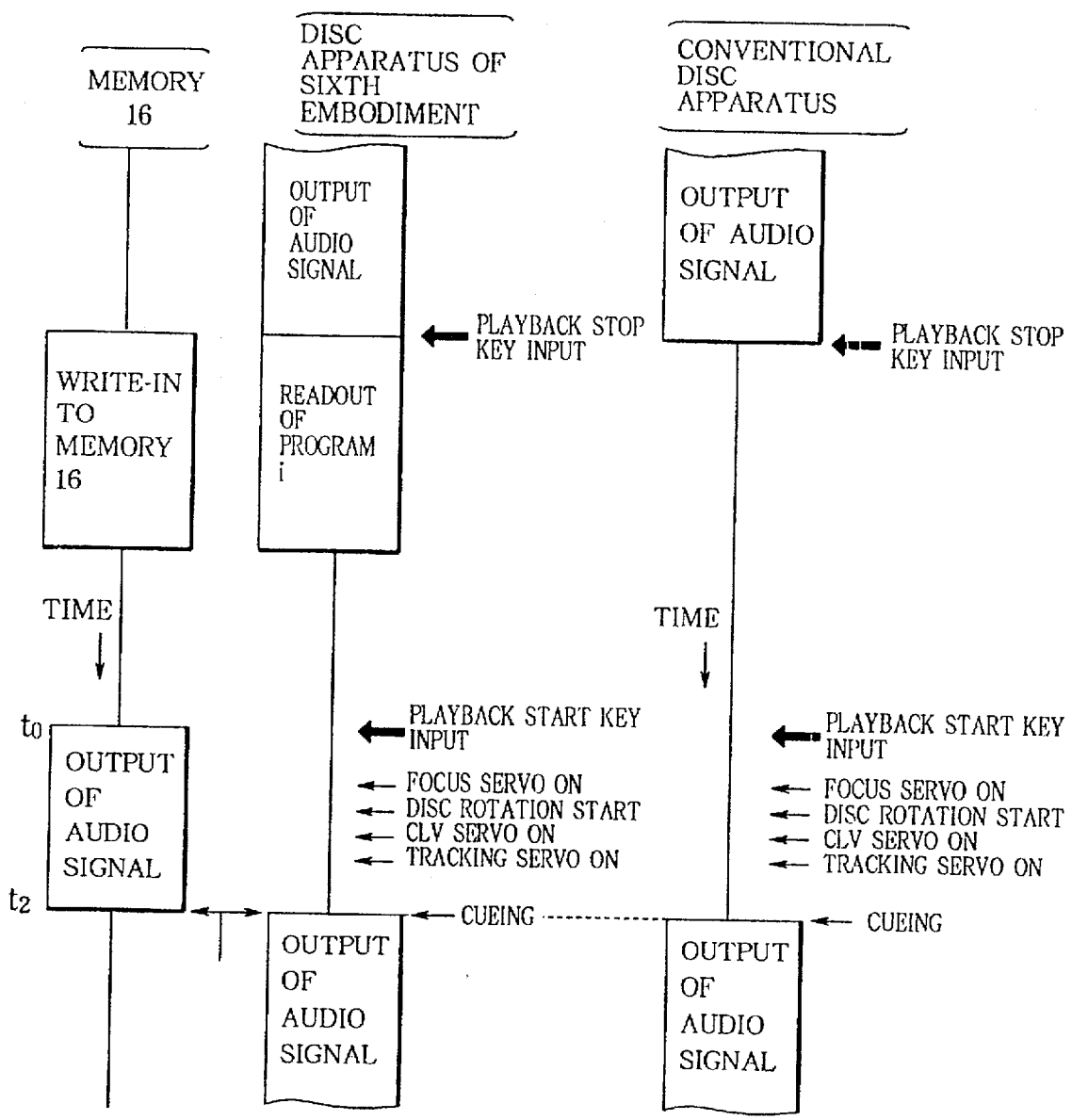

| AREAS ON DISC | TRACK JUMP AMOUNT |
|---|---|
| NO.1 | 4 TRACKS |
| NO.2 | 3 TRACKS |
| NO.3 | 2 TRACKS |
| NO.4 | 1 TRACK |

| AREAS ON DISC | TRACK JUMP AMOUNT |
|---|---|
| NO.1 | 100 TRACKS |
| NO.2 | 75 TRACKS |
| NO.3 | 50 TRACKS |
| NO.4 | 25 TRACKS |

A  JUMP 100 TRACKS (REV)
B  JUMP 10 TRACKS (REV)
C  JUMP 1 TRACK (REV)
D  NORMAL PLAYBACK

A  JUMP 100 TRACKS (REV)
B  JUMP 10 TRACKS (REV)
C  JUMP 1 TRACK (REV)
D  NORMAL PLAYBACK

A  JUMP 100 TRACKS (REV)
B  JUMP 10 TRACKS (REV)
C  JUMP 1 TRACK (REV)
D  NORMAL PLAYBACK

DISC APPARATUS FOR SELECTIVELY OUTPUTTING DATA FROM A DISC AND A MEMORY

This application is a continuation of application Ser. No. 08/168,384, filed on Dec. 17, 1993 now abandoned.

BACKGROUND OF THE INVENTION

The present invention relates to a disc apparatus for reading out audio data such as digital audio data from a disc such as a compact disc (referred to below as CD) and an opto-magnetic disc, e.g., a mini-disc (referred to below as MD) and producing an audio signal output. The disc apparatus in accordance with the present invention may comprise a disc playback apparatus, a disc recording apparatus, and a combined disc recording/playback apparatus. In particular, the present invention relates to a disc apparatus capable of producing an audio signal output instantly a playback start command is present.

The present invention also relates to a disc apparatus which is able to speed up an operation of tracking correction following a track jump when audio data are intermittently transferred from the disc to a memory or following a track jump due to a tracking error.

The present invention also relates to a disc apparatus for recording data onto a disc or reading out data from a disc, in particular, a disc apparatus which is capable of moving a optical pickup to a beginning address of a selected target program speedily.

The present invention also relates to a disc apparatus for intermittently reading out data from a disc, temporarily storing the data in a buffer memory, and producing an audio signal output in accordance with the data stored in the buffer memory, in particular, a disc apparatus for providing a function of avoiding an uncomfortable impression during the transition of programs.

The present invention also relates to a disc apparatus capable of continuously recording an audio data onto a plurality of discs.

The present invention also relates to a disc apparatus possessing a repeat playback function sought in such applications as language study.

FIG. 47 is a block diagram showing compositions of a conventional disc apparatus (CD playback apparatus). As indicated in FIG. 47, the disc apparatus comprises an optical pickup 2 for optically reading out data recorded on a disc 1, an RF amplifier 3, a demodulator circuit 4, a signal processor circuit 5, a D/A (digital to analog) converter circuit 7, an analog audio output terminal 8, an interface circuit 9, and a digital audio output terminal 10. The disc apparatus also includes a microprocessor 11 for controlling an operation of the overall disc apparatus, a servo circuit 12, a turntable 22, a disc motor 13 for rotating the turntable 22, a key input section 14, and a display section 15.

The conventional disc apparatus constructed as mentioned above operates in the following manner on the basis of commands from the microprocessor 11. Laser light is emitted from the optical pickup 2 to the disc 1, and by detecting the reflected light, the optical pickup 2 reads out the data recorded on the disc 1. The optical pickup 2 converts the data into an electrical signal, which is amplified by the RF amplifier 3 and EFM (eight to fourteen modulation) or otherwise demodulated by the demodulator circuit 4 to return the original signal series. At the signal processor circuit 5, errors in the signal series are corrected utilizing an error correction code included in the signal series, and the signal series is rearranged by interleave processing, thereby restoring the original digital audio signal. The output from the signal processor circuit 5 is sent in one route via the D/A converter circuit 7 as the analog audio signal to the analog audio output terminal 8 and in another route via the interface circuit 9 to the digital audio signal output terminal 10 as the digital audio in accordance with the digital audio interface standard.

FIG. 48 is a block diagram showing compositions of a conventional disc apparatus (MD playback apparatus) utilizing audio high efficiency encoding technology. As indicated in FIG. 48, the disc apparatus comprises an optical pickup 2 for optically reading out data recorded on a disc 1, an RF amplifier 3, a demodulator circuit 4, a signal processor circuit 5 and a buffer memory 6. The disc apparatus also includes an expander circuit 21, a D/A converter circuit 7, an analog audio output terminal 8, an interface circuit 9 and a digital audio output terminal 10. Additionally, the disc apparatus is provided with a microprocessor 11 for controlling an operation of the overall disc apparatus, a servo circuit 12, a disc motor 13, a turntable 22, a key input section 14 and a display section 15.

The disc apparatus having the above-mentioned construction operates in the following manner in accordance with commands from the microprocessor 11. Laser light is emitted from the optical pickup 2 to the disc 1, and by detecting the reflected light, the optical pickup 2 reads out the data recorded on the disc 1. The optical pickup 2 converts the data into an electrical signal, which is amplified by the RF amplifier 3 and EFM or otherwise demodulated by the demodulator circuit 4 to return the original signal series. At the signal processor circuit 5, errors in the signal series are corrected utilizing an error correction code included in the signal series, and the signal series is rearranged by interleave processing, thereby restoring the original digital audio signal.

The output from the signal processor circuit 5 is temporarily stored in the buffer memory 6, then sent to the expander circuit 21. The expander circuit 21 expands the audio signal encoded efficiently and restores the original audio signal. The restored audio signal is sent in one route via the D/A converter circuit 7 as the analog audio signal to the analog audio output terminal 8 and in another route via the interface circuit 9 to the digital audio output terminal 10 as the digital audio signal in accordance with the digital audio interface standard.

By the way, CD and MD have a table of contents (TOC) data such as program numbers and a play time per program which are recorded in a predetermined area (TOC area) at the inner circumference of the disc. When the disc is set in the disc apparatus or the power supply of the disc apparatus is activated, the TOC data recorded in the TOC area are automatically read out from the disc and stored.

FIG. 49 is a block diagram showing compositions of a conventional disc apparatus (CD playback apparatus) indicated in, for example, Japanese Patent Kokai Publication No. 34156/1991.

As indicated in FIG. 49, the disc apparatus comprises a disc motor 102 for rotating the disc 101, an optical pickup 103 for optically reading out data recorded on the disc 101, an RF amplifier 104, a demodulator circuit 105, a signal processor circuit 106 and a buffer memory 107. The disc apparatus also comprises a signal processor circuit 108, a D/A converter circuit 109, an analog audio output terminal 110, an interface circuit 111 and a digital audio output terminal 112. Further included in the disc apparatus are a servo circuit 113, a track jump control circuit 114, an address readout circuit 115, a track jump detector circuit 116 and an overflow/underflow detector circuit 117.

The conventional disc apparatus having the above construction operates in the following manner. Laser light is emitted from the optical pickup 103 to the disc 101 and by detecting the reflected light, the optical pickup 103 reads out the data recorded on the disc 101. The optical pickup 103 converts the data into an electrical signal, which is amplified by the RF amplifier 104 and EFM or otherwise demodulated by the demodulator circuit 105 to return the original signal series. At the signal processor circuit 106, errors in the signal series are corrected utilizing an error correction code included in the signal series, and the signal series is rearranged by interleave processing, thereby restoring the original digital audio signal.

The output from the signal processor circuit 106 is temporarily stored in the buffer memory 107, then sent through the signal processor circuit 108 in one route via the D/A converter circuit 109 to the analog audio output terminal 110 and in another route via the interface circuit 111 to the digital audio output terminal 112.

The servo circuit 113 controls a position of the optical pickup 103 in accordance with the data read out by the optical pickup 103 so as to scan a center of a track on the disc 101. The servo circuit 113 also controls a rotation of the disc motor 102 so that a data transfer rate for readout from the disc 101 is constant.

FIG. 50 is a descriptive drawing indicating a process in which a data transfer rate for readout from the buffer memory 107 is slower than a data transfer rate for write-in to the buffer memory 107, thereby audio data written intermittently into the buffer memory 107 are read out continuously from the buffer memory 107.

As indicated in FIG. 50, the audio data read out from the disc 101 are written into the buffer memory 107 between the time points $t_1$ and $t_2$, and are read out from the buffer memory 107 between the time points $t_{112}$ and $t_{113}$. The audio data are then sent as an audio signal to the output terminals 110 and 112. Similarly, the audio data written into the buffer memory 107 between time points $t_3$ and $t_4$ and between time points $t_5$ and $t_6$ are respectively read out between time points $t_{113}$ and $t_{114}$ and between time points $t_{114}$ and $t_{115}$, and appear as an audio signal at the output terminals 110 and 112. In this manner, the audio data are intermittently read out from the disc 101 and written into the buffer memory 107, and then read out continuously from the buffer memory 107 to produce the audio signal output.

FIG. 51 is a graph indicating a change in data amount stored in the buffer memory 107 of the conventional disc apparatus indicated in FIG. 49. The data amount stored in the buffer memory 107 is indicated on the vertical axis and elapsed time on the horizontal axis.

As indicated in FIGS. 49 to 51, the data amount of the buffer memory 107 is detected by the overflow/underflow detector circuit 117, when the data amount exceeds a predetermined upper limit H (i.e., when the data overflow), the data write-in to the buffer memory is stopped (time points $t_2$, $t_4$, $t_6$, $t_8$, $t_{10}$, etc. in FIG. 51). Conversely, while the data write-in to the buffer memory 107 is stopped, when the data amount falls below a predetermined lower limit L (i.e., when the data underflow), the data write-in to the buffer memory 107 is restarted (time points $t_1$, $t_3$, $t_5$, $t_7$, $t_9$, etc. in FIG. 51).

When the data write-in to the buffer memory 107 is stopped, the address readout circuit 115 reads out and temporarily stores the address at which the data write-in was stopped. When the data write-in to the buffer memory 107 is restarted, the track jump circuit 114 controls the servo circuit 113 so that the optical pickup 103 jumps backward (toward the inside) to the rear of the address stored in the address readout circuit 115 and then moved to the address stored in the address readout circuit 115. The data write-in to the buffer memory 107 is then restarted from the next address to the one where the data write-in was stopped.

In the event external physical shock is applied to the disc apparatus during playback and the position of the beam spot from the optical pickup 103 deviates from the track (e.g., time point $t_{12}$ in FIG. 51), the track jump detector circuit 116 detects that a track jump has occurred on the basis of a change of the address data read out by the optical pickup 103. In this event the data write-in to the buffer memory 107 is stopped and the address readout circuit 115 stores the final address in which data was read out from the disc 101. The track jump control circuit 114 controls the servo circuit 113 so that the optical pickup 103 can read out from the next address to the final address stored in the address control circuit 115, and then the data write-in to the buffer memory 107 restarts from time point $t_{13}$.

Since the audio data stored in the buffer memory 107 are read out continuously between time points $t_{12}$ and $t_{13}$, the audio signals appearing at the output terminals 110 and 112 are not interrupted. Similarly, if the track jump due to the external shock is large and considerable time is needed until the restart of readout (e.g., between time points $t_{16}$ and $t_{17}$ in FIG. 51), by storing a sufficient amount of data in the buffer memory 107, the audio signal output can be obtained continuously without interruption.

FIG. 54 is a block diagram indicating compositions of a conventional disc apparatus (MD playback apparatus).

The track on the MD has a spiral form from the inner to outer circumference and the addresses likewise increase from the inner to outer direction. Consequently, the forward (FWD) direction is from the inner to outer circumference, while the reverse (REV) direction is the opposite. The address units of MD comprises clusters and sectors, wherein one cluster consists of 36 sectors. The table of contents (TOC) data, which include the start and end addresses of the recorded programs, are recorded at the inner circumference (TOC area) of the audio data recording area. The TOC data are read out and stored prior to playback.

As indicated in FIG. 54, a conventional disc apparatus comprises an optical head 202 which focuses a laser beam spot on a disc 201 and produces a audio signal 203 by detecting the reflected light, an RF amplifier 204 for amplifying the audio signal 203, a demodulator circuit 205 for demodulating and correcting errors in the audio signal 203, and a signal processor circuit 206 for expanding and converting the data into analog form to produce an analog audio signal 207. The disc apparatus also includes a position determining section 209 for determining the position of the optical head 202. The position determining section 209 comprises a thread advance motor 221 and a servo circuit 210. The disc apparatus further includes a TOC data holding circuit 216 which stores the TOC data 215 recorded on the disc 201 and produces a target address output 217 that includes the target starting address of a target program selected by a user.

The disc apparatus is additionally provided with a cueing section 212 for shifting the beam spot position to the target start address of the target program in accordance with the target start address from the TOC data holding circuit 216 and the present address from the demodulator circuit 205. The cueing section 212 comprises a target discriminator circuit 213, an address difference computing circuit 214 and a track jump amount selector circuit 218. The target discriminator circuit 213 detects whether or not the present address of the beam spot is within the target program on the basis of the present address from the demodulator circuit 205 and the target address (including the target start address of the target program and the target end address of the target program) from the TOC data holding circuit 216. The address difference computing circuit 214 computes the address difference between the present address and the target start address. The track jump amount selector circuit 218 selects the track jump amount on the basis of the discrimination result from the target discriminator circuit 213 and the address difference from the address difference computing circuit 214, and then outputs the selected track jump amount 219 to the servo circuit 210.

The disc apparatus further comprises a control circuit 220 for controlling the servo circuit 210 and the TOC data holding circuit 216.

FIG. 55 is a flowchart indicating the cueing process of a conventional disc apparatus indicated in FIG. 54.

As indicated in FIG. 55, the target discriminator circuit 213 first judges whether or not the present address of the beam spot is within the target program, and the address difference computing circuit 214 computes the difference between the present and target addresses (step 301). If the present address of the beam spot is not within the target program (step 302), the beam spot jumps 100 tracks toward the target start address (step 303), then return to step 301.

If the present address of the beam spot is within the target program (step 302), the track jump amount selector circuit 218 judges whether or not the address difference computed by the address difference computing circuit 214 is 50 clusters or less (step 304). If the address difference is greater than 50 clusters, the beam spot jumps 100 tracks toward the inner circumference (REV) of the disc 201 (step 305), then return to step 301. If the address difference is 50 clusters or less (step 304), the track jump amount selector circuit 218 judges whether or not the address difference is 5 clusters or less (step 306). If the address difference is greater than 5 clusters, the beam spot jumps 10 tracks in the REV direction (step 307), then return to step 301.

If the address difference is 5 clusters or less (step 306), the beam spot jumps 1 track in the REV direction (step 308). Then, the address difference computing circuit 214 computes the difference between the present and target addresses, and the track jump amount selector circuit 218 confirms the present address of the beam spot (step 309) and judges whether or not the present address is within 10 sectors prior to the target start address (indicated as target in the figure)(step 310). If deviated by more than 10 sectors, steps 308–310 are repeated. If within 10 sectors prior to the target start address, the cueing operation is completed.

FIGS. 56–58 are graphs indicating variations of present address of the beam spot during the cueing process of the conventional disc apparatus indicated in FIG. 54, wherein FIG. 56 indicates the case when the present address is initially at the inside of the target start address, FIG. 57 indicates the case when the present address is initially at the outside of the target start address, and FIG. 58 indicates the case when tracking errors occur due to an unforeseen disturbance.

Area A of FIG. 56 indicates the state when the present address of the beam spot is not within the target program, the beam spot jumps 100 in the FWD direction(corresponding to steps 301, 302 and 303 in FIG. 55). Area B of FIG. 56 indicates the state when the present address of the beam spot is within 50 clusters from the target start address but not within 5 clusters from the target start address, the beam spot jumps 10 tracks in the REV direction toward the target start address (corresponding to steps 301, 302, 304, 306 and 307 in FIG. 55). Area C of FIG. 56 indicates the state when the present address of the beam spot is within 5 clusters from the target start address, the beam spot jumps 1 track in the REV direction toward the target start address (corresponding to steps 301, 302, 304, 306, and 308–310 in FIG. 55). Area D of FIG. 56 indicates the state when the present address of the beam spot is within 10 sectors from the target start address, the beam spot scans the track for normal playback operation.

Area A of FIG. 57 indicates the state when the present address of the beam spot is within the target program, but not within 50 clusters from the target start address, the beam spot jumps 100 tracks in the REV direction toward the target start address (corresponding to steps 301, 302, 304 and 305 in FIG. 55). Area B of FIG. 57 indicates the state when the present address of the beam spot is within 50 clusters, but not within 5 clusters from the target start address, the beam spot jumps 10 tracks in the REV direction toward the target start address (corresponding to steps 301, 302, 304, 306 and 307 in FIG. 55). Area C of FIG. 57 indicates the state when the present address of the beam spot is within 5 clusters of the target start address, the beam spot jumps 1 track in the REV direction toward the target start address (corresponding to steps 301, 302, 304, 306 and 308–310 in FIG. 55). Area D of FIG. 57 indicates the state when the present address of the beam spot is within 10 sectors from the target start address, the beam spot scans the track for normal playback operation.

Area A of FIG. 58 indicates the state when the present address of the beam spot is at the inside of the target start address and not within the target program. In this case, the beam spot jumps 100 tracks in the FWD direction toward the target start address (corresponding to steps 301, 302 and 303 in FIG. 55). Area B of FIG. 58 indicates the state when the present address of the beam spot is within 50 clusters, but not within 5 clusters from the target start address, and the beam spot jumps 10 tracks in the REV direction toward the target start address (corresponding to steps 301, 302, 304, 306 and 307 in FIG. 55). Area C of FIG. 58 indicates the state when the beam spot jumps to the inside of the target start address due to tracking error, thereby the beam spot is not within the target program. Area D of FIG. 58 indicates the state when the present address of the beam spot is not within the target program, and then the beam spot jumps 100 tracks in the FWD direction toward the target start address (corresponding to steps 301, 302 and 303 in FIG. 55).

Area E of FIG. 58 indicates the state when the present address deviates more than 50 clusters from the target start address due to tracking error. Area F of FIG. 58 indicates the state when the present address of the beams spot is not within 50 clusters, and then the beam spot jumps 100 tracks in the REV direction toward the target start address (corresponding to steps 301, 302, 304 and 305 in FIG. 55).

Area G of FIG. 58 indicates the state when the beam spot jumped to the inside of the target start address and is not within the target program. Area H of FIG. 58 indicates the state when the present address of the beam spot is not within the target program, and then the beam spot jumps 100 tracks in the FWD direction toward the target start address (corresponding to steps 301, 302 and 303 in FIG. 55). Area I of FIG. 58 indicates the state when the present address of the beam spot is within 50 clusters, but not within 5 clusters from the target start address, and then the beam spot jumps 10 tracks in the REV direction toward the target start address (corresponding to steps 301, 302, 304, 306 and 307 in FIG. 55). Area J of FIG. 58 indicates the state when the present address of the beam spot is within 5 clusters from the target start address and then the beam spot jumps 1 track the REV direction toward the target start address (corresponding to steps 301, 302, 304, 306, and 308-310 in FIG. 55). Area K of FIG. 58 indicates the state when the present address of the beam spot is within 10 sectors from the target start address, the beam spot scans the track for normal playback operation.

FIG. 60 is a block diagram indicating compositions of a conventional disc apparatus (CD playback apparatus). As indicated in FIG. 60, the conventional CD playback apparatus comprises an optical pickup 430 for optically reading out the data from a CD 429, a CD driver section 431 including a disc motor and a servo circuit, a digital signal processor circuit 432, an analog audio signal output circuit 433 including a digital filter and a D/A converter circuit, an audio signal output terminal 434, a microprocessor 435 for controlling an operation of the overall disc apparatus and a key input section 436.

The CD 429 is rotated by the CD driver section 431 and the optical pickup 430 continuously reads out the data recorded on the CD 429 and converts the data into an electrical signal. The signal is supplied to the digital signal processor circuit 432 where such processing as EFM and error control are performed, and then sent via the analog audio signal output circuit 433 to the audio signal output terminal 434.

A problem encountered with the conventional disc apparatus indicated in FIGS. 47 and 48 is that after a playback start key input, several seconds is needed until an audio output is obtained. This is because many operations must be executed at a period of time between the playback start key input and the start of an audio output. That is, focus servo, disc rotation, constant linear velocity (CLV) servo, tracking servo, and operations for detecting the present position of the optical pickup 2 from the address data recorded on the disc 1 and reading out the audio data from the disc 1 must be executed.

A problem encountered with the conventional disc apparatus indicated in FIG. 49 is that, since data is recorded on the track of the disc 101 at CLV and the track length per turn differs between the inner and outer areas, even if the track jump quantity is fixed, the cluster quantity differs between the inner and outer areas. Therefore, a long time is needed for the optical pickup to reach the target cluster.

For example, FIGS. 52(a)–52(b) are descriptive drawings indicating the problem of the conventional disc apparatus indicated in FIG. 49 which occurs if a low track jump amount (m tracks) is selected.

As indicated in FIGS. 52(a–52(b)), when data of cluster $a_n$ is written into the buffer memory 107 and the buffer memory 107 overflows, the data write-in is stopped. In accordance with a command from the track jump control circuit 114, the optical pickup 103 jumps a predetermined number of tracks (m tracks) backward. As continuous data readout proceeds and the buffer memory 107 reaches underflow, readout from the disc 101 restarts from cluster $a_{n+1}$. As indicated by FIG. 52(b), at the outer area, it becomes possible to read out from cluster $a_{n-1}$ data and the data write-in to the buffer memory 107 can be restarted from the next cluster to the cluster $a_{n+1}$. However, as indicated by FIG. 52(a), at inner area, since the backward cluster quantity is too few and the cluster $a_{n+1}$ can not be read out due to unstable servo.

Conversely, FIGS. 53(a)–53(b) are descriptive drawings indicating the problem occurring with a high track jump amount (m tracks) setting for the conventional disc apparatus indicated in FIG. 49. As indicated in FIGS. 53(a)–53(b), when data of the cluster $a_n$ is written into the buffer memory 107 and the buffer memory 107 overflows, the data write-in to the buffer memory 107 is stopped. In accordance with a command from the track jump control circuit 114, the optical pickup 103 jumps a predetermined number of tracks (m tracks) backward. As continuous data readout proceeds and the buffer memory 107 reaches underflow, readout from the disc 101 restarts from cluster $a_{n+1}$. As indicated in FIG. 53(a), at inner area, the data readout is possible from cluster $a_{n-1}$ and the data write-in to the buffer memory 107 can restart from the next cluster $a_{n+1}$. However, as indicated in FIG. 53(b), at outer area, the backward clusters are excessive and jump proceeds to, for example, cluster $a_{n-20}$. Thus, considerable time is needed to reach the desired cluster $a_{n+1}$ for readout to restart.

Another problem with the disc apparatus indicated in FIG. 49 is that since the audio data are temporarily stored in the buffer memory 107 before producing the audio signal output, after the playback start command, considerable time is needed until the audio output starts.

A problem with the conventional disc apparatus indicated in FIG. 54 is that, as indicated in FIG. 58, if for some reason tracking error occurs, a so-called hunting occurs whereby the beam spot repeatedly deviates back and forth while seeking the target, resulting in dead time until the target is focused.

A problem with the conventional disc apparatus indicated in FIG. 48 is that, in such cases as continuous programmed playback, after detecting completion of the initial program playback, since the optical pickup 2 shifts to the start of the next playback program, audio data cannot be read out from the disc 1 during this shift. Consequently, the playback audio signals at the output terminals 8 and 10 are interrupted.

FIG. 59 is a descriptive drawing indicating intermittent data write-in to and data readout from the buffer memory 6 when this problem occurs. As indicated in FIG. 59, since the optical pickup 2 is shifted after time point $t_2$, the data write-in to the buffer memory 6 does not occur during the long time period from time point $t_2$ to $t_3$, while program playback is completed at time point $t_{113}$. The playback audio signal output restarts from time point $t_{114}$, which is the readout start time of the next program audio data from the buffer memory 6. Consequently, data is not read out from the buffer memory 6 between time points $t_{113}$ and $t_{114}$, and the audio signal output is interrupted.

A problem also occurs when using an automatic disc changing mechanism for continuous playback of a plurality of discs. Since the disc is changed in the period between completion of data readout from the initial disc to the start of data readout from the next disc, the audio output interruption time is long.

The use of two playback mechanisms for reading out the audio data from the disc has been proposed as one method for resolving this problem. In such a system, when one playback mechanism completes readout, the other playback mechanism starts readout. However, disadvantages of providing of two playback mechanisms are increased size of the disc apparatus and increased the product cost.

Another proposed method is disclosed in Japanese Patent Kokai Publication 273586/1991. When changing the program being played, the audio data from the disc are read out and temporarily stored in a buffer memory at high speed. At completion of this high speed readout, the optical pickup is shifted or the disc exchanged, thus avoiding interruption of the program being played. However, since the data are read out from the disc at two speeds, a complex circuit is required, while there is also a disadvantage in terms of product cost.

In the case of the conventional disc apparatus indicated in FIG. 60, when used for such applications as language study whereby particular data recorded on the CD are played back repeatedly (e.g., when practicing conversation), for each repeated playback, the optical pickup shifts to read out the CD data. However, the power consumption is large for each repeated playback and in the case of a battery powered portable apparatus, the usable time is shortened.

Also, the conventional disc apparatus indicated in FIG. 60 is not provided with a recording function. This prevents such applications as language laboratory whereby the users voice is recorded after listening to a lesson, then played back sequentially and compared with the lesson.

Also, the conventional disc apparatus indicated in FIG. 60 is not provided with a processing circuit for easily intelligibility of the playback sound, thus lending an inconvenient impression to the user.

SUMMARY OF THE INVENTION

It is an object of the present invention to provide a disc apparatus capable of starting the audio output instantly the playback start command is present.

It is another object of the present invention to provide a disc apparatus capable of selecting the track jump amount according to the disc playback position and speeding tracking focus when a data overflow in the buffer memory occurs.

It is still another object of the present invention to provide a disc apparatus capable of selecting the track jump amount according to the disc playback position and speeding tracking focus when tracking error occurs.

It is a further object of the present invention to provide a disc apparatus capable of shortening the time during audio output start from the start of readout until audio signal output.

It is a still further object of the present invention to provide a disc apparatus capable of performing high speed cuing.

It is a still further object of the present invention to provide a disc apparatus capable of such functions as continuous program playback whereby the program is not interrupted when the program being played is changed, without lending an unnatural or inconvenient impression to the listener.

It is a still further object of the present invention to provide a disc apparatus capable of continuous audio recording when data are continuously recorded on two or more discs.

It is a still further object of the present invention to provide a disc apparatus capable of repeated playback with low power consumption in such applications as language study.

It is a still further object of the present invention to provide a disc apparatus capable of processing for easy intelligibility of language laboratory playback or playback audio.

According to one aspect of the present invention, we provide a disc apparatus comprising a readout means for reading out data from a disc storing audio data including a digital audio data and table of contents data such as a program playing time; an audio signal output means for producing an audio signal output in accordance with the data read out by the readout section; a memory means for storing the data read out by the readout means; a switching means for switching the data inputted to the audio signal output means between the data stored in the memory means and the data currently being read out from the disc; and a control means for controlling so that at a predetermined step prior to playback start, the audio data of a predetermined period from the beginning of a program 1 recorded as a first program of the disc are read out from the disc and stored in the memory means; instantly after playback start operation, the audio signal output based on the audio data of the program 1 stored in the memory means is produced from the audio signal output means and preparatory operation of a servo system as rotating a turntable and positioning the readout means is begun; and after completion of the preparatory operation, by switching of the switching means, the audio signal output from the audio signal output means is changed continuously from the basis of the audio data of the program 1 stored in the memory means to the basis of the audio data of the program 1 currently being read out from the disc without interruption of the audio signal output.

According to another aspect of the present invention, we provide a disc apparatus comprising: a readout means for reading out data from a disc storing audio data including a digital audio signal and table of contents data such as a program playing time; an audio signal output means for producing an audio signal output in accordance with the data read out by the readout means; a memory means for storing the data read out by the readout means; a switching means for switching the data inputted to the audio signal output means between the data stored in the memory means and the data currently being read out from the disc; and a control means for controlling so that at a predetermined step prior to playback start, the audio data of predetermined periods from the beginning of a plurality of programs or all programs are read out from the disc and stored in the memory means; instantly after a playback command for a program i (i is a positive integer), the audio signal output based on the audio data of the program i stored in the memory means is produced from the audio signal output means and preparatory operation of a servo system such as rotating a turntable and positioning the readout means is begun; and after completion of the preparatory operation, by switching of the switching means, the audio signal output from the audio signal output means is changed continuously from the basis of the audio data of the program i stored in the memory means to the basis of the audio data of the program i currently being read out from the disc without interruption of the audio signal output.

According to a further aspect of the present invention, we provide a disc apparatus, in which an audio signal output is produced when a playback start command is operated after a selection command of a desired playback program i (i is a positive integer) is operated, comprising: a readout means for reading out data from a disc storing audio data including a digital audio signal and table of contents data such as a program playing time; an audio signal output means for producing an audio signal output in accordance with the data read out by the readout means; a memory means for storing the data read out by the readout means; a switching means for switching the data inputted to the audio signal output means between the data stored in the memory means and the data currently being read out from the disc; and a control means for controlling so that when the selection command of the desired playback program i is operated, the audio data of a predetermined interval from the beginning of the program i are read out from the disc and stored in the memory means; instantly after the playback start command is operated, the audio signal output based on the audio data of the program i stored in the memory means is produced from the audio signal output means and preparatory operation of a servo system such as rotating a turntable and positioning the readout means is begun; and after completion of the preparatory operation, by switching of the switching means, the audio signal output from the audio signal output means is changed continuously from the basis of the audio data of the program i stored in the memory means to the basis of the audio data of the program i currently being read out from the disc without interruption of the audio signal output.

According to a still further aspect of the present invention, we provide a disc apparatus, in which if a program being played back is stopped before completion and then resumption of playback is commanded, the playback resumes from a predetermined position, comprising: a readout means for reading out data from a disc storing audio data including a digital audio signal and table of contents data such as a program playing time; an audio signal output means for producing an audio signal output in accordance with the data read out by the readout means; a memory means for storing the data read out by the readout means; a switching means for switching the data inputted to the audio signal output means between the data stored in the memory means and the data currently being read out from the disc; and a control means for controlling so that when a program being played back is stopped before completion, the audio data of a predetermined period from the predetermined position are read out from the disc and temporally stored in the memory means; instantly after the playback start command is operated, the audio signal output based on the audio data temporarily stored in the memory means is produced from the audio signal output means and preparatory operation of a servo system such as rotating a turntable and positioning the readout means is begun; and after completion of the preparatory operation, by switching of the switching means, the audio signal output from the audio signal output means is changed continuously from the basis of the audio data of the program stored in the memory means to the basis of the audio data of the program currently being read out from the disc without interruption of the audio signal output.

According to a still further aspect of the present invention, we provide a disc apparatus comprising: a readout means for reading out audio data such as digital audio data and address data as position data recorded on a disc; a memory means for storing the data read out by the readout means; a control means for controlling so that if the data amount stored in the memory means exceeds a predetermined upper limit, data write-in to the memory means is stopped and the address on the disc where the data write-in was stopped is temporarily stored; prior to resuming the data write-in to the memory means, backward track jump of readout position of the readout means on the disc by only a predetermined amount is performed; and when the data amount stored the memory means declines below a predetermined lower limit, the data write-in to the memory means is resumed from a next address to the address where the data write-in was stopped when the data amount exceeds the predetermined upper limit, thereby performing intermittent data write-in to the memory means; and an audio signal output means for continuously reading out data from the memory means at a transfer rate slower than a data transfer rate of the data write-in to the memory means, thereby producing a continuous audio signal output based on the data read out from the memory means; wherein the control means causes the track jump amount to be varied on the basis of the address where the the data write-in was stopped when the data amount exceeds the predetermined upper limit.

According to a still further aspect of the present invention, we provide a disc apparatus comprising: a readout means for reading out audio data such as digital audio data and address data as position data recorded on a disc; a memory means for storing the data read out by the readout means; a control means for controlling so that if the data amount stored in the memory means exceeds a predetermined upper limit, data write-in to the memory means is stopped and the address on the disc where the data write-in was stopped is temporarily stored; prior to resuming the data write-in to the memory means, backward track jump of readout position of the readout means on the disc by only a predetermined amount is performed; and when the data amount declines below a predetermined lower limit, the data write-in to the memory means is resumed from a next address to the address where the data write-in was stopped, thereby performing intermittent data write-in to the memory means; an audio signal output means for continuously reading out data from the memory means at a transfer rate slower than a data transfer rate of the data write-in to the memory means, thereby producing a continuous audio signal output based on the data read out from the memory means; and a threshold detector means for detecting when the data amount stored in the memory means exceeds a predetermined threshold value which is smaller than the lower limit; wherein the control means controls so that, at playback start, the data write-in to the memory means starts, and when the data amount stored in the memory means exceeds the threshold value, data readout from the memory means starts and then the audio signal output is produced from the audio signal output means.

According to a still further aspect of the present invention, we provide a disc apparatus comprising: a readout means for reading out audio data such as digital audio data and address data as position data recorded on a disc; a track jump detector means for detecting presence or absence of a track jump, which is a transfer of readout position on the disc by the readout means, due to tracking error; and a control means for controlling so that, if the track jump due to tracking error is detected by the track jump detector means, the track jump is performed by only a predetermined amount based on the position data read out by the readout means; wherein the control means sets the amount of the track jump following the track jump due to tracking error in accordance with at least one address of an address before the track jump due to tracking error or an address after the track jump due to tracking error.

According to a still further aspect of the present invention, we provide a disc apparatus comprising: an optical head for emitting a beam spot toward a disc having a plurality of data tracks; a position determining means for shifting the optical head, thereby determining a position on the disc emitted by the beam spot; a cueing means for supplying control data to the position determining means, thereby shifting the beam spot to a selected target address; and a table of contents holding means for holding target addresses such as starting addresses of programs recorded on the disc; the cueing means comprising: a target discriminator means for discriminating whether or not the beam spot position is within a predetermined area including the selected target address held in the table of contents holding means; an address difference computing means for computing the address difference between the selected target address and a present beam spot address; a first track jump amount selector means for selecting a smaller track jump amount from among predetermined track jump amounts as the address difference outputted from the address difference computing means decreases; a target pass detector means for detecting whether or not the beam spot has passed the selected target address; a track jump amount holding means for temporarily holding the track jump amount selected by the first track jump amount selector means; and a second track jump amount selector means whereby if the target discriminator means judges that the beam spot is within the predetermined area including the selected target address and the target pass detector means has detected that the beam spot passed the target address, the track jump data is sent to the position determining means from the track jump holding means; if the target discriminator means judges that the beam spot is within the predetermined area including the selected target address but the target pass detector means has not detected that the beam spot passed the target address, the track jump data is sent to the position determining means from the first track jump means; and if the target discriminator means judges that the beam spot is not within the predetermined area including the selected target address, the track jump data held in the track jump holding means is sent to the position determining means.

According to a still further aspect of the present invention, we provide a disc apparatus comprising: an optical head for emitting a beam spot toward a disc having a plurality of data tracks; a position determining means for shifting the optical head, thereby determining the position on the disc emitted by the beam spot; a cueing means for supplying control data to the position determining means, thereby shifting the beam spot to a selected target address; and a table of contents holding means for holding target addresses such as starting addresses of programs recorded on the disc; the cueing means comprising: an address difference computing means for computing the address difference between the selected target address and a present beam spot address; a first track jump amount selector means for selecting a smaller track jump amount from among predetermined track jump amounts as the address difference computing means decreases; a target pass detector means for detecting whether or not the beam spot has passed the selected target address; a track jump amount holding means for temporarily holding the track jump amount selected by the first track jump amount selector means; and a second track jump amount selector means whereby if the target pass detector means has detected that the beam spot passed the target address, the track jump data is sent to the position determining means from the first track jump amount selector means; and if the target pass detector means has not detected that the beam spot passed the target address, the track jump data held in the track jump amount holding means is sent to the position determining means.

According to a still further aspect of the present invention, we provide a disc apparatus comprising: a readout means for reading out data from a disc which is an data recording media such as an optical disc or opto-magnetic disc; a memory means for temporarily storing data read out from the disc by the readout means; an audio signal output means for reading out the data temporarily stored in the memory means and producing an audio signal output; and a control means for controlling so that data are read out from the disc by the readout means and stored in the memory means intermittently; if an output of a succeeding program j (j is a positive integer) recorded on the disc is selected to follow an output of an initial program i (i is a positive integer) recorded on the disc, immediately upon completion of readout of the program i data by the readout means, the readout means is shifted and readout of program j data by the readout means begins, thereby producing the audio signal output from the audio signal output means continuously without interruption between the program i and the succeeding program j.

According to a still further aspect of the present invention, we provide a disc apparatus comprising: a readout means for reading out data from a disc which is an data recording media such as an optical disc or opto-magnetic disc; a memory means for temporarily storing data read out from the disc by the readout means; an audio signal output means for reading out the data temporarily stored in the memory means and producing an audio signal output; and a control means for controlling so that data are readout from the disc by the readout means and stored in the memory means intermittently; if the output of a succeeding program j (j is a positive integer) recorded on the disc is selected to follow the output of an initial program i (i is a positive integer) recorded on the disc from the audio signal output means, immediately upon completion of readout of the program i data by the readout means, the readout means is shifted and readout of the program j data by the readout means begins; and then a silent portion of a predetermined period is produced between the program i and succeeding program j from the audio signal output means.

According to a still further aspect of the present invention, we provide a disc apparatus comprising: a readout means for reading out data from a disc which is a data recording media such as an optical disc or opto-magnetic disc; a memory means for temporarily storing data read out from the disc by the readout means; an audio signal output means for reading out the data temporarily stored in the memory means and producing an audio signal output; and a control means for controlling so that data are read out from the disc by the readout means and stored in the memory means intermittently; if the output of a succeeding program j (j is a positive integer) recorded on the disc is selected to follow the output of an initial program i (i is a positive integer) recorded on the disc from the audio signal output means, immediately upon completion of readout of the program i data by the readout means, the readout means is shifted and readout of the program j data by the readout means begins; and then between the program i and the succeeding program j, or overlapped at the transition between the program i and the succeeding program j, a predetermined sound output is obtained from the audio signal output means.

According to a still further aspect of the present invention, we provide a disc apparatus comprising: a readout means for reading out data from a disc which is a data recording media such as an optical disc or opto-magnetic disc; a memory means for temporarily storing data read out from the disc by the readout means; an audio signal output means for reading out the data temporarily stored in the memory means and producing an audio signal output; a level converter means for converting output level of the audio signal outputted from the audio signal output means; and a control means for controlling so that data are read out from the disc by the readout means and stored in the memory means intermittently; if the output of a succeeding program j (j is a positive integer) recorded on the disc is selected to follow the output of an initial program i (i is a positive integer) recorded on the disc from the audio signal output means, immediately upon completion of readout of the program i data by the readout means, the readout means is shifted and readout of the program j data by the readout means begins, prior to stopping the program i, the level converter means gradually reduces the output level of the program i; and at the succeeding program j output, the level converter means gradually raises the output level to the previous value.

According to a still further aspect of the present invention, we provide disc apparatus comprising: a disc loading means for loading a plurality of discs; a disc changer means for transporting a disc from the disc loading means to a turntable and from the turntable to the disc loading means; a memory means for temporarily storing data to be written into the disc; an audio data input means for supplying audio data inputted to the memory means; a data write-in means for intermittently writing data stored in the memory means into the disc; and a control means for controlling so that while data are continuously written into the memory means by the audio data input means, data are written into the disc by the data write-in means, the disc is exchanged by the disc changer means, and data are then written into the new disc by the data write-in means.

According to a still further aspect of the present invention, we provide disc apparatus comprising: a disc loading means for loading a plurality of discs; a disc changer means for exchanging a disc from the disc loading means to a turntable and from the turntable to the disc loading means; a readout means for reading out data from the disc on the turntable; a first memory means for temporarily storing data read out from the disc by the readout means; an audio signal output means for reading out the data temporarily stored in the first memory means and producing an audio signal output; and a control means for controlling so that data are read out from a first disc by the readout means and stored intermittently in the first memory means; wherein the control means controls so that in case data recorded on a first disc is outputted from the audio signal output means and in success data recorded on a second disc held in the disc loading means is outputted from the signal output means, immediately after completion of the data readout from the first disc, the first disc is exchanged to the second disc by the disc changer means, the readout means is shifted, and readout from the second disc begins, thereby producing the audio signal output from the audio signal output means continuously without interruption, the disc apparatus further comprising: a second memory means for temporarily storing data to be written into the disc; an audio data input means for supplying audio data input to the second memory means; and a data write-in means for intermittently writing data stored in the memory means into the disc; wherein the control means controls so that while data are continuously written into the second memory means by the audio data input means, data are written into a third disc by the data write-in means, the third disc is exchanged to a fourth means by the disc changer means, and data are then written into the fourth disc by the data write-in means.

According to a still further aspect of the present invention, we provide a disc apparatus comprising: a readout means for reading out data from a disc such as an optical disc or opto-magnetic disc; a first memory means for temporarily storing data read out from the disc by the readout means; an audio signal output means for reading out the data stored in the first memory means and producing an audio signal output; and a control means for controlling so that data are read out from the disc by the readout means and stored intermittently in the first memory means; wherein the control means controls so that when data amount of a first audio data stored in the first memory means exceeds a first threshold value, data write-in is stopped; and when the data amount of the first audio data stored in the first memory means declines below a second threshold value, the data write-in resumes; and wherein the control means has a first repeat playback mode whereby audio data of a predetermined period can be repeatedly played back after when the first repeat playback mode is selected and a second repeat playback mode whereby audio data of a predetermined period can be repeatedly played back before when the second repeat playback mode is selected; and the control means controls so that when the second repeat playback mode is selected, the first threshold value is set lower than the first threshold value when the first repeat playback mode is selected; and when the second repeat playback mode is selected, the second threshold value is set lower than the second threshold value when the first repeat playback mode is selected.

BRIEF DESCRIPTION OF THE DRAWINGS

The present invention will now be described with reference to the accompanying drawings wherein:

FIGS. 6(a)–6(b) are descriptive drawings indicating operation of a disc apparatus in accordance with a fourth embodiment of the present invention;

FIGS. 8(a)–8(b) are descriptive drawings indicating operation of a disc apparatus in accordance with a sixth embodiment of the present invention;

DETAILED DESCRIPTION OF THE INVENTION

First Embodiment

Figure 1:
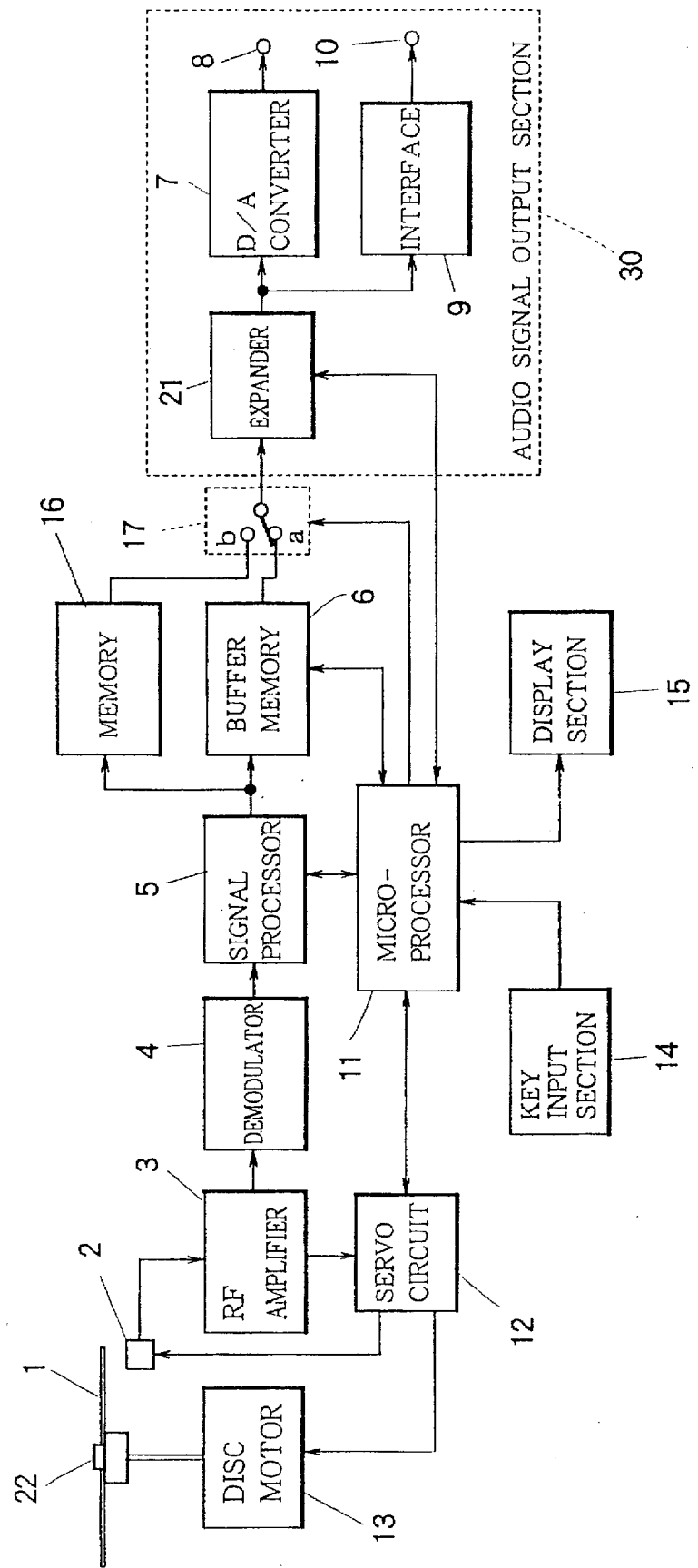
FIG. 1 is a block diagram indicating compositions of a disc apparatus in accordance with a first embodiment of the present invention.

FIG. 1 is a block diagram indicating compositions of a disc apparatus (MD playback apparatus) in accordance with a first embodiment of the present invention.

As indicated in FIG. 1, the disc apparatus comprises an optical pickup 2 for optically reading out audio data and TOC data recorded on a disc 1, an RF amplifier 3, a demodulator circuit 4, a signal processor circuit 5 and a buffer memory 6. The disc apparatus also comprises an audio signal output section 30 for outputting an audio signal based on the data temporarily stored in the buffer memory 6. The audio signal output section 30 comprises an expander circuit 21, a D/A converter circuit 7, an analog audio output terminal 8, an interface circuit 9 and a digital audio output terminal 10. The disc apparatus further comprises a microprocessor 11 for controlling an operation of the overall disc apparatus, a servo circuit 12, a disc motor 13, a turntable 22, a key input section 14 and a display section 15. The disc apparatus further includes a selector switch 17 for selecting the audio data sent to the expander circuit 21.

The disc apparatus constructed as mentioned above operates in the following manner on the basis of commands from the microprocessor 11. Laser light is emitted from the optical pickup 2 to the disc 1 and by detecting the reflected light, the optical pickup 2 reads out the data recorded on the disc 1. The optical pickup 2 converts the data into an electrical signal, which is amplified by the RF amplifier 3 and EFM or otherwise demodulated by the demodulator circuit 4 to return the original signal series. At the signal processor circuit 5, errors in the signal series are corrected utilizing an error correction code included in the signal series, and the signal series is rearranged by interleave processing, thereby restoring the original digital audio signal.

The output from the signal processor circuit 5 is stored in memory 16 or temporarily stored in the buffer memory 6, then sent via the selector switch 17 to the expander circuit 21. The selector switch 17 selects the data supplied to the expander circuit 21 from the data stored in the memory 16 or the data currently being read out from the disc 1 and temporarily stored in the buffer memory 6.

The expander circuit 21 expands the audio signal encoded efficiently and restores the original audio signal. The restored audio signal is sent in one route via the D/A converter circuit 7 as the analog audio signal to the analog audio output terminal 8. In another route, the restored audio signal is sent via the interface circuit 9 to the digital audio output terminal 10 as the digital audio signal in accordance with the digital audio interface standard.

Figure 48:
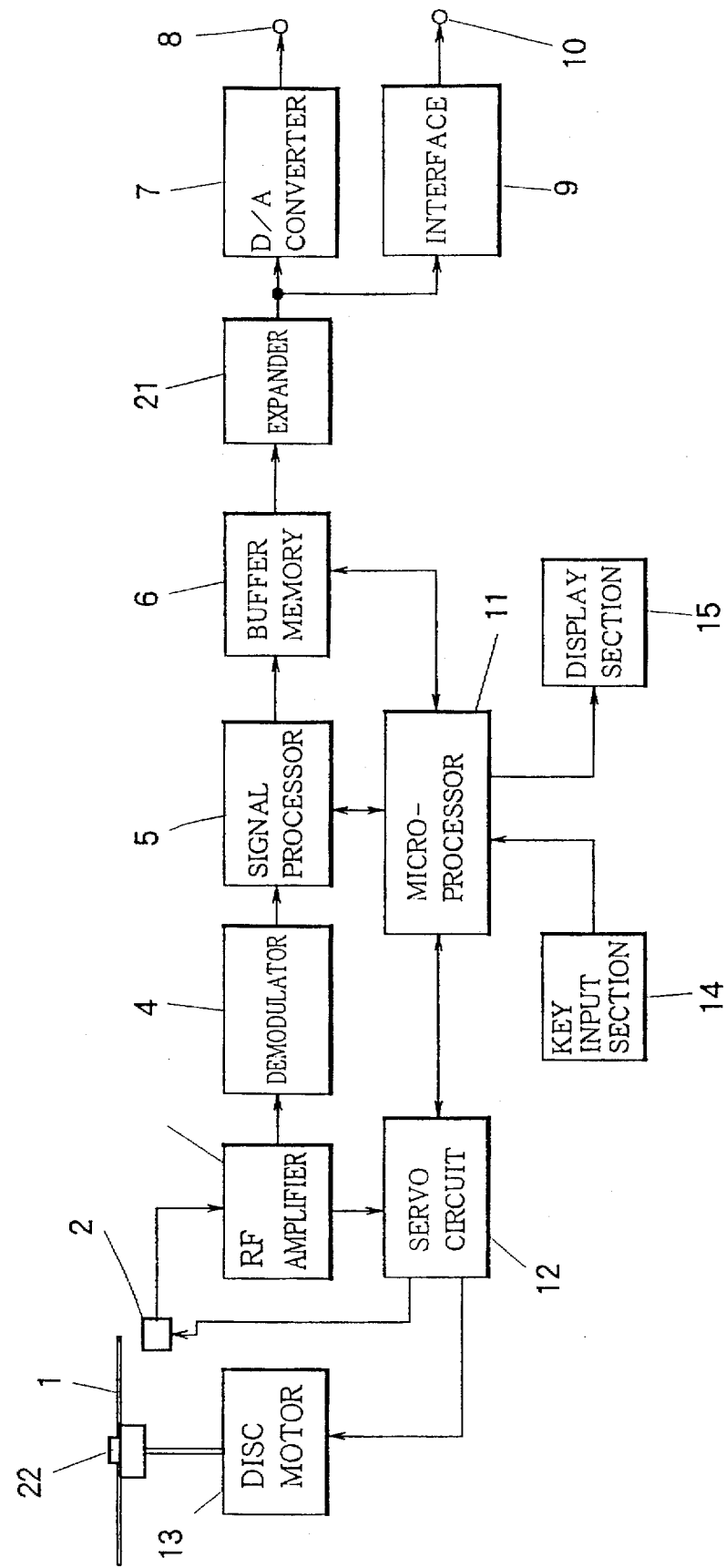
FIG. 48 is a block diagram indicating compositions of a conventional disc apparatus (MD playback apparatus)

FIGS. 2(a)–2(b) are descriptive drawings for comparing operations of the disc apparatus of the first embodiment and a conventional disc apparatus indicated in FIG. 48. FIG. 2(a) indicates an operation of the disc apparatus of the first embodiment, while FIG. 2(b) indicates an operation of the conventional disc apparatus. In FIGS. 2(a)–2(b), time is indicated on the vertical axes.

In the case of the disc apparatus of the first embodiment, when a disc is loaded into the disc apparatus or when the power supply is activated while a disc is loaded (shown as POWER ON in FIGS. 2(a)–2(b)), the focus servo operates, the disc rotation starts, the CLV servo operates, the tracking servo operates, and then the optical pickup 2 reads out the TOC data from the disc 1 (shown as TOC CUEING in FIGS. 2(a)–2(b)). Subsequently, the audio data of a predetermined period from the beginning of the program 1, which is recorded as a first program of the disc, are read out by the optical pickup 2 (shown as PROGRAM 1 CUEING in FIGS. 2(a)–2(b)) and stored in the memory 16, then the rotation of the disc 1 stops and servo operations such as focus servo, CLV servo and tracking servo stop.

As soon as the user inputs the playback start command from the key input section 14 (time point $t_0$), the selector switch 17 is turned from a contact "a" connected with the buffer memory 6 to a contact "b" connected with the memory 16, the audio data of the predetermined period from the beginning of the program 1 read out from the memory 16 are sent through the expander circuit 21, in one route via the D/A circuit 7 to the analog audio output terminal 8, and in another route via the interface circuit 9 to the digital audio output terminal 10.

Furthermore, as soon as the user inputs the playback start command from the key input section 14 (time point $t_0$), the servo operations such as the focus servo, the CLV servo and the tracking servo begin in order to read out the data from the disc 1. When the servo operations have stabilized to enable the readout of audio data from the disc 1, the selector switch 17 selects the contact "a" connected with the buffer memory 6, whereby the audio data read out from the disc 1 is sent via the buffer memory 6 to the expander circuit 21, then the audio signal is outputted from the analog audio output terminal 8 and the digital audio output terminal 10.

As shown in FIG. 2(b), in the case of the conventional disc apparatus, the audio signal output is not obtained until after time point $t_2$, but as shown in FIG. 2(a), in the case of a disc apparatus of the first embodiment, the audio signal output is obtained immediately at the key input for playback start (time point $t_0$).

Figure 3:
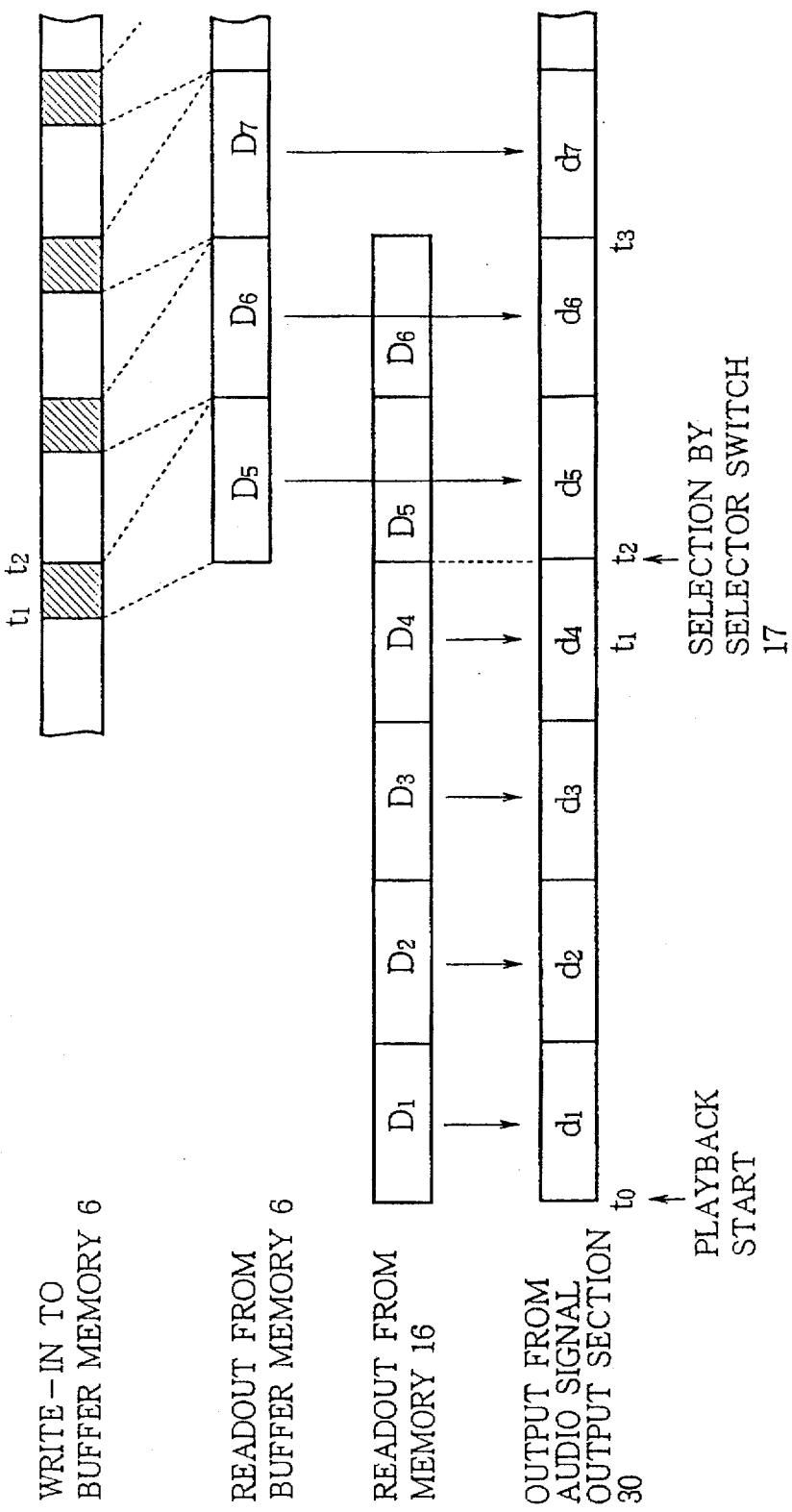
FIG. 3 is a descriptive drawing indicating operation of the disc apparatus in accordance with the first embodiment.

FIG. 3 is a descriptive drawing indicating the operation when the audio signal output from the audio signal output section 30 is switched from the basis of the audio data stored in the memory 16 to the basis of the audio data currently being read out from the disc 1 and sent via the buffer memory 6.

The operation of the selector switch 17 will be described below with reference to FIG. 3. As shown in FIG. 3, the audio data $D_1–D_6$ of a predetermined period $(t_0–t_3)$ from the beginning of the program 1 are stored beforehand in the memory 16. Simultaneously with the playback start key input (time point $t_0$), the selector switch 17 selects the contact "b" connected to the memory 16, whereby the audio data $D_1–D_4$ stored in the memory 16 are read out and decoded, then the audio signals $d_1–d_4$ are outputted from the audio signal output section 30.

Simultaneously with the playback start key input (time point $t_0$), the servo circuit 12 begins to control the optical pickup 2, the disc motor 13 and the like in order to read out the program 1 before time point $t_2$. During the period between time points $t_1$ and $t_2$, the audio data $D_5$ of the program 1 (corresponding to the audio signal $d_5$ outputted from the audio signal output section 30 after the time point $t_2$) are read out and written into the buffer memory 6. Then, at time point $t_2$, in accordance with a command from the microprocessor 11, the selector switch 17 selects the contact "a" connected to the buffer memory 6, and the audio data $D_5$, $D_6$, . . . sent from the disc 1 via the buffer memory 6 are decoded and the decoded audio signal $d_5$, $d_6$, . . . are outputted from the audio signal output section 30.

As described above, in the case of a disc apparatus of the first embodiment, since the audio data of a predetermined period from the beginning of the program 1 are read out and stored in the memory 16 prior to playback start command, the audio signal output of the program 1 can be obtained immediately at the playback start command.

Since the preparatory operation of the servo systems for reading out the audio data from the disc is performed while the audio signal output based on the audio data from the memory 16 is obtained, and after completion of the preparatory operation, the selector switch 17 selects the contact "a" connected to the buffer memory 6 in order to obtain the audio data from the disc 1 via the buffer memory 6, the audio signal output from the audio signal output section 30 is obtained without interruption and continuity of the program 1 is preserved.

Although the above description referred to the selector switch 17 switching at time point $t_2$, switching can be performed at any time between time points $t_2$ and $t_3$ in FIG. 3.

Furthermore, if the playback start key input is activated before the readout of the audio data of the beginning portion of the program 1 is completed, in order to provide an audio signal output as quickly as possible, the audio data from the disc are not written into the memory 16 but the audio data from the disc 1 are sent via the buffer memory 6 and the selector switch 17 to the audio signal output section 30.

Second Embodiment

In the first embodiment, in addition to the buffer memory 6, the separate memory 16 is provided for storing the audio data of the predetermined period from the beginning of the program 1. However, in the second embodiment, the memory 16 is not provided and the buffer memory 6 is constructed to enable storing the audio data of the predetermined period from the beginning of the program 1.

Figure 4:
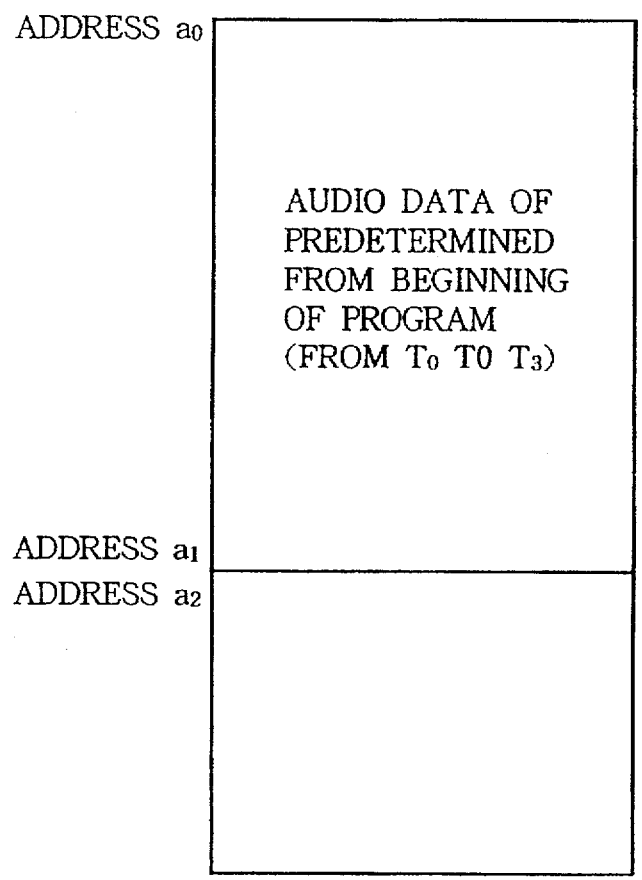
FIG. 4 is a descriptive drawing indicating a memory map of a disc apparatus in accordance with a second embodiment of the present invention.

As shown in FIG. 4 which indicates a memory map, the audio data of a predetermined period ($t_0$–$t_3$ in FIG. 3) from the beginning of the program 1 are stored beforehand at address areas $a_0$–$a_1$, in the buffer memory 6. Immediately at the playback start command, the data readout from the address $a_0$ in the buffer memory 6 begins and the audio signal output from the audio signal output section 30 is produced.

While the audio signal output based on the data stored beforehand at addresses $a_0$–$a_1$, is obtained from the audio signal output section 30, the servo systems including the servo circuit 12 perform the cueing operation (i.e., the operation for moving the beam spot emitted from the optical pickup 2 to the target position on the disc 1) of the audio data of time point $t_3$ and the audio data following time point $t_3$ are stored at address $a_2$ and subsequent addresses in the buffer memory 6. Immediately upon completion of the playback based on the audio data previously stored at address $a_0$–$a_1$, the audio data at the address $a_2$ and subsequent addresses are read out to provide a continuous audio signal output without interruption.

With the exception of the above points, the compositions and operation of the disc apparatus of the second embodiment are the same as those of the disc apparatus of the first embodiment.

Third Embodiment

Figure 5:
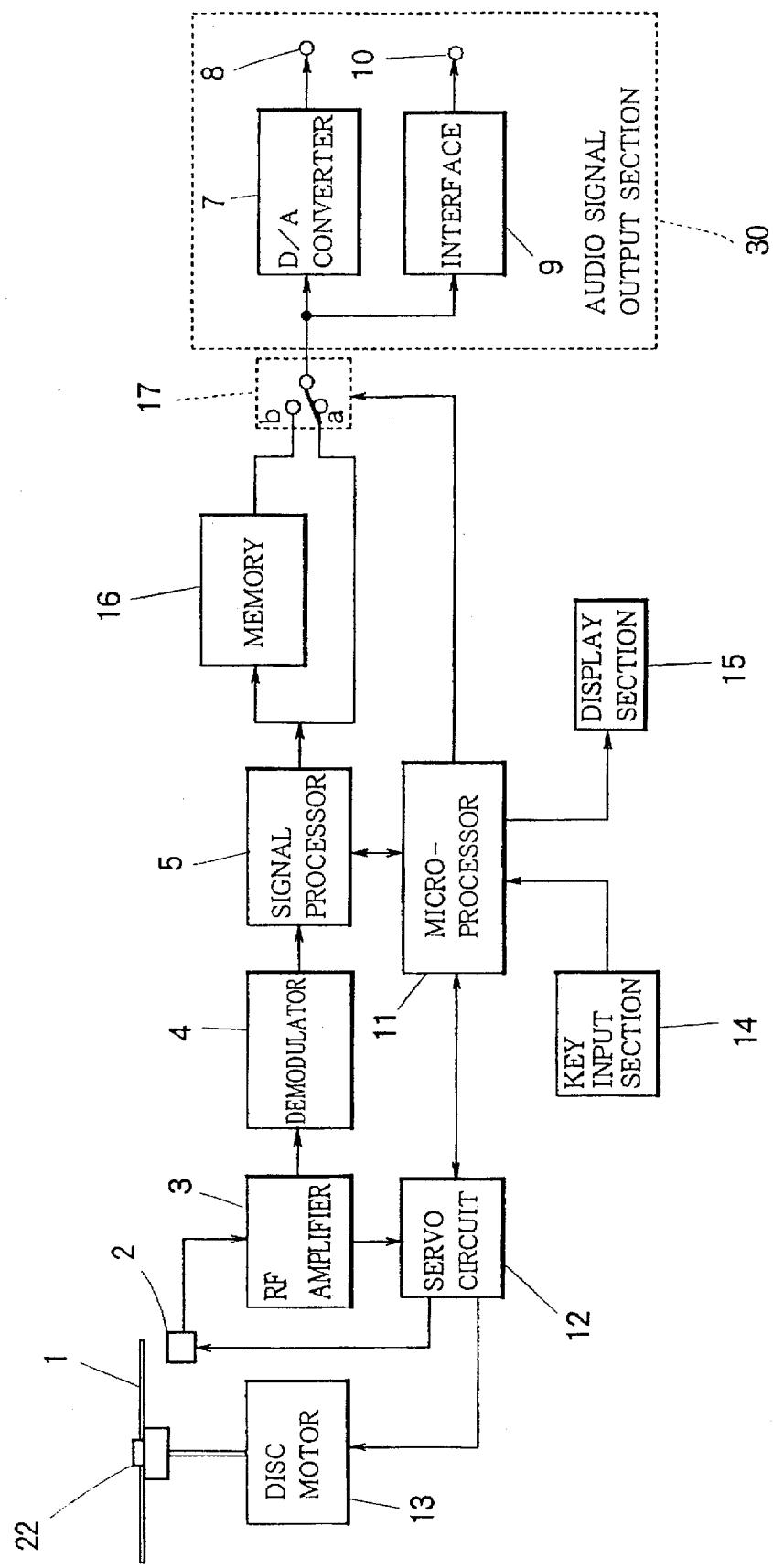
FIG. 5 is a block diagram indicating compositions of a disc apparatus in accordance with a third embodiment of the present invention.

FIG. 5 is a block diagram indicating compositions of a disc apparatus (CD playback apparatus) in accordance with a third embodiment of the present invention.

In FIG. 5, the same symbols as those of FIG. 1 are assigned to the compositions which are the same as or corresponding to those of the first embodiment indicated in FIG. 1. Since the disc apparatus of the third embodiment relates to a CD playback apparatus, differences with respect to the first embodiment are absence of an expander circuit 21 and a buffer memory 6 of FIG. 1, and control functions of the microprocessor 11. With the exception of these points, the compositions and operation of the disc apparatus of the third embodiment are the same as those of the first embodiment.

Fourth Embodiment

FIGS. 6(a)–6(b) are descriptive drawings indicating the operation of a disc apparatus in accordance with a fourth embodiment of the present invention. FIG. 6(a) indicates an operation of the disc apparatus of the fourth embodiment, while FIG. 6(b) indicates operation of the conventional disc apparatus. In FIGS. 6(a)–6(b) time is indicated on the vertical axes.

With the exception of the control functions of the microprocessor 11, the compositions and operation of the disc apparatus of the fourth embodiment is the same as those of the first embodiment. Therefore, the following description is also in reference to FIG. 1.

According to the fourth embodiment, after reading out the TOC data from the disc 1, the audio data of a predetermined period from the beginnings of all programs or a plurality of selected programs are read out from the disc 1 and stored in the memory 16. Therefore, even if programs other than program 1 are selected for playback, simultaneously with the playback start key input, the audio signal output can be obtained from the audio signal output section 30.

In the case of the disc apparatus of the the fourth embodiment, when a disc is loaded or when the power supply is activated while a disc is loaded (shown as POWER ON in FIGS. 6(a)–6(b)), the servo systems operate (shown as SERVO ON in FIGS. 6(a)–6(b)) and the TOC data are read out from the disc 1 by the optical pickup 2 (shown as TOC in FIGS. 6(a)–6(b)). Subsequently the beginning portions of programs 1 to n (n is a positive integer) are read out from the disc 1 and stored in the memory 16. The disc rotation and servo operations then stop (shown as DISC STOP and SERVO OFF in FIGS. 6(a)–6(b)).

The user selects a program i (i is a positive integer equal or less than n) and instructs the playback start with the key input section 14 at time point to, in accordance with a command from the microprocessor 11, the selector switch 17 is turned from a contact "a" connected with the buffer memory 6 to a contact "b" connected with the memory 16. Then the audio data of the predetermined period from the beginning of program i are read out from the memory 16 and sent through the expander circuit 21 in one route via the D/A converter circuit 7 to the audio output terminal 8, and in another route via interface circuit 9 to the digital audio output terminal 10.

Simultaneously with the playback start key input (time point to), in order to playback the loaded disc, the servo systems such as the focus servo, the CLV servo and the tracking servo operate. When the operation of the servo systems has stabilized to enable reading out the data from the disc 1, the selector switch 17 selects the contact "a" connected to the buffer memory 6. The audio data read out from the disc 1 is therefore sent via the buffer memory 6 and the expander circuit 21 to the analog audio output terminal 8 and the digital audio output terminal 10.

As indicated in FIG. 6(b), an audio signal output of a conventional disc apparatus is obtained only after time point $t_2$, but in the case of the fourth embodiment, the audio signal output is obtained after time point to when the playback start key input is activated.

As described above, in the case of the disc apparatus of the fourth embodiment, since the audio data of a predetermined period from the beginnings of the programs 1—n are read out from the disc 1 prior to playback start and stored in the memory 16, as soon as the program i is selected and playback start input is activated, the audio signal output of the program i can be obtained.

Since the preparatory operation of the servo systems for causing the optical pickup 2 to read out the audio data from the disc is performed while the audio signal output based on the audio data from the memory 16 is obtained, and after completion of the preparatory operation the selector switch 17 selects the contact "a" connected to the buffer memory 6 in order to obtain the audio data from the disc 1 via the buffer memory 6, the audio signal output from the audio signal output section 30 is obtained without interruption and continuity of the program i is preserved.

Also, a disc apparatus of the fourth embodiment can be provided with a playback mode whereby the audio data of the beginning portions of all the programs are stored in the memory 16, then these beginning portions can be played back for several seconds each continuously and without interruption of the audio signal output.

Furthermore, if the playback start key input is activated before the readout of the audio data in the beginning portions of the programs 1—n is completed, in order to provide an audio signal output as quickly as possible, the audio data from the disc are not written into the memory 16 but the audio data from the disc are sent via the buffer memory 6 and the selector switch 17 to the audio signal output section 30.

Fifth Embodiment

Figure 7A:
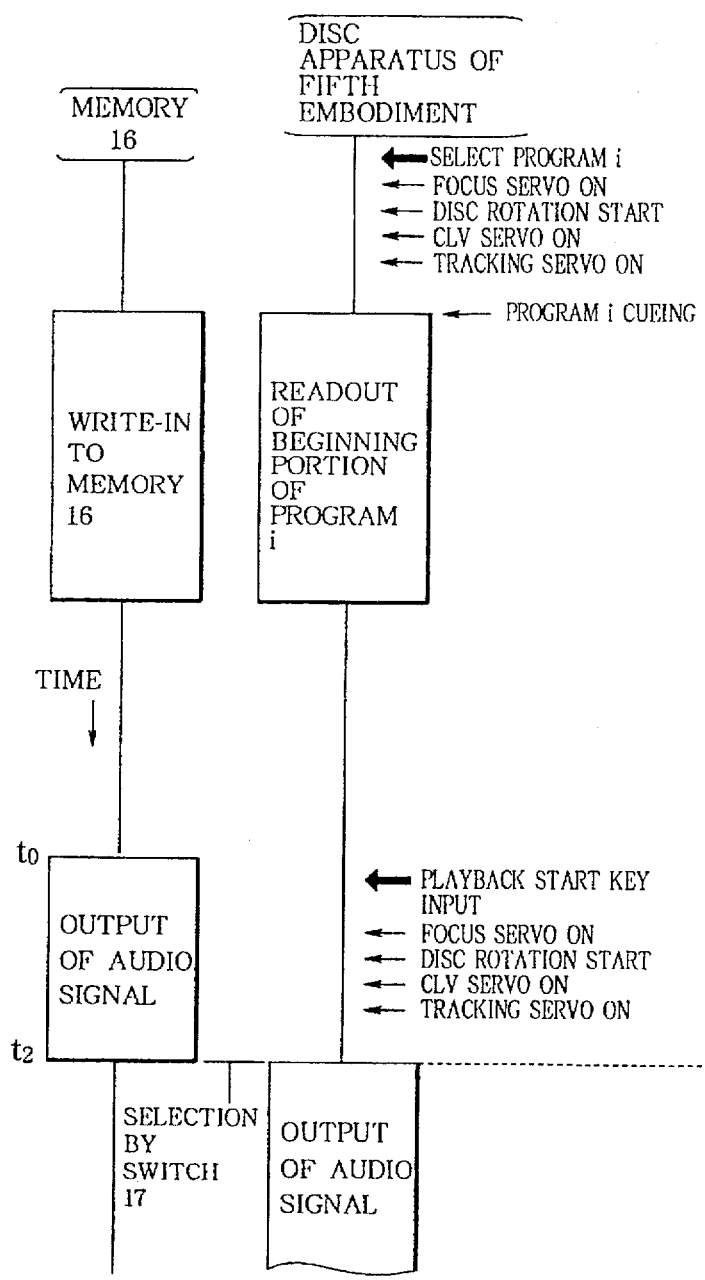
FIGS. 7(a)–7(b) are descriptive drawings indicating operation of a disc apparatus in accordance with a fifth embodiment of the present invention.
Figure 7B:
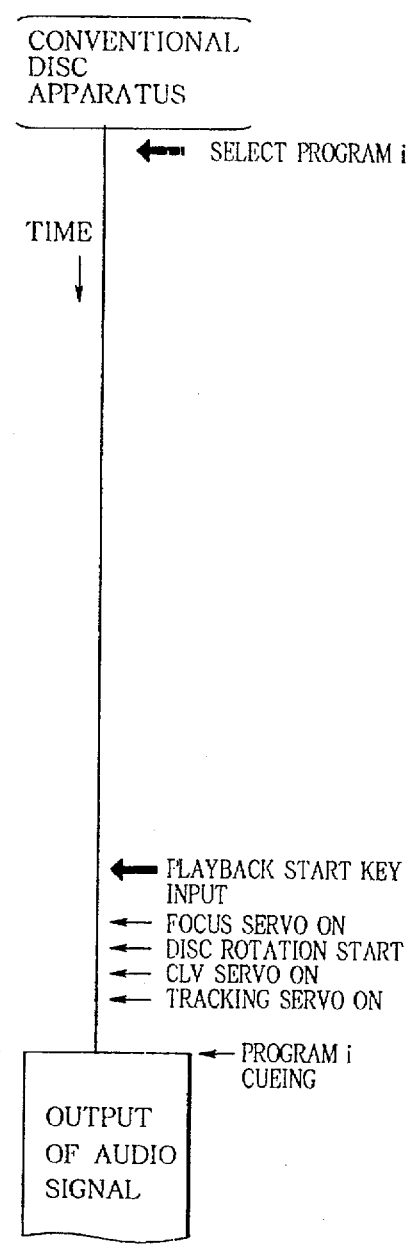

FIGS. 7(a)–7(b) are descriptive drawings indicating an operation of a disc apparatus in accordance with a fifth embodiment of the present invention. FIG. 7(a) indicates the operation of the disc apparatus of the fifth embodiment, while FIG. 7(b) indicates an operation the conventional disc apparatus indicated in FIG. 48. In FIGS. 7(a)–7(b), time is indicated on the vertical axes.

With the exception of the control functions of the microprocessor 11, the composition of the disc apparatus of the fifth embodiment is the same as those of the first embodiment. Therefore, the following description is also in reference to FIG. 1.

In the disc apparatus of the fifth embodiment, after the user operates to select a desired program i (i is a positive integer) and then inputs the playback start command with the key input section 14, an audio signal output is obtained from the audio signal output section 30. Simultaneously with the key input for selecting program i, the cueing operation of the program i begins and the audio data of the beginning portion of the program i are read out from the disc 1 and stored in the memory 16. Therefore, at the same time as the playback start input (time point $t_0$), the audio signal output of the program i can be obtained from the audio signal output section 30.

As indicated in FIGS. 7(a–7(b), in the case of the disc apparatus of the fifth embodiment, when a desired program i is selected by the key input section 14, the servo operations such as the focus servo, the CLV servo and the tracking servo begin, and the audio data of the predetermined period from the beginning of the program i are read out from the disc 1 and stored in the memory 16.

At the playback start command from the key input section 14 (time point to), in accordance with a command of the microprocessor 11, the selector switch 17 changes from the contact "a" connected with the buffer memory 6 to the contact "b" connected with the memory 16, whereby the audio data of the beginning portion of the program i stored in the memory 16 are read out, expanded at the expander circuit 21 and sent to the analog audio output terminal 8 and the digital audio output terminal 10.

Furthermore, at the playback start input (time point $t_0$), in order to playback the disc, the servo operations such as the focus servo, the CLV servo and the tracking servo begin. When the servo operation has stabilized to enable the readout from the disc 1 (time point $t_2$), the selector switch 17 selects the contact "a" connected to the buffer memory 6. The audio data from the disc 1 via the buffer memory 6 is sent to the expander circuit 21, then the audio signal outputs are obtained from the analog audio output terminal 8 and the digital audio output terminal 10.

Consequently, the conventional disc apparatus can not produce an audio signal output until time point $t_2$, while the disc apparatus of the fifth embodiment can produce an audio signal output simultaneously with the playback start key input, i.e., time point $t_0$.

As described above, in the case of the disc apparatus of the fifth embodiment, when the program i is selected, the audio data of a predetermined period from the beginning of the program i are read out from the disc 1 and stored the memory 16. Consequently, the audio signal output of the program i can be obtained instantly at the playback start key input.

During the audio signal output based on the data from the memory 16, the servo system performs preparatory operation for readout from the disc 1. When preparatory operation is completed, the selector switch 17 selects the contact "a" connected to the buffer memory 16. Consequently, the audio signal output from the audio signal output section 30 is uninterrupted and continuity of the program i is preserved.

Although the above description referred to the case in which the data of the beginning portion of the program i are stored in the separate memory 16, the data can also be stored in the buffer memory 6 in the same manner as the second embodiment.

Furthermore, if the playback start key input is activated before the readout of the audio data in the beginning portions of the programs i is completed, in order to provide an audio signal output as quickly as possible, the audio data from the disc are not written into the memory 16 but the audio data from the disc are sent via the buffer memory 6 and the selector switch 17 to the audio signal output section 30.

Sixth Embodiment

FIGS. 8(a)–8(b) are descriptive drawings indicating an operation of a disc apparatus in accordance with a sixth embodiment of the present invention. FIG. 8(a) indicates the operation of the disc apparatus of the sixth embodiment, while FIG. 8(b) indicates the operation of a conventional disc apparatus. In FIGS. 8(a)–8(b), time is indicated on the vertical axes.

With the exception of the control functions of the microprocessor 11, the compositions and operation of the disc apparatus of the sixth embodiment is the same as those of the first embodiment. Therefore, the following description is also in reference to FIG. 1.

In the case of the disc apparatus of the sixth embodiment, when a playback stop command is inputted from the key input section 14 during a playback of a program, the data readout from the disc 1 does not stop immediately, instead, for example, the audio data of the predetermined period from the portion to be continued when playback is restarted are read out from the disc 1 and stored in the memory 16.

As soon as the playback restart command is inputted from the key input section 14 (time point to), the selector switch 17 selects the contact "b" connected to the memory 16, thereby the audio data of a predetermined playback position (for example, the audio data of the predetermined period from the portion to be continued when playback is restarted) are read out from the memory 16, and sent via the expander circuit 21 to the analog audio output terminal 8 and the digital audio output terminal 10.

When the playback restart command is inputted (time point $t_0$) in order to playback the disc, the servo operations such as the focus servo, the CLV servo and the tracking servo begin. When the servo systems for servo operations have stabilized to enable the data readout from the disc 1, the selector switch 17 selects the contact "a" connected to the buffer memory 6. The audio data from the disc 1 via the buffer memory 6 is sent to the expander circuit 21, then the audio signal outputs are obtained from the analog audio output terminal 8 and the digital audio output terminal 10.

As described above, at restarting the playback, an audio signal output of a conventional disc apparatus is obtained only after time point $t_2$, but in the case of the sixth embodiment, the audio signal output is obtained at time point $t_0$ when the playback start key input is activated.

Furthermore, in the case of the disc apparatus of the sixth embodiment, when a program being played is stopped, for example, when playback is then restarted, the audio data of the predetermined period from the portion to be continued are read out from the disc 1 by the optical pickup 2 and stored in the memory 16. Consequently, instantly the playback restart key is inputted, the audio signal output can be obtained from the audio signal output section 30.

During the audio signal output based on the data from the memory 16, the servo system performs preparatory operation for readout from the disc 1, and when the preparatory operation is completed, the selector switch 17 changes the contact from "b" to "a". Consequently, the audio signal output from the audio signal output section 30 is uninterrupted and continuity of the program can be preserved.

Although the above description referred to the playback restart position as being the previous stop position, restart can also be performed from another position, such as the beginning portion of the program being played at the time of stop.

Seventh Embodiment

Figure 9:
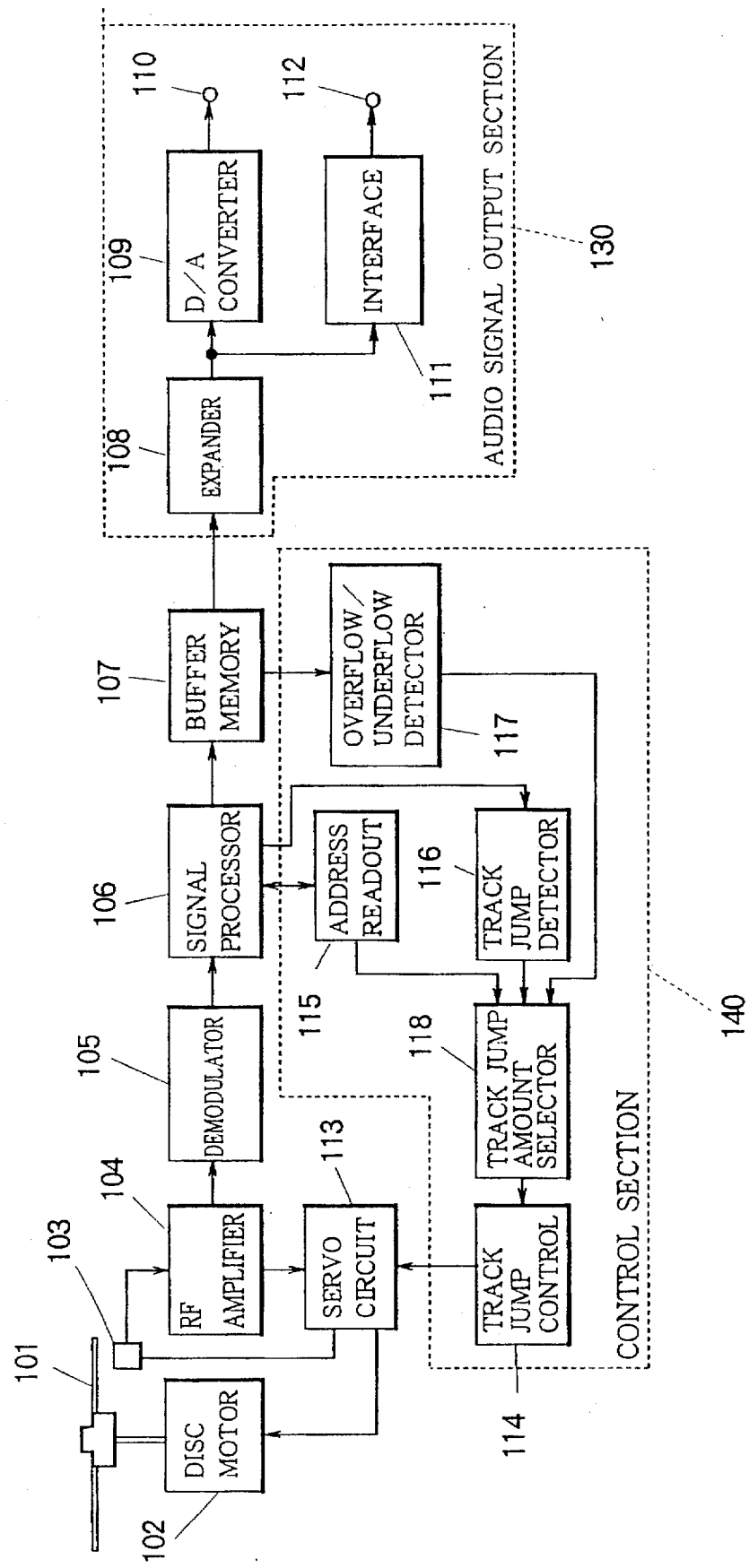
FIG. 9 is a block diagram indicating compositions of a disc apparatus in accordance with a seventh embodiment of the present invention.

FIG. 9 is a block diagram indicating compositions of a disc apparatus in accordance with a seventh embodiment of the present invention.

As indicated in FIG. 9, the disc apparatus of the seventh embodiment comprises a disc motor 102 for rotating a disc 101, a servo circuit 113, an optical pickup 103 for optically reading out data recorded on the disc 101, an RF amplifier 104, a demodulator circuit 105, a signal processor circuit 106 and a buffer memory 107. The disc apparatus also comprises an audio signal output section 130 for producing an audio signal output based on the data stored in the buffer memory 107. The audio signal output section 130 comprises a signal processor circuit 108, a D/A converter circuit 109, an analog audio output terminal 110, an interface circuit 111 and a digital audio output terminal 112.

The disc apparatus also includes a control section 140 comprising a track jump control circuit 114, an address readout circuit 115, a track jump detector circuit 116, a track jump amount selector circuit 118 and an overflow/underflow detector circuit 117.

In the case of a disc apparatus having the above compositions, when the amount of data stored in the buffer memory 107 exceeds a predetermined upper limit H, data write-in to the buffer memory 107 stops and then the address on the disc 102 when the data write-in to the buffer memory 107 was stopped is temporarily stored in the address readout circuit 115. Prior to the restart of the data write-in to the buffer memory 107, the readout position (or address) on the disc 101 by the optical pickup 103 Jumps backward by only a predetermined amount selected by the track jump amount selector circuit 118.

When the amount of data stored in the buffer memory 107 then declines below a predetermined lower limit L, the data write-in to the buffer memory 107 is restarted from the next address to the address where the data write-in was stopped when the upper limit H was exceeded. As a result of this process, data are written intermittently into the buffer memory 107.

In the seventh embodiment, the track jump amount when the data write-in to the buffer memory 107 is stopped is based on the address on the disc 101 detected by the address readout circuit 115, i.e., the readout position by the optical pickup 103. In the case of the seventh embodiment, the track jump amount is larger at the inner area of the disc 101 and smaller at the outer area of the disc 101. By controlling in this manner, the cluster quantity at the backward track jump can be made nearly the same at both the inner and outer areas of the disc 101.

Figure 10A:
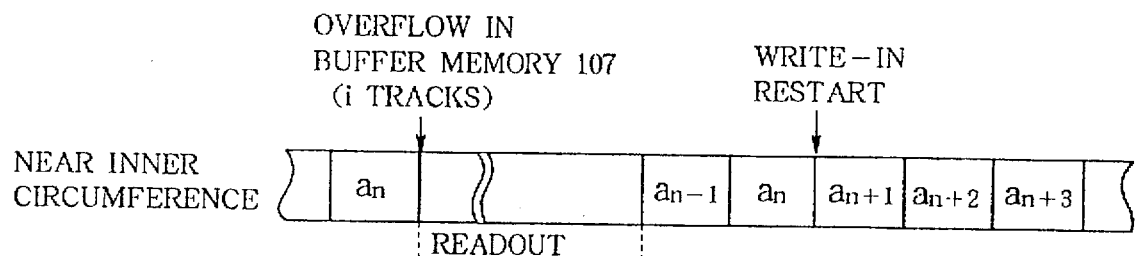
FIGS. 10(a)–10(b) are descriptive drawings indicating operation of the disc apparatus in accordance with the seventh embodiment.
Figure 10B:
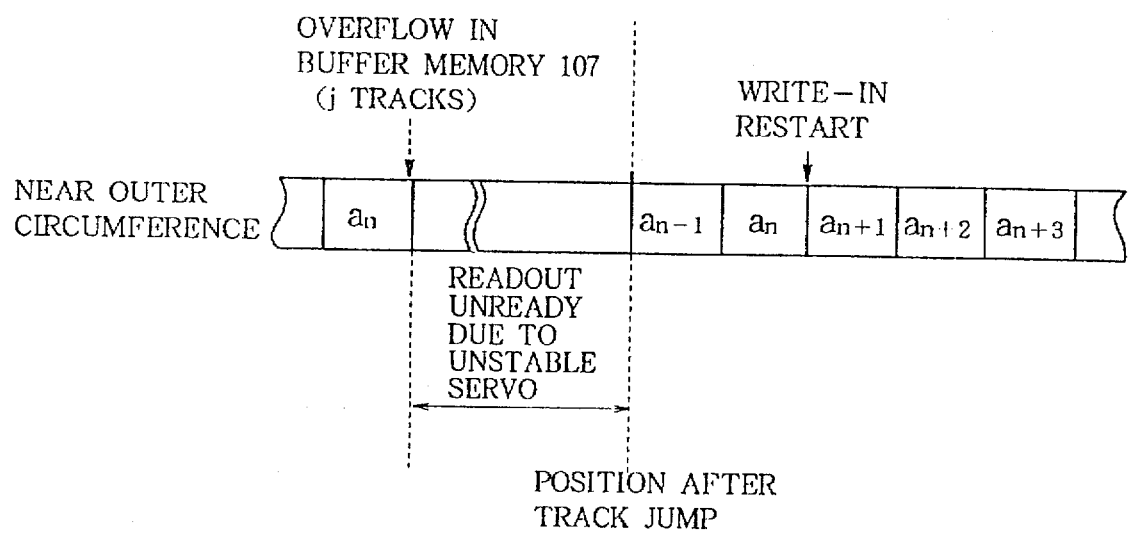

FIGS. 10(a)–10(b) are descriptive drawings indicating the positions on the disc 101 where the data write-in after the backward track jump can be restarted. FIG. 10(a) indicates a case that a readout is made at the inner area of the disc 101, while FIG. 10(b) indicates a case that a readout is made at the outer area of the disc 101.

As indicated in FIGS. 10(a)–10(b), in the seventh embodiment, the track jump quantity j at the outer area of the disc 101 is less than the track jump quantity i at the inner area of the disc 101.

As a result, when data at a cluster $a_n$ on the disc 101 are written into the buffer memory 107 and then the buffer memory 107 reaches overflow which is detected by the overflow/underflow detector circuit 117, the data write-in to the buffer memory 107 is stopped. As indicated in FIG. 10(b), at the outer area of the disc 101, since the beam spot from the optical pickup 103 moves j tracks backward (toward inner circumference) and the data write-in to the buffer memory 107 is enabled from a cluster $a_{n-1}$, the data write-in to the buffer memory 107 can be restarted from the next cluster $a_{n+1}$ to the cluster $a_n$ where the data write-in was stopped.

Similarly, as indicated in FIG. 10(a), at the inner area of the disc 101, since the beam spot from the optical pickup 103 moves i tracks backward and the data write-in to the buffer memory 107 is enabled from a cluster $a_{n-1}$, the data write-in to the buffer memory 107 can be restarted from the next cluster $a_{n+1}$ to the cluster $a_n$ where the data write-in was stopped.

Figure 49:
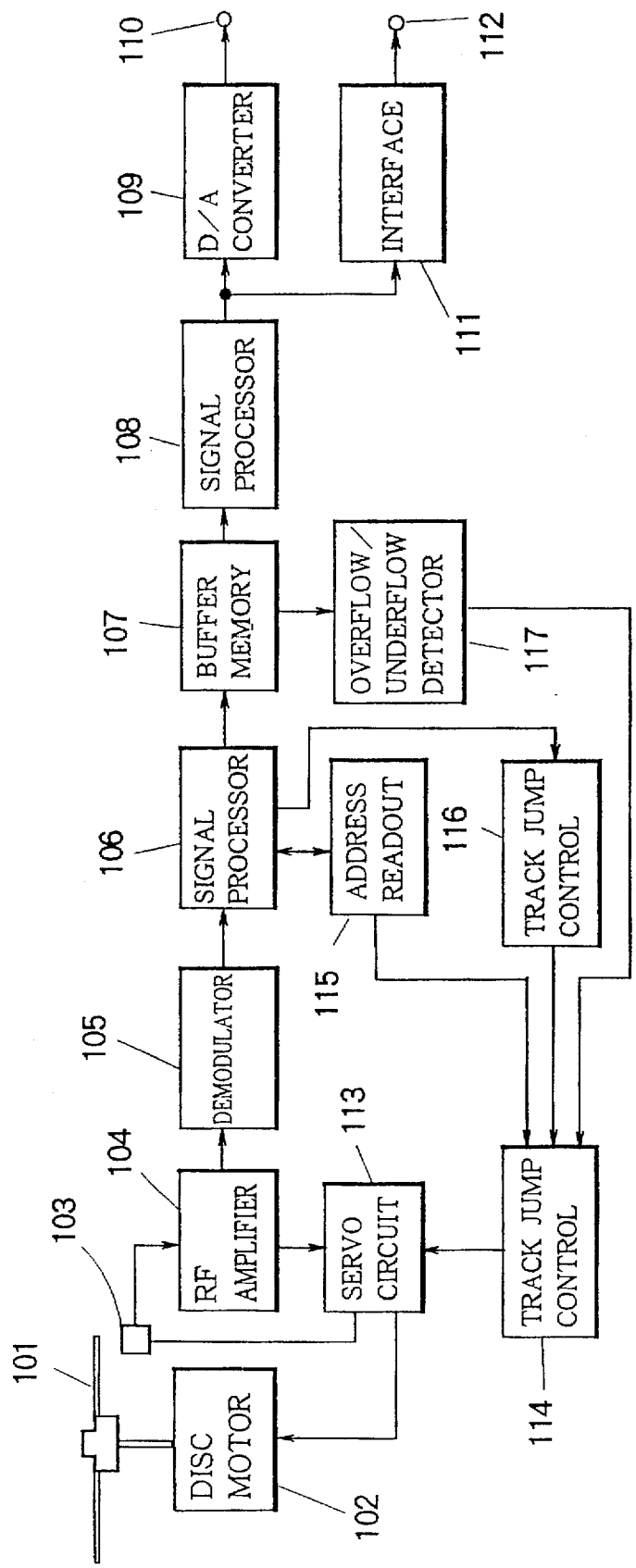
FIG. 49 is a block diagram indicating compositions of a conventional disc apparatus (CD playback apparatus)
Figure 50:
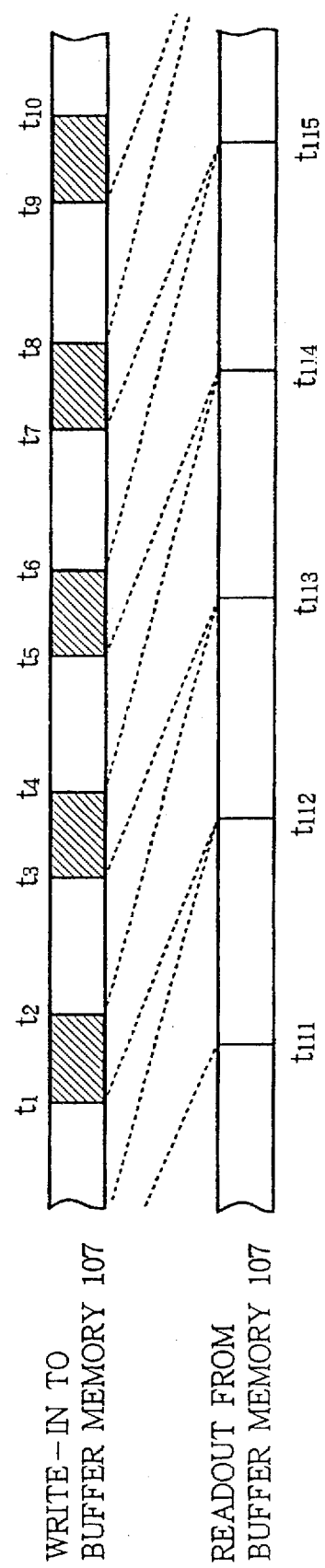
FIG. 50 is a descriptive drawing indicating intermittent data write-in to the buffer memory in the case of the disc apparatus of FIG. 49.
Figure 51:
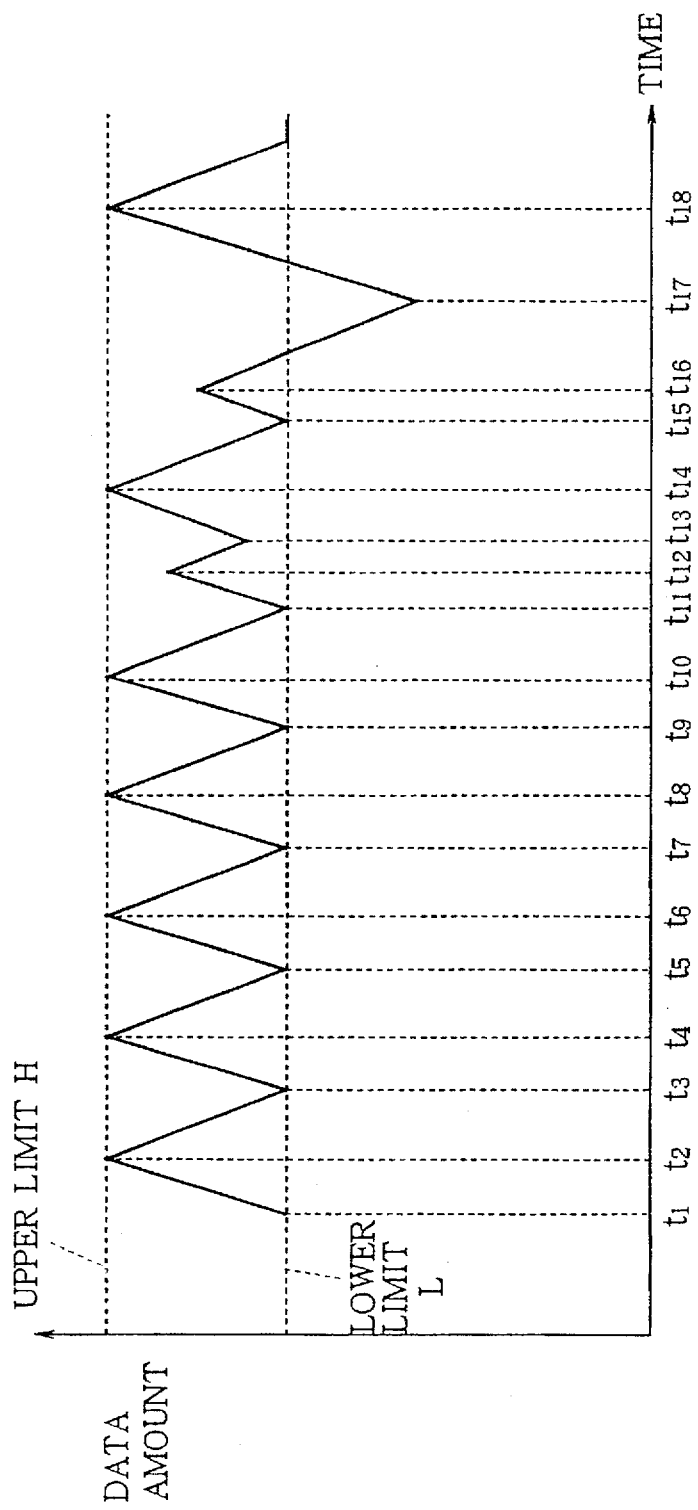
FIG. 51 is a graph indicating change of data amouint in the buffer memory with respect to time in the case of the disc apparatus of FIG. 49.
Figure 52A:
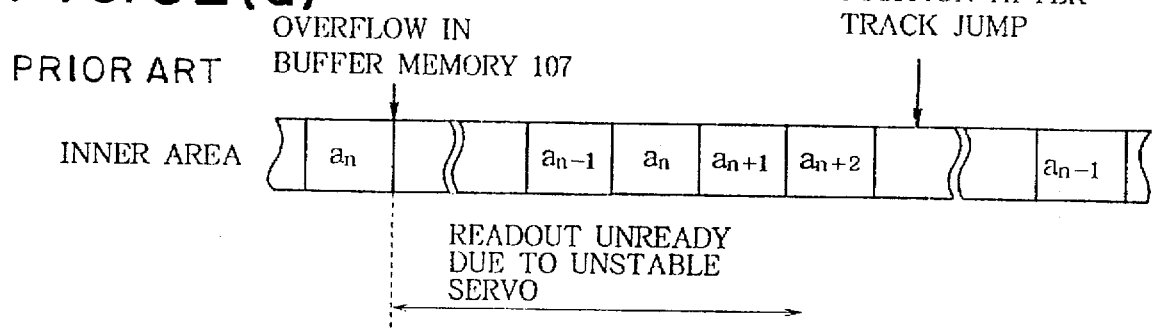
FIGS. 52(a)–52(b) are descriptive drawings indicating problems encountered when a low track jump amount is set in the disc apparatus of the FIG. 49.
Figure 52B:
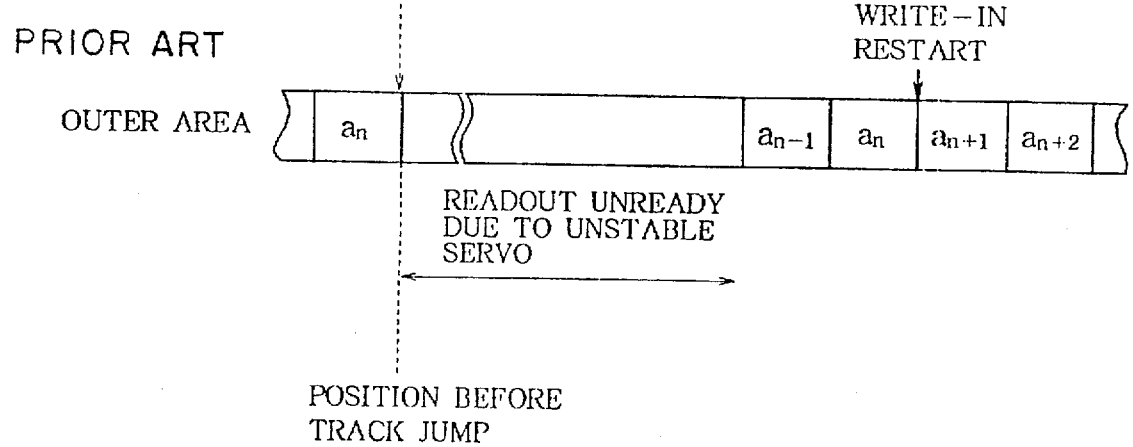
Figure 53A:
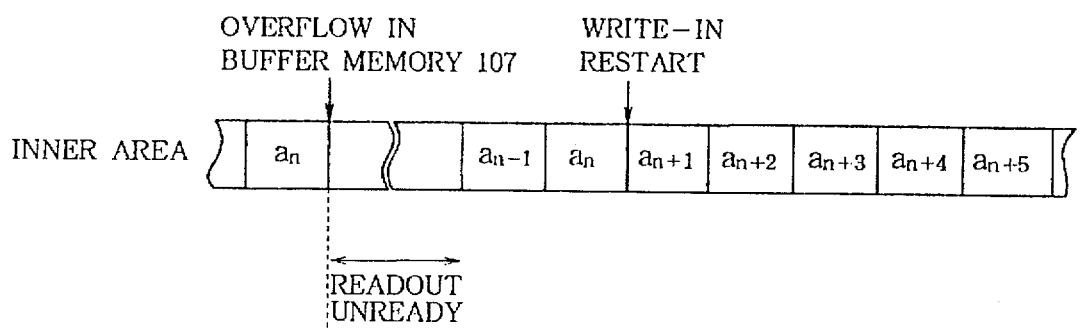
FIGS. 53(a)–53(b) are descriptive drawings indicating problems encountered when a high track jump amount is set in the disc apparatus of the FIG. 49.
Figure 53B:
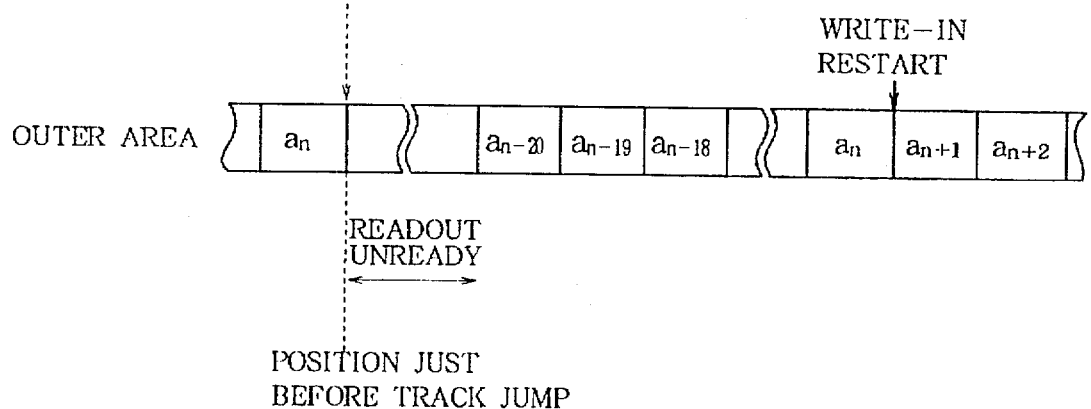

The compositions and operation other than described above for the disc apparatus of the seventh embodiment are the same as the conventional disc apparatus indicated in FIG. 49.

As described above, as a result of the the seventh embodiment, since a cluster quantity at the backward track jump at the inner area is substantially the same as a cluster quantity at the backward track jump at the outer area, the data write-in to the buffer memory 107 can be restarted from a predetermined cluster.

Figure 11:
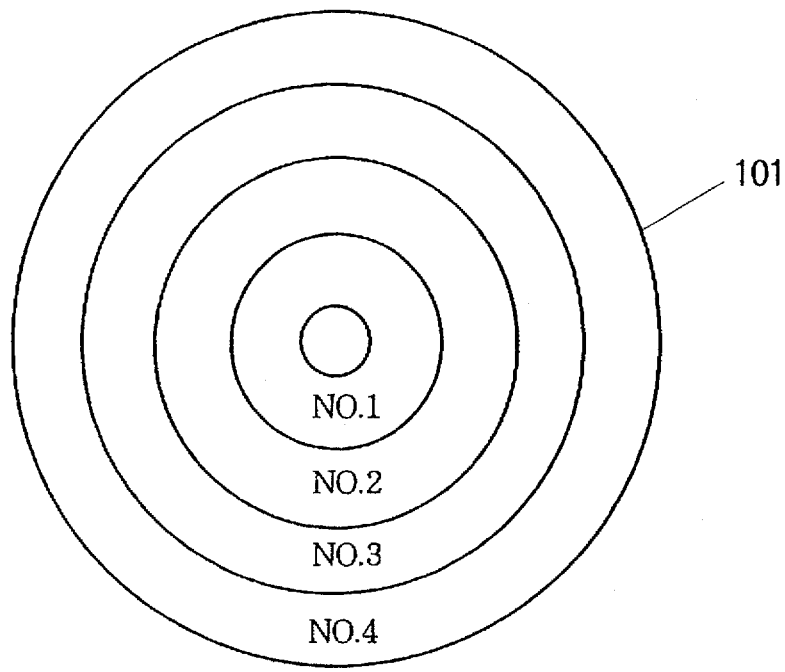
FIG. 11 is a descriptive drawing indicating examples of track jump amounts in the case of the disc apparatus in accordance with the seventh embodiment.

FIG. 11 is a descriptive drawing indicating areas on the disc 101 and the track jump amounts for each area.

As indicated in FIG. 11, the disc 101 is divided into, for example, four areas No.1 to No.4. The respective track jump amounts are 4 tracks for the innermost area No.1, 3 tracks for the area No.2, 2 tracks for the area No.3 and 1 track for the area No.4.

The number of the divided areas and the track jump amounts are not limited to those indicated in FIG. 11 and these can be set according to such factors as desired performance.

Eighth Embodiment

Figure 12:
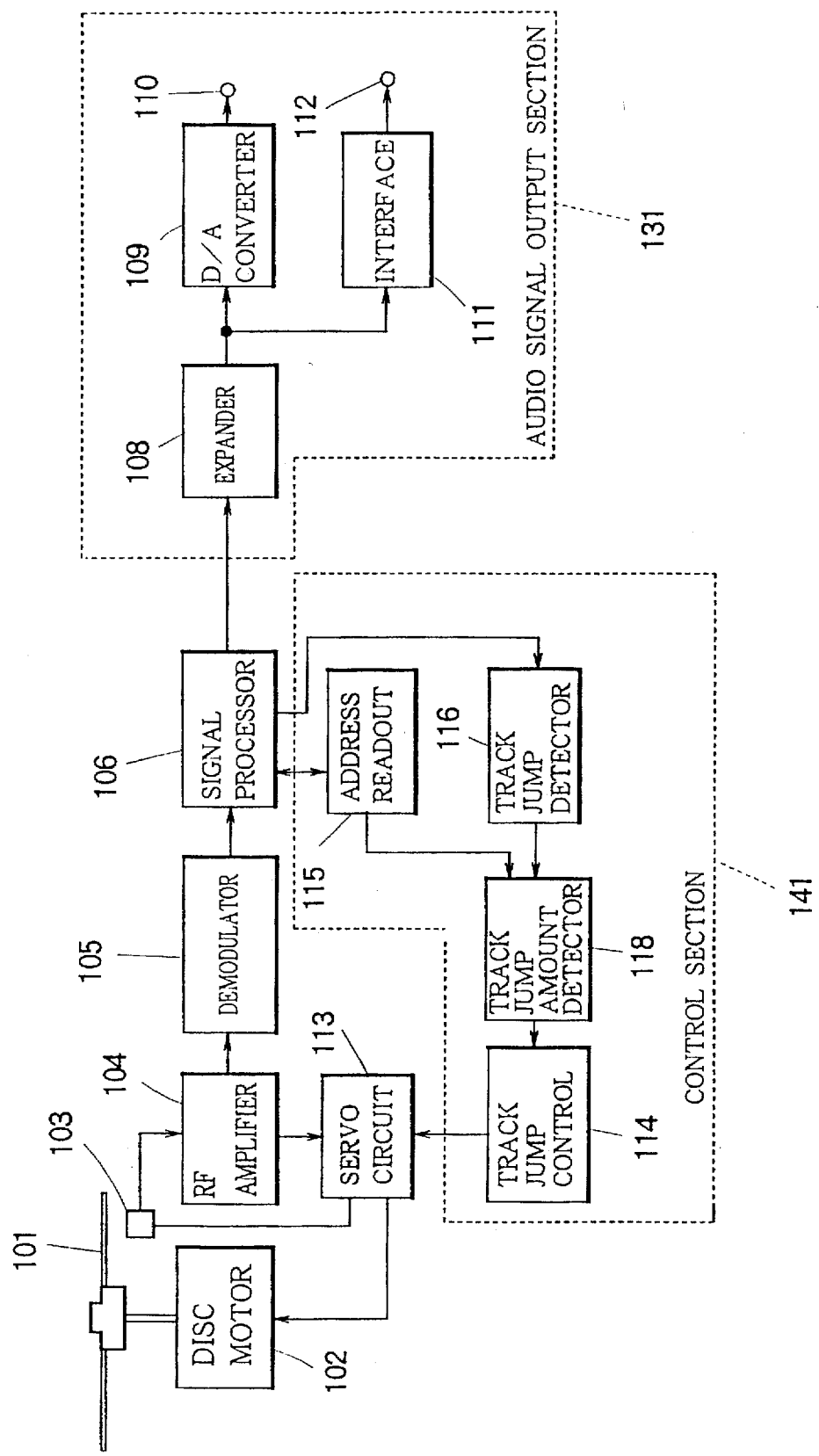
FIG. 12 is a block diagram indicating compositions of a disc apparatus in accordance with an eighth embodiment of the present invention.

FIG. 12 is a block diagram indicating compositions of a disc apparatus in accordance with an eighth embodiment of the present invention.

The disc apparatus of the eighth embodiment differs from that of the seventh embodiment in not having a buffer memory 107 and overflow/underflow detector circuit 117. Consequently, the signal based on the audio data read out from the disc 101 by the optical pickup 103 is sent to the audio signal output section 131 without temporary storage in the buffer memory, and then outputted as the audio output signal from the output terminals 110 and 112. Except for these points, the disc apparatus of the eighth embodiment is the same as that of the seventh embodiment.

In the case of the disc apparatus of the eighth embodiment, when external physical shock or vibration is applied during playback, causes tracking error and prevents the data readout from the disc 101, the track jump detector circuit 106 detects occurrence of the track jump on the basis of signal read out from the disc 101 and the address readout circuit 115 stores the address that has been read out from the disc 101.

The address readout circuit 115 reads out the address after the tracking error and computes an address difference between the addresses before the tracking error and after the tracking error. The track jump amount selector circuit 118 selects the optimum track jump amount on the basis of the present address and the address difference computed by the address readout circuit 115. The track jump control circuit 114 then controls the servo circuit 113 for track jump by the number of tracks selected by the track jump amount selector circuit 118, thereby enabling the optical pickup 103 to read out from the predetermined address.

Although the audio output is interrupted during the above process, since the optimum track jump quantity can be set on the basis of the data from the address readout circuit 115, the repetitions of the track jump can be reduced to shorten the time consumed for the track jumps. As a result, the interruption time of the audio output is shortened.

Figure 13:
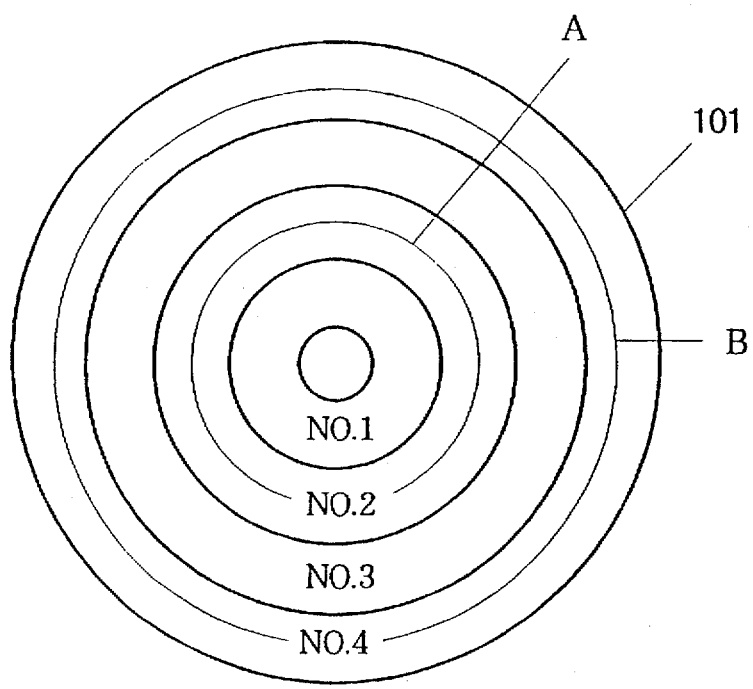
FIG. 13 is a descriptive drawing indicating examples of track jump amounts in the case of the disc apparatus in accordance with the eighth embodiment.

FIG. 13 is a descriptive drawing indicating the track jump amount for each area of the disc 101.

As indicated in FIG. 13, the disc 101 is divided, for example, into four areas No.1 to No.4. The respective track jump amounts are 100 tracks for the innermost area No.1, 75 tracks for area No.2, 50 tracks for area No.3, and 25 tracks for the outermost area No.4.

The number of divided areas and the track jump amounts are not limited to those indicated in FIG. 13, but can be set as required according to such factors as the performance.

Although the above description referred to the tracking error which causes the track jump in forward direction, the description also applies to the tracking error which causes the track jump in backward direction.

Also, although the above description referred to varying the track jump amount according to the present address after the tracking error, it is also acceptable to vary the track jump amount in such a manner as according to the target address for resuming the playback.

Ninth Embodiment

Figure 14:
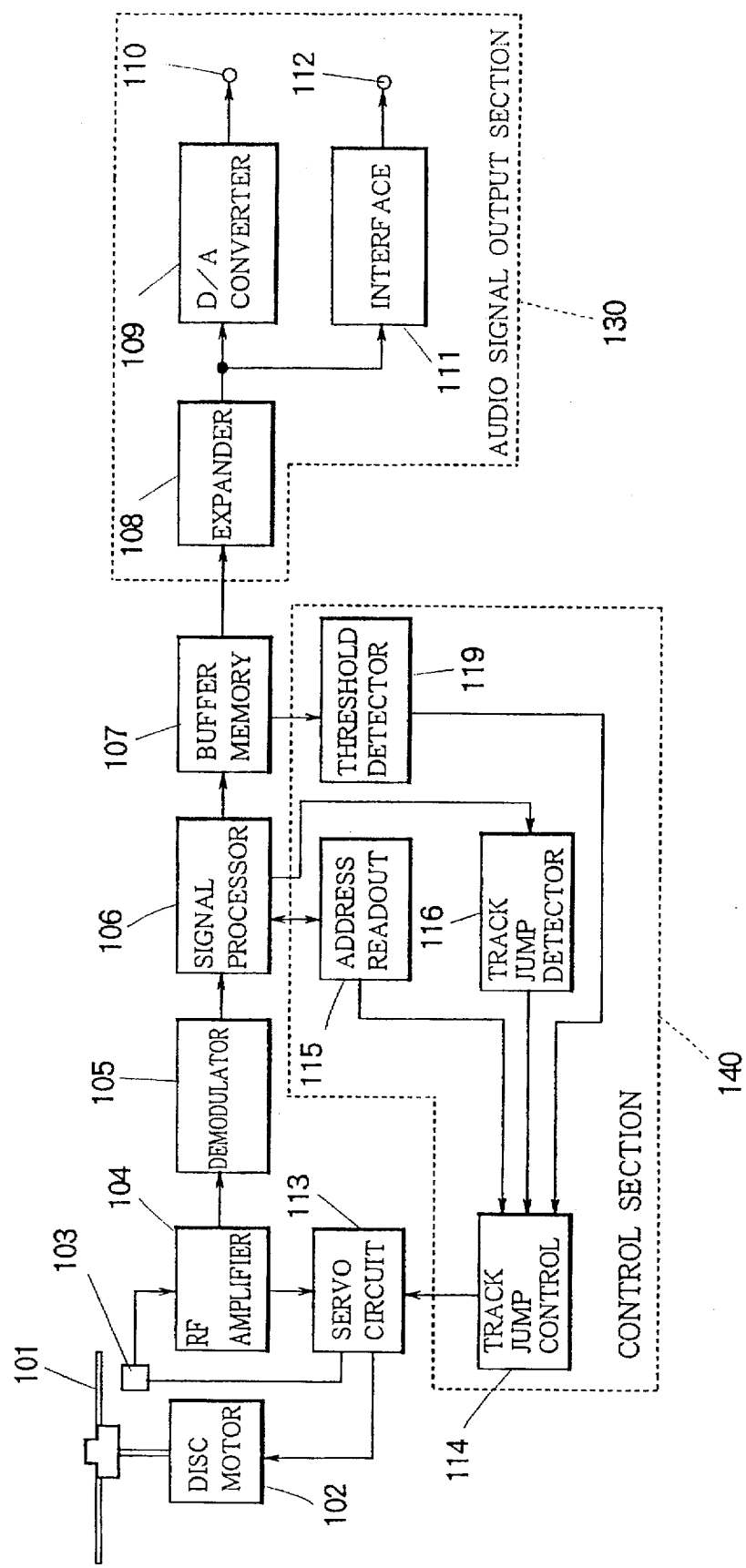
FIG. 14 is a block diagram indicating compositions of a disc apparatus in accordance with a ninth embodiment of the present invention.

FIG. 14 is a block diagram indicating compositions of a disc apparatus in accordance with a ninth embodiment of the present invention.

The disc apparatus of the ninth embodiment differs from the seventh embodiment in not having a track jump amount selector circuit and having a threshold detector circuit 119 in place of the overflow/underflow detector circuit.

The threshold detector circuit 119 possesses the upper limit H and the lower limit L. When the amount of data stored in the buffer memory 107 exceeds a predetermined upper limit H, the data write-in to the buffer memory is stopped and the address on the disc 101 is temporarily stored by the address readout circuit 115. Prior to restarting the data write-in to the buffer memory 107, the optical pickup 103 jumps backward by a predetermined track jump amount. When the amount of data stored in the buffer memory 107 then declines below a predetermined lower limit L, the data write-in to the buffer memory 107 is restarted from the next address to the address when the upper limit H was exceeded and the data write-in was stopped. In this manner, the data write-in to the buffer memory 107 is performed intermittently.

The threshold detector circuit 119 detects when the amount of data stored in the buffer memory 107 is greater than a predetermined threshold value T, which is smaller than the lower limit L. The track jump control circuit 114 controls the servo circuit 113 so that when the data amount in the buffer memory 107 exceeds the threshold value T, the data readout from the buffer memory 107 begins and then the audio signal output from the audio signal output section 130 starts.

Figure 16:
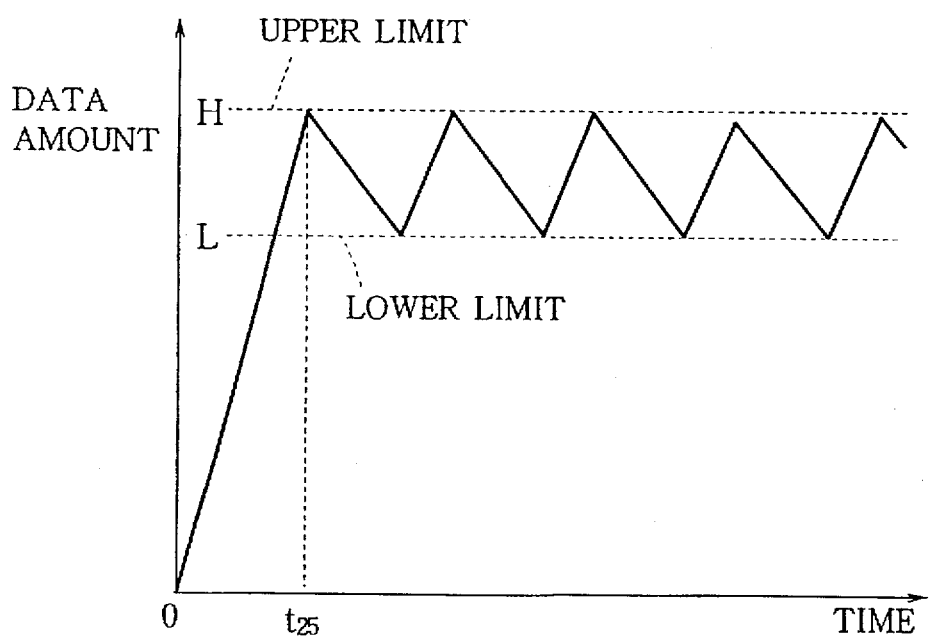
FIG. 16 is a descriptive drawing indicating changes of data amount in the buffer memory with respect to time in the case of a conventional disc apparatus.

In the case of a conventional disc apparatus, as indicated in FIG. 16, the playback is not started while the data amount in the buffer memory 107 is from the vacant state to the upper limit H. In the conventional disc apparatus, since the playback is started after the data amount in the buffer memory 107 reached the upper limit H, a long period of time (from time point O to time point $t_{25}$ in FIG. 16) is required until the audio signal output starts.

Figure 15:
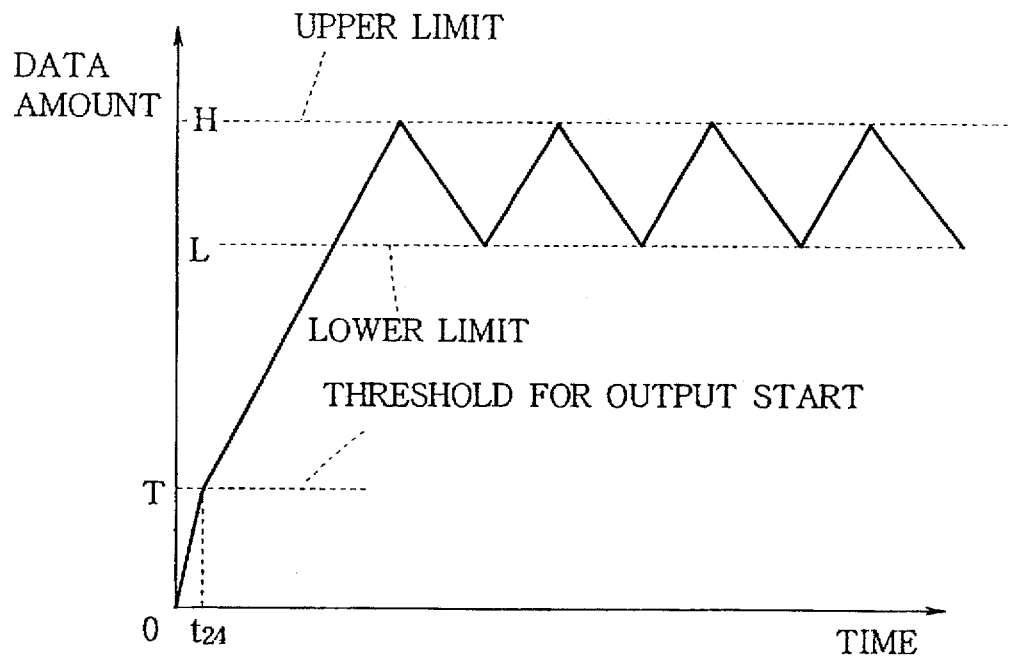
FIG. 15 is a graph indicating changes of data amount in the buffer memory with respect to time in the case of the disc apparatus in accordance with the ninth embodiment.

However, in the case of a disc apparatus of the ninth embodiment, as indicated in FIG. 15, the threshold T is set at a further lower level than the lower limit L. Since the audio signal output starts when the data amount in the buffer memory 107 exceeds the threshold T, the period of time until the audio signal output starts is shortened.

The data readout starts at a low data volume in the buffer memory 107, but since a transfer rate for the data write-in from the disc 101 to the buffer memory 107 is faster than a transfer rate for the data readout from the buffer memory 107, as indicated in FIG. 15, the data amount held in the buffer memory 107 increases.

Tenth Embodiment

Figure 17:
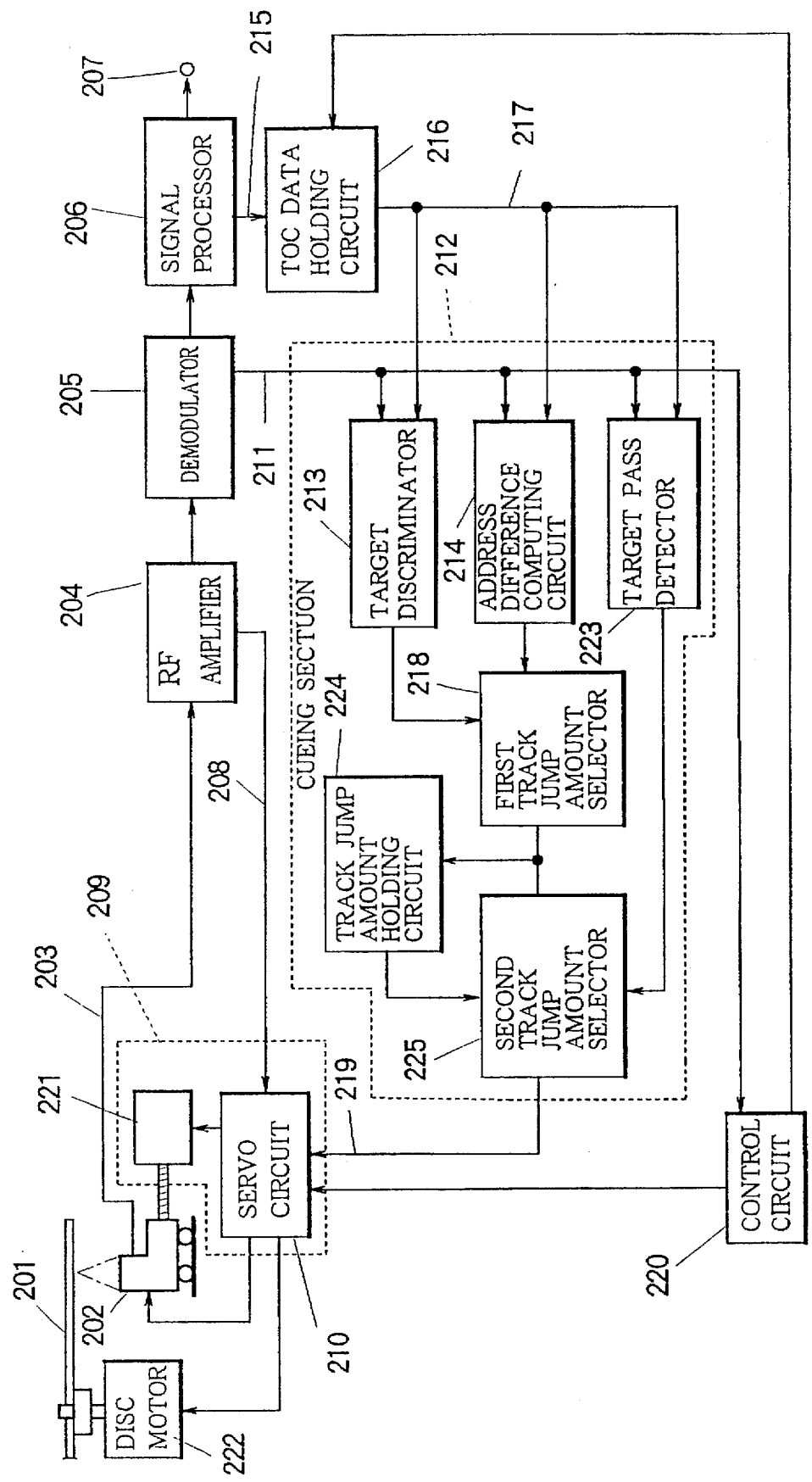
FIG. 17 is a block diagram indicating compositions of a disc apparatus in accordance with a tenth embodiment of the present invention.

FIG. 17 is a block diagram indicating compositions of a disc apparatus in accordance with a tenth embodiment of the present invention.

Figure 54:
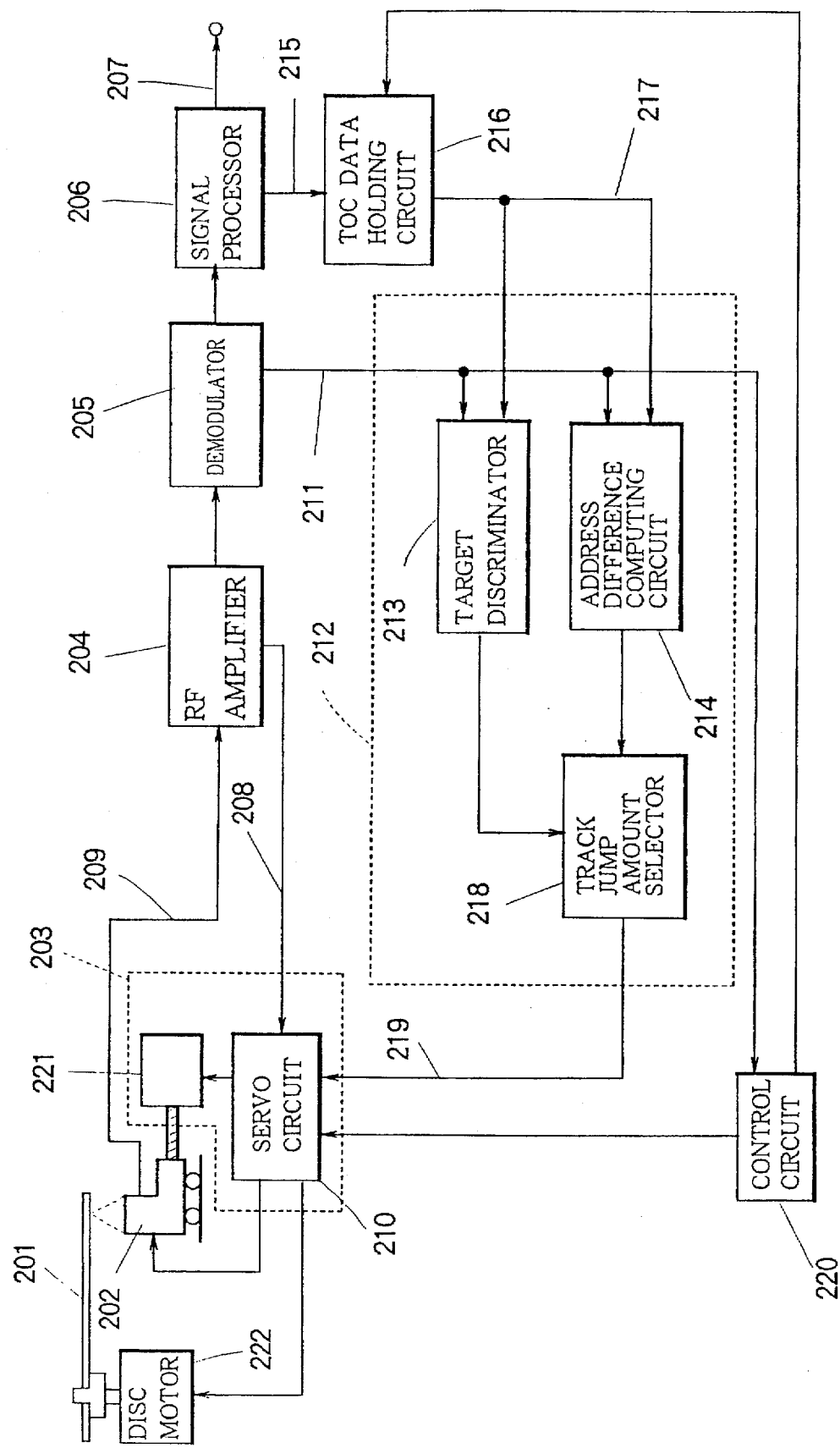
FIG. 54 is a block diagram indicating compositions of a conventional disc apparatus.
Figure 55:
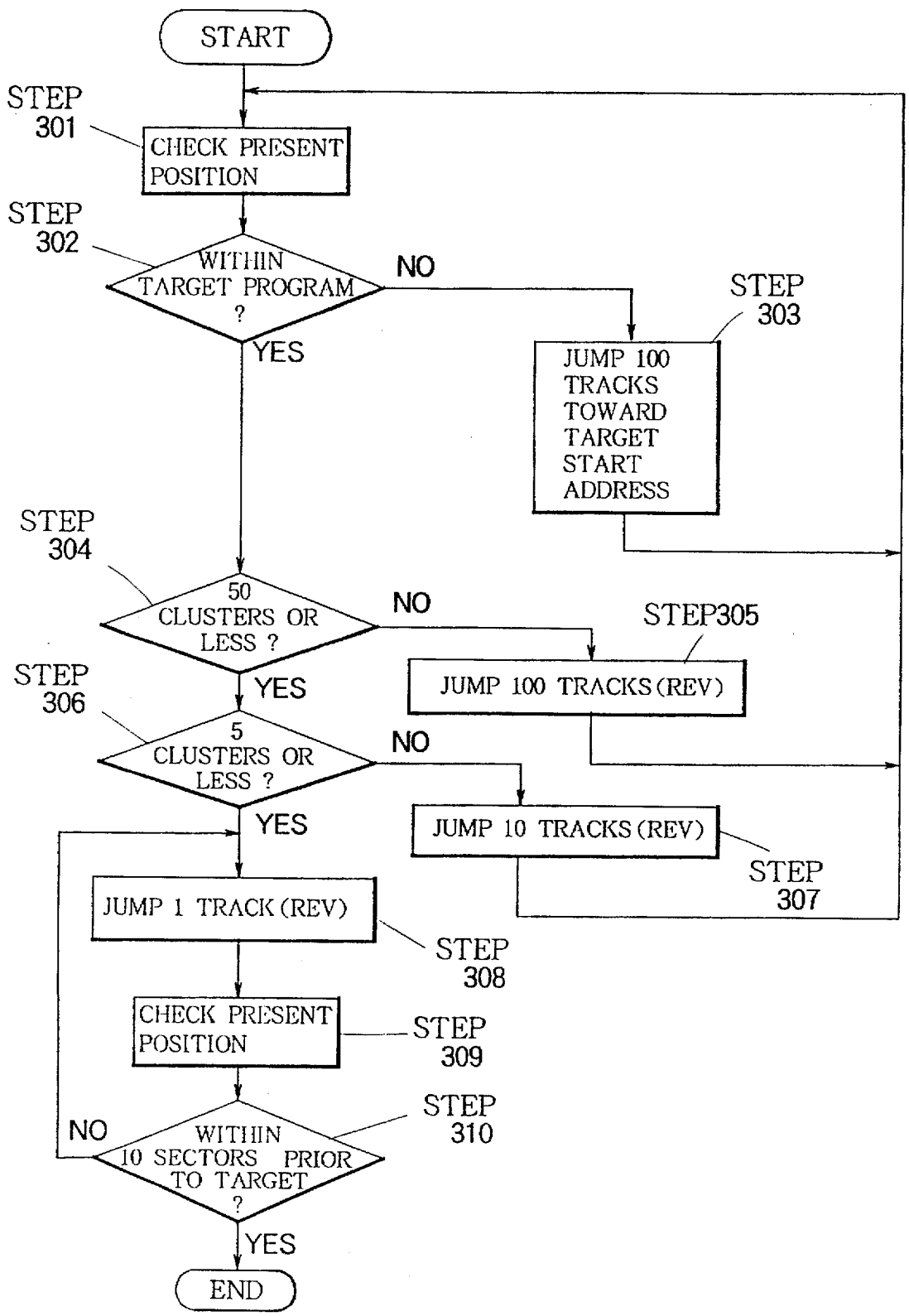
FIG. 55 is a flowchart indicating the cueing operation of the cueing section in the case of the disc apparatus of FIG. 54.
Figure 56:
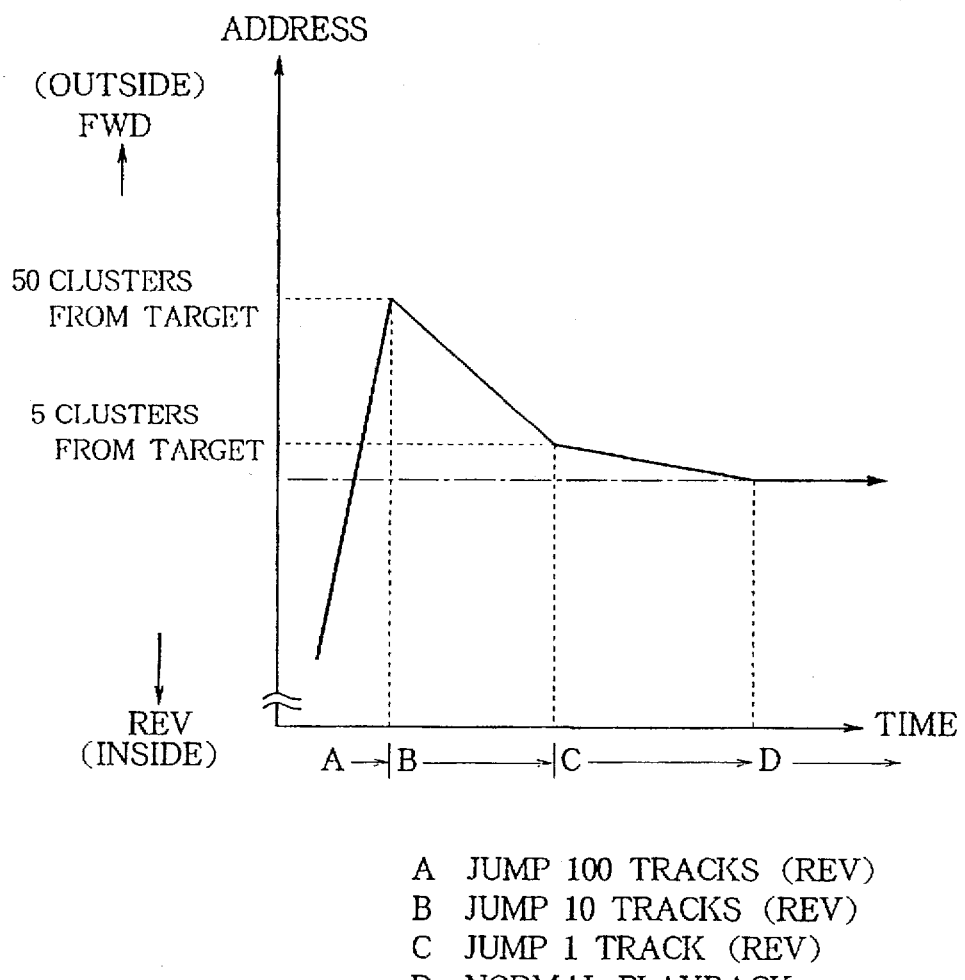
FIG. 56 is a graph indicating change of beam spot position with respect to time in the case of the disc apparatus of FIG. 54.
Figure 57:
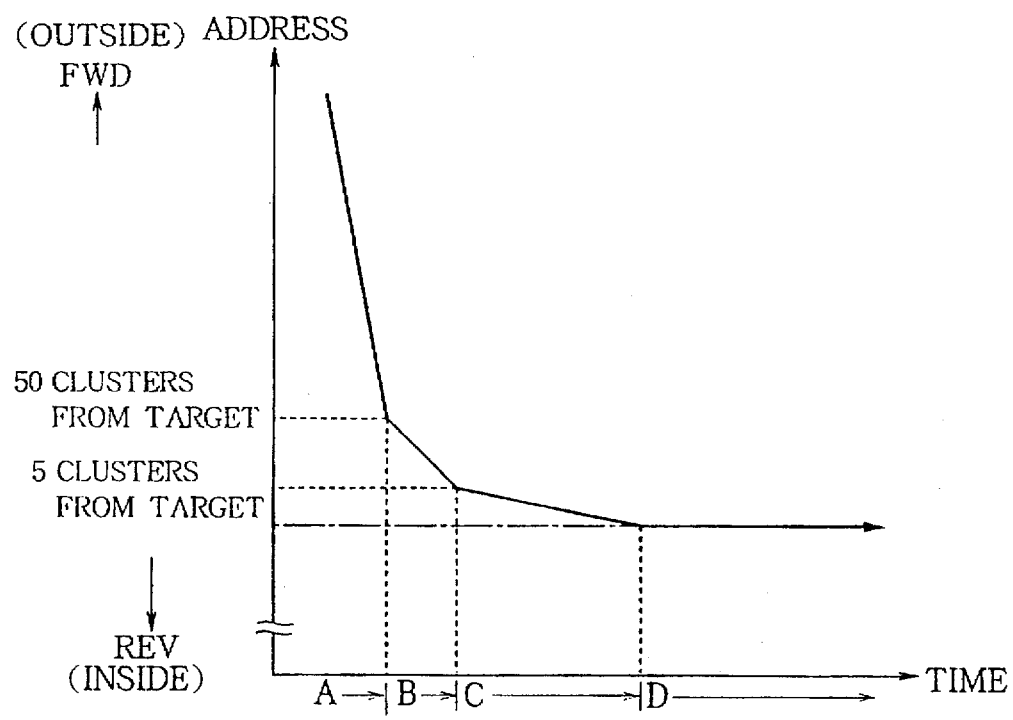
FIG. 57 is a graph indicating change of beam spot position with respect to time in the case of the disc apparatus of FIG. 54.

The compositions and operation of the cueing section 212 in the disc apparatus of the tenth embodiment differ from those of the conventional disc apparatus indicated in FIG. 54. The compositions other than the cueing section 212 are the same as the conventional disc apparatus of FIG. 54. Therefore, in FIG. 17, the same symbols are assigned to the compositions which are the same as or corresponds to those of the disc apparatus of FIG. 54 and a description of compositions other than the cueing section 212 is omitted.

The cueing section 212 shifts the beam spot to the target starting address in accordance with the target address 217 (including the target starting address of a selected program and the target ending address of this program) from the TOC data holding circuit 216 and the present address 211 (address of the beam spot position) from the demodulator circuit 205. The cueing section 212 comprises a target discriminator circuit 213, an address difference computing circuit 214, a target pass detector circuit 223, a first track jump amount selector circuit 218, a track jump amount holding circuit 224 and a second track jump amount selector circuit 225.

The target discriminator circuit 213 judges whether or not the present address is within the target program on the basis of the present address 211 from the demodulator circuit 205 and the target address 217 from the TOC data holding circuit 216. The address difference computing circuit 214 computes the address difference between the present address 211 and the target starting address. The target pass detector circuit 223 detects whether or not the beam spot has passed the target starting address during track jump.

The first track jump amount selector circuit 218 possesses a plurality of predetermined track jump amounts. As the address difference from the address difference computing circuit 214 decreases, the first track jump amount selector circuit 218 selects a smaller track jump amount from among the predetermined track jump amounts. The track jump amount holding circuit 224 temporarily holds the track jump amount selected by the first track jump amount selector circuit 218.

The second track jump amount selector circuit 225 sends the output of the track jump amount holding circuit 224 to the servo circuit 210 of the position determining section 209 when the target discriminator circuit 213 judges that the present address is within the target program and the target pass detector circuit 223 detects that the beam spot has passed the target starting address. Also, the second track jump amount selector circuit 225 sends the output of the first track jump amount selector circuit 218 to the servo circuit 210 of the position determining section 209 when the target discriminator circuit 213 judges that the present address is within the target program and the target pass detector circuit 223 has not detected that the beam spot has passed the target starting address.

Figure 18:
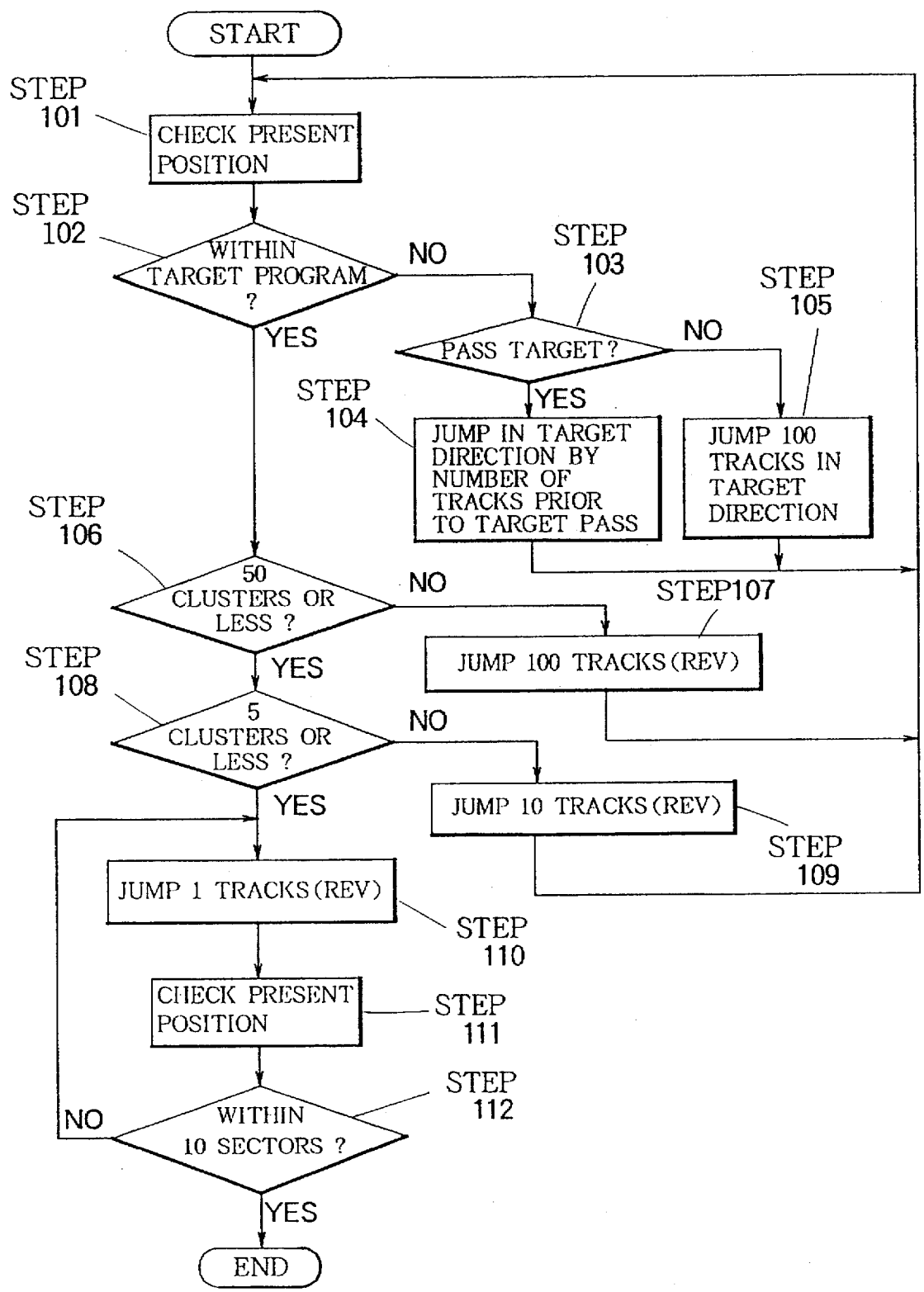
FIG. 18 is a flowchart indicating the cueing process in the case of the disc apparatus in accordance with the tenth embodiment.

FIG. 18 is a flowchart indicating the cueing process in the disc apparatus of the tenth embodiment.

As indicated in FIG. 18, the target discriminator circuit 213 first judges whether or not the present address is within the target program and the address difference computing circuit 214 computes the address difference between the present address and the target starting address to confirm the present address (or position) of the beam spot (step 101). If the present address of the beam spot is within the target program (step 102), the target pass detector circuit 223 judges whether or not the beam spot has passed the target starting address (step 103). If the target starting position was passed by the beam spot, the beam spot jumps in accordance with a command from the cueing section 212 in the direction of the target starting address (abbreviated as target direction in the figure) by only the same number of tracks as those immediately prior to passing the target starting address (step 104) and return to step 101. If the target starting address was not passed (step 103), the beam spot jumps 100 tracks in the direction of the target address (step 105) and return to step 101.

If the present address of the beam spot is within the target program (step 102), whether or not the address difference computed by the address difference computing circuit 214 is within 50 clusters is judged (step 106). If more than 50 clusters, the beam spot jumps 100 tracks in the direction of the inner circumference (REV) and return to step 101. If within 50 clusters (step 106), whether or not the address difference is within 5 clusters is judged (step 108). If more than 5 clusters, the beam spot jumps 10 tracks in the REV direction (step 109) and return to step 101. If within 5 clusters (step 108), the beam spot jumps 1 track in the REV direction (step 110).

The present address of the beam spot is then checked (step 111) and whether or not it is within 10 sectors (target in the figure) prior to the target starting address (step 112) is judged. If separated by more than 10 sectors, repeat steps 110–112. If within 10 sectors prior to the target starting address, the cueing operation is complete.

Figure 19:
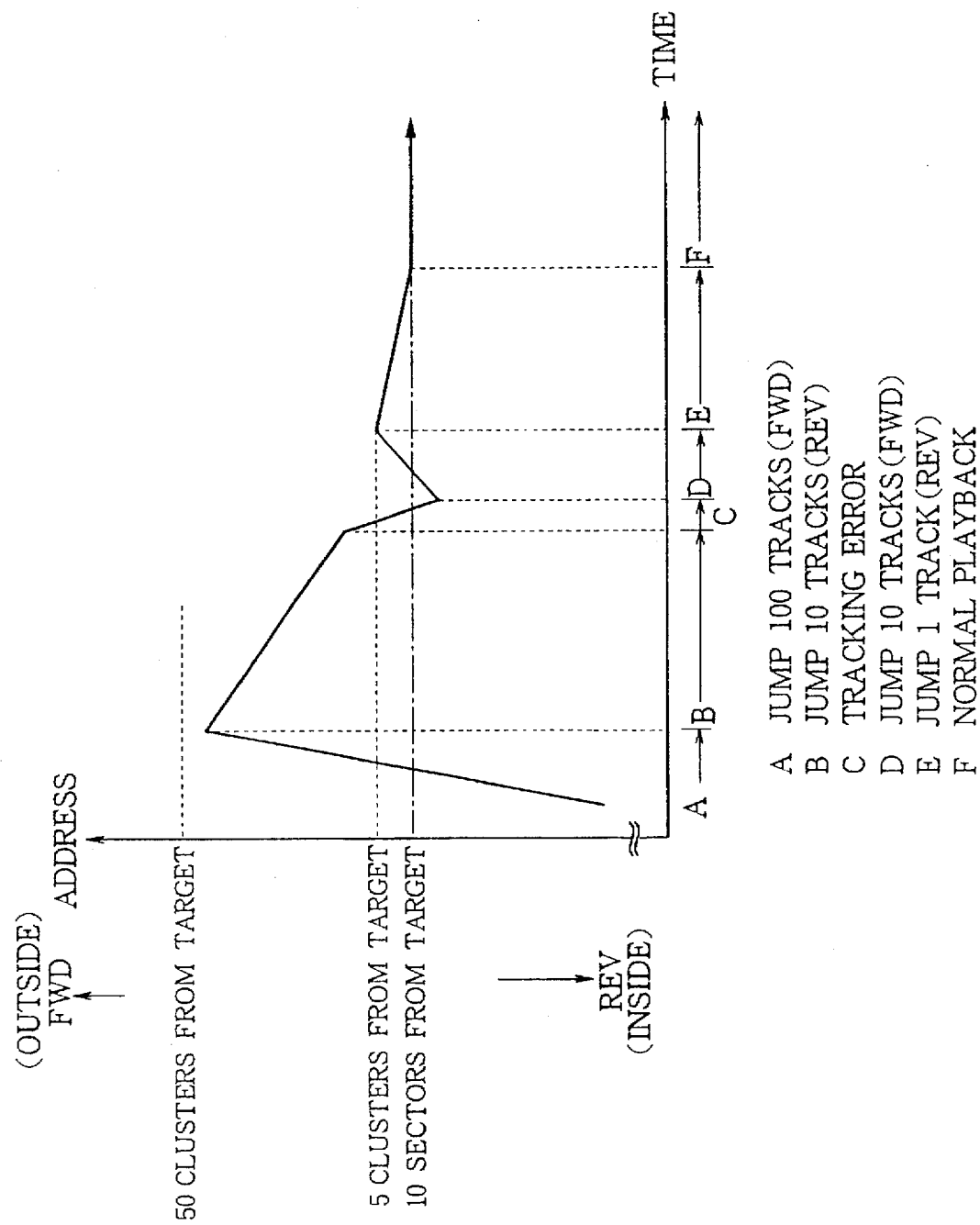
FIG. 19 is a graph indicating changes of beam spot position in the case of the disc apparatus in accordance with the tenth embodiment.

FIG. 19 is a graph indicating changes of the present address of the beam spot in the case of the disc apparatus of the tenth embodiment.

In area A of FIG. 19, the present address of the beam spot is not within the target program and has not passed the target starting address. Therefore, the beam spot jumps 100 tracks in the FWD direction (corresponding to steps 101, 102, 103 and 105 in FIG. 18). In area B, the present address of the beam spot is within the target program and within 50 clusters but not within 5 clusters from the target. Therefore, the beam spot jumps 10 tracks in the REV direction (corresponding to steps 101, 102, 106, 108 and 109 in FIG. 18). In area C, an external disturbance has been applied to the disc apparatus to cause tracking error. The present address of the beam spot has jumped to the inner circumference beyond the target starting address. In area D, since the present address of the beam spot is not within the target program and the beam spot has passed the target starting address, the beam spot jumps 10 tracks which is the same as the tracks at the immediately previous track jump in the direction of the target address (FWD direction in this case) (corresponding to steps 101, 102, 103 and 104 in FIG. 18). In area E, the present address of the beam spot is within 5 clusters of the target and the beam spot jumps 1 track at a time in the REV direction (corresponding to steps 101, 102, 106, 108 and 110–112 in FIG. 18). In area F, the present address of the beam spot is within 10 sectors of the start address of the target program and the beam spot scans the track and normal playback operation begins.

In the above manner, in accordance with the tenth embodiment, as the beam spot position approaches the target starting address, the track jump amount is reduced. In this manner, since movement of the optical head 202 decelerates as the the beam spot approaches the target starting address, excess movement of the optical head 202 due to inertia is reduced and cueing operation can be speeded.

Figure 58:
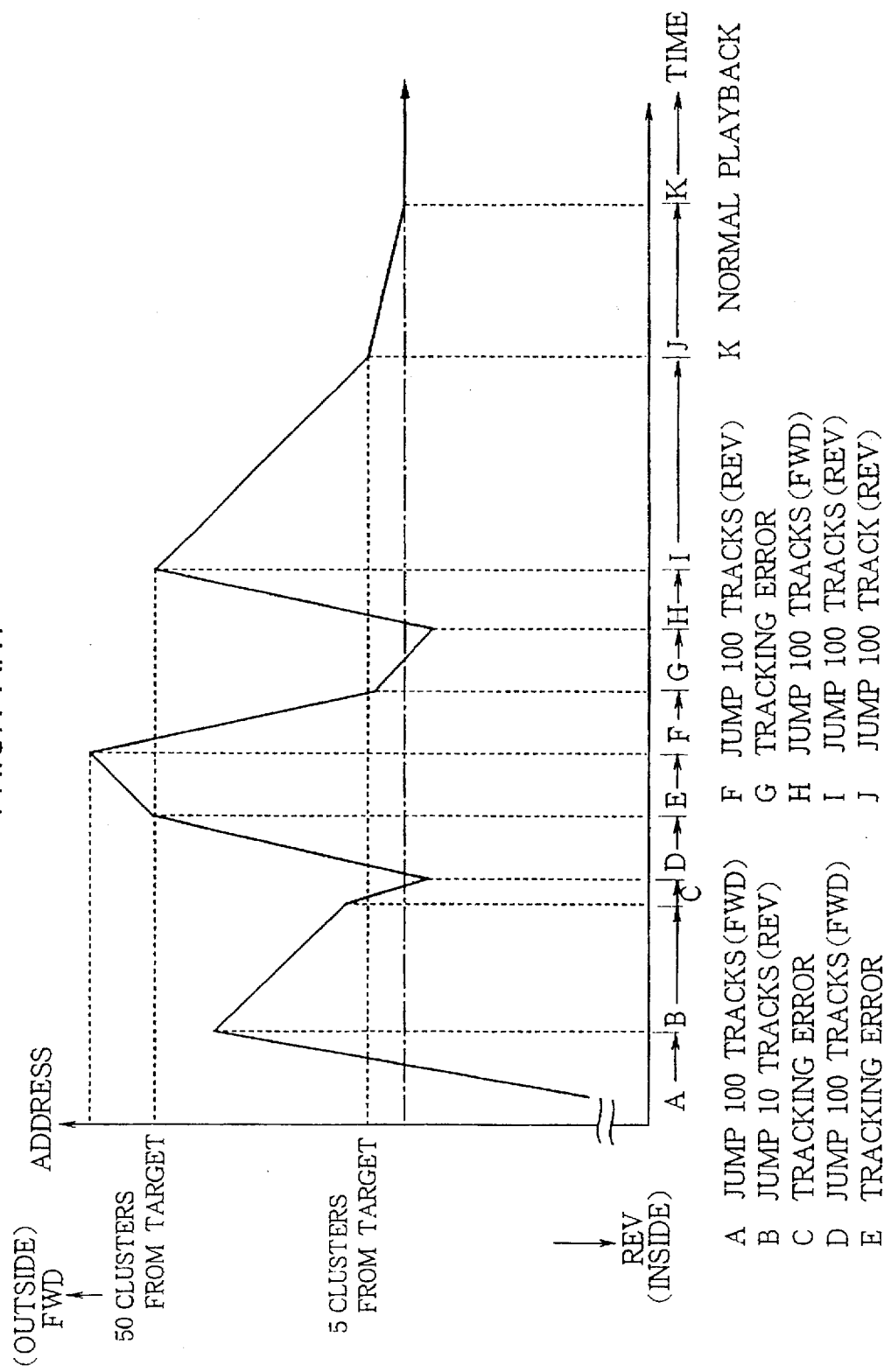
FIG. 58 is a graph indicating change of beam spot position with respect to time in the case of the disc apparatus of FIG. 54.
Figure 59:
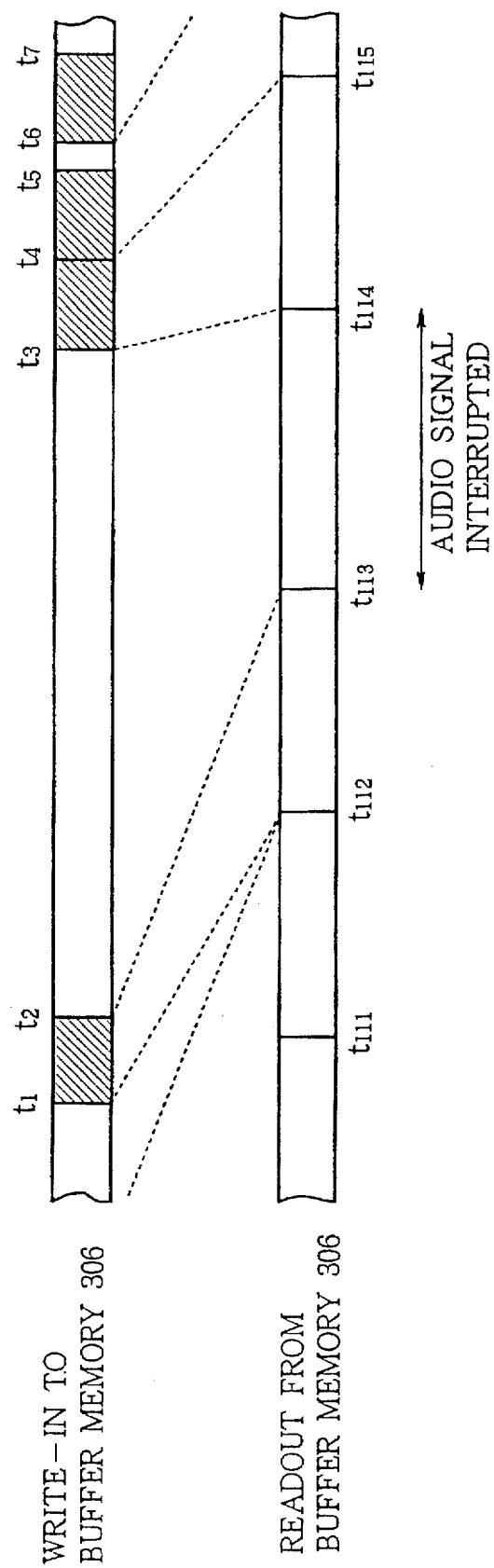
FIG. 59 is a descriptive drawing indicating intermittent data write-in to the buffer memory and data readout from the buffer memory in the case of a conventional disc apparatus.
Figure 60:
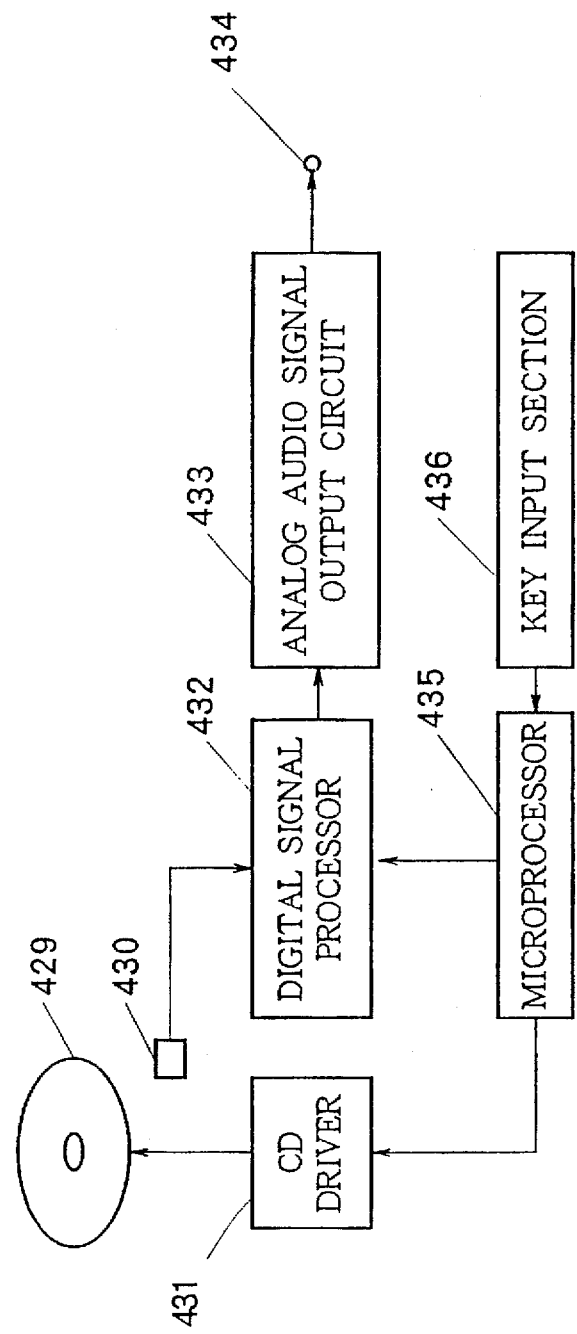
FIG. 60 is a block diagram indicating compositions of a conventional disc apparatus (CD playback apparatus).

In the case of a conventional disc apparatus indicated in FIG. 54, although when tracking error occurs (area C in FIG. 58), the beam spot jumps 100 tracks in the FWD direction (area D in FIG. 58), in the case of the tenth embodiment, when tracking error occurs (area C in FIG. 19), the beam spot jumps 10 tracks equal to the immediately previous track jump (area B in FIG. 19) in the FWD direction (area D in FIG. 19).

In this manner, by taking into consideration the principle that if the track jump quantity is large (i.e., moving speed is high), the tracking error resulted from excess movement of the optical head 202 due to inertia is increased, and if the track jump quantity is low (i.e., moving speed low), the tracking error resulted from the excess movement is low, the track jump quantity following a tracking error occurrence that passes the target starting address is made equal to the immediately previous track jump quantity due to the tracking error. Consequently, in case of the tenth embodiment, the tracking operation can be speeded even when tracking error occurs.

Although the above description referred to track jump quantities selected from 100, 10 and 1 tracks, the track quantities are not limited to these values and different track quantities can be used. Also the track quantities are not limited to 3 values.

Also, although the above description referred to the conditions, for example, within 50 clusters or within the 5 clusters, these are not limited to these values.

Also, although the above description referred to the final track jump point as within 10 sectors prior to the target starting address, it is not limited to this value and another value can be used.

Eleventh Embodiment

Figure 20:
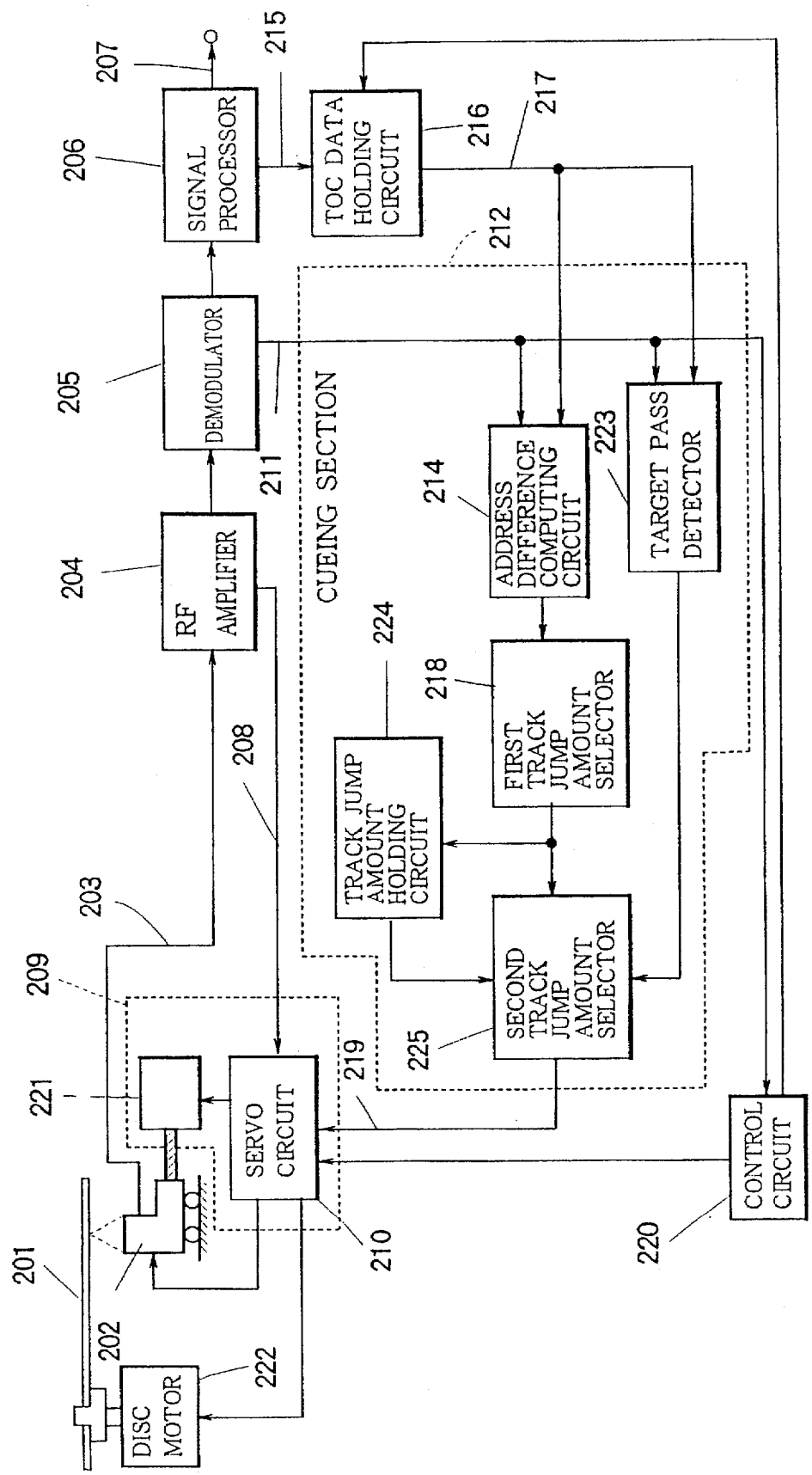
FIG. 20 is a block diagram indicating compositions of a disc apparatus in accordance with an eleventh embodiment of the present invention.

FIG. 20 is a block diagram indicating compositions of a disc apparatus in accordance with an eleventh embodiment of the present invention.

In the disc apparatus of the eleventh embodiment, the compositions and operation of the cueing section 212a differ from those of the cueing section 212 in the conventional disc apparatus indicated in FIG. 54. Since compositions otherwise are the same as those of the disc apparatus of the FIG. 54, the same symbols are assigned to the compositions which are the same as or corresponds to those of FIG. 54 and description of other than the cueing section 212a is omitted in the following.

The cueing section 212a of the eleventh embodiment shifts the beam spot to the target starting address on the basis of the target address 217 from the TOC data holding circuit 216 and the present address 211 from the demodulator circuit 205. The cueing section 212 comprises an address difference computing circuit 214, a target pass detector circuit 225, a first track jump amount selector circuit 218, a track jump amount holding circuit 224 and a second track jump amount selector circuit 225.

The address difference computing circuit 214 computes the address difference between the present address and the target starting address. The target pass detector circuit 223 detects whether or not the beam spot passes the target starting address during track jump.

The first track jump amount selector circuit 218 possesses a plurality of predetermined track jump amounts. As the address difference from the address difference computing circuit 214 decreases, the first track jump amount selector circuit 218 selects a smaller track jump amount from among the predetermined track jump amounts. The first track jump amount selector circuit 218 also obtains the track jump direction data from the address difference computing circuit 214. The track jump amount holding circuit 224 temporarily holds the track jump amount selected by the first track jump amount selector circuit 218.

The second track jump amount selector circuit 225 sends the output of the track jump amount holding circuit 224 to the servo circuit 210 of the position determining section 209, when the target pass detector circuit 223 detects that the beam spot has passed the target starting address. Also, when the target pass detector circuit 223 detects that the beam spot has not passed the target starting address, the second track jump amount selector circuit 225 sends the output of the first track jump amount selector circuit 218 to the servo circuit 210 of the position determining section 209.

Figure 21:
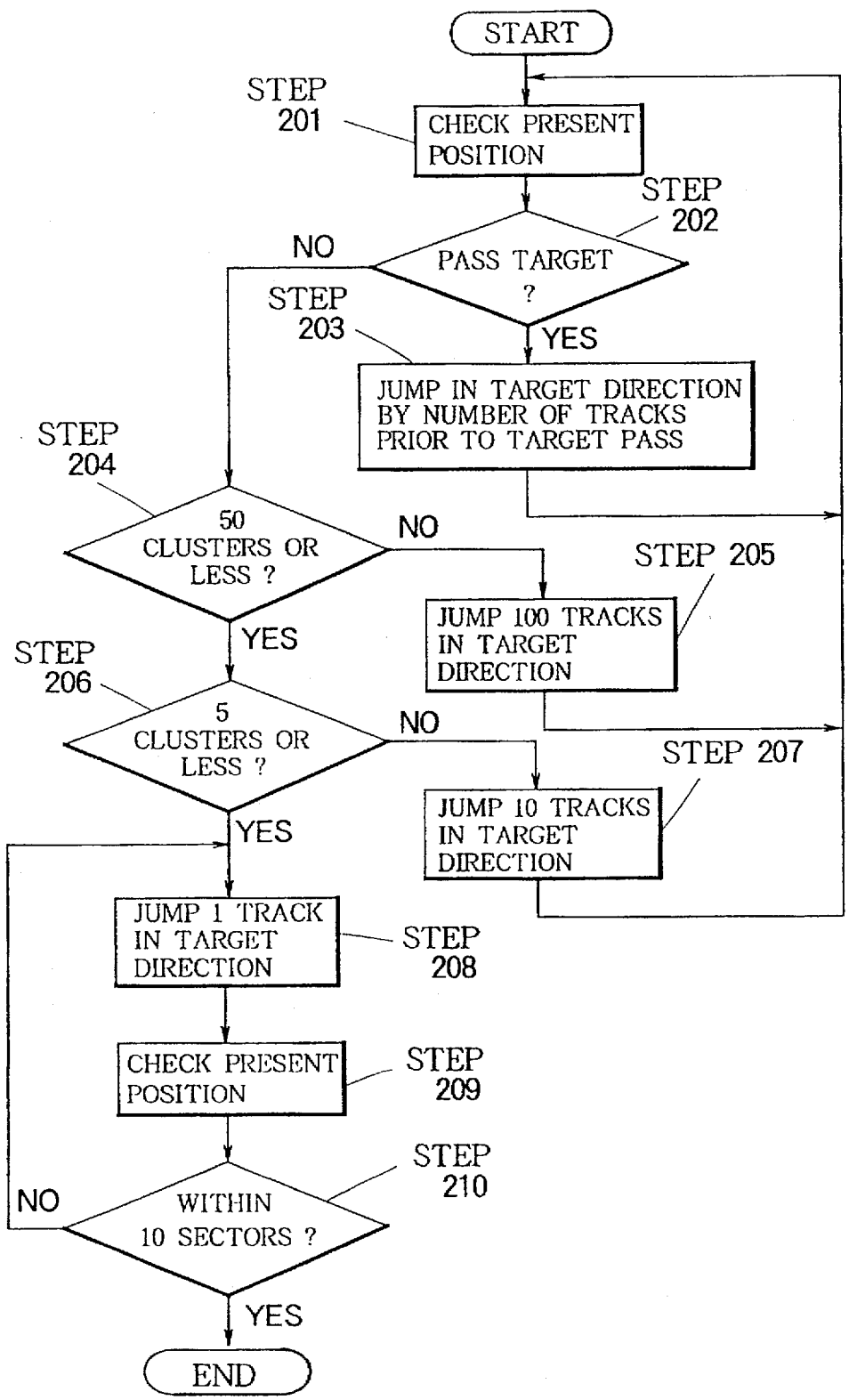
FIG. 21 is a flowchart indicating the cueing process in the case of the disc apparatus in accordance with the eleventh embodiment.

FIG. 21 is a flowchart indicating cueing process of the tenth embodiment.

As indicated in FIG. 21, the address difference computing circuit 214 computes the address difference between the present address and the target starting address to check the present address (or position) of the beam spot (step 201). Whether or not the beam spot has passed the target starting address is then judged (step 202). If the target starting position was passed by the beam spot, the beam spot jumps in accordance with a command from the cueing section 212a in the direction of the target starting address (abbreviated as target direction in the figure) by only the same number of tracks as those immediately prior to passing the target starting address (step 203) and return to step 201. If the target starting address was not passed (step 203), the cueing section 212a determines whether or not the address difference computed by the address difference computing circuit 214 is within 50 clusters (step 204). If the address difference is greater than 50 clusters, the beam spot jumps 100 tracks in the direction of the target address starting (step 205) and return to step 201.

If the address difference is within than 50 clusters, the cueing section 202a determines whether or not the address difference is within 5 clusters (step 206). If the address difference is greater than 5 clusters, the beam spot jumps 10 tracks in the direction of the target starting address (step 207) and return to step 201. If the address difference is within 5 clusters (step 206), the beam spot jumps 1 track in the direction of the target starting address (step 208).

The cueing section 212a checks the present address of the beam spot (step 209) and determines whether or not it is within 10 sectors prior to the target starting address (abbreviated as target in the figure) (step 210). If separated by more than 10 sectors, repeat steps 208–210. If within 10 sectors prior to the target starting address, the cueing operation is complete.

Figure 22:
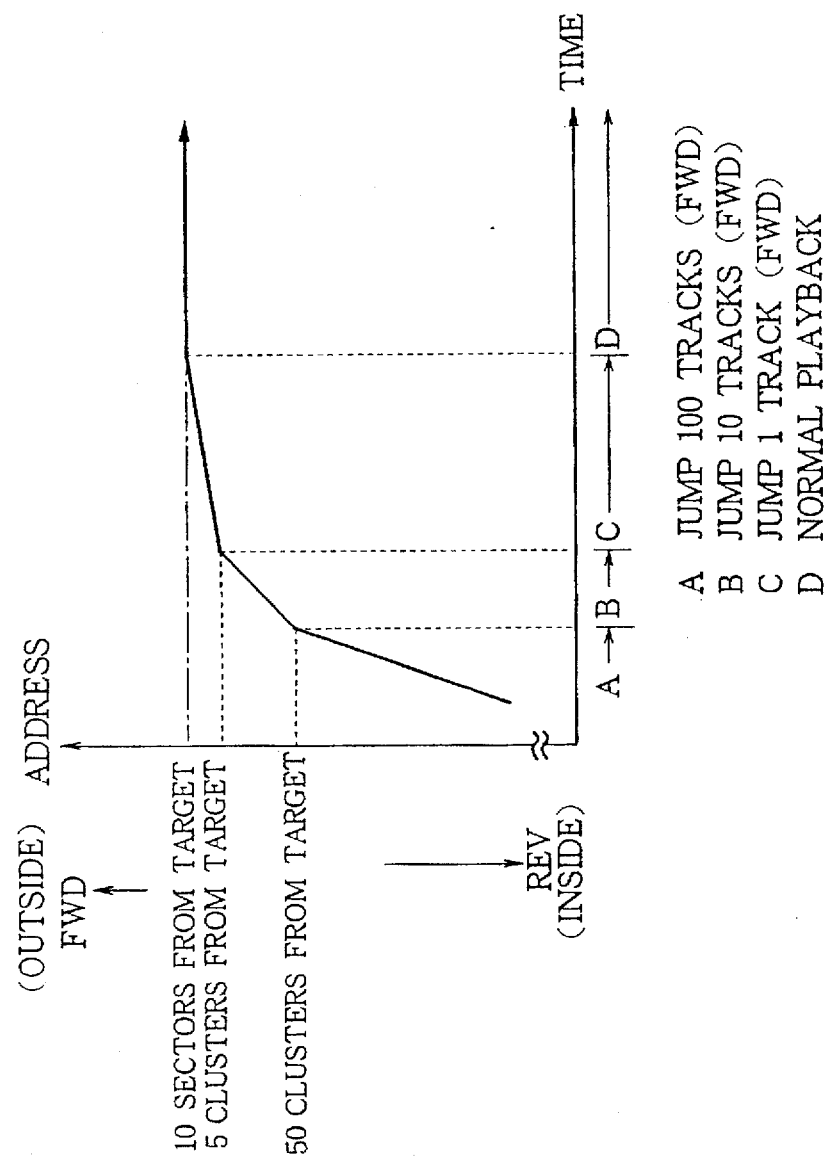
FIG. 22 is a graph indicating changes of beam spot position in the case of the disc apparatus of the eleventh embodiment.
Figure 23:
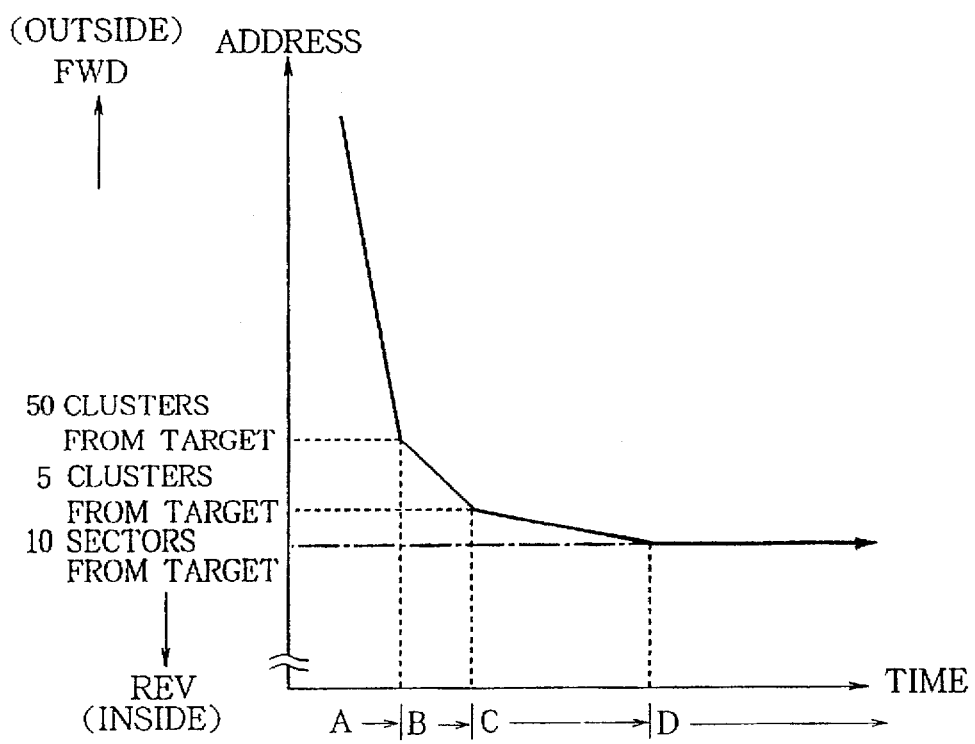
FIG. 23 is a graph indicating changes of beam spot position in the case of the eleventh embodiment.

FIGS. 22 and 23 are graphs indicating changes of the present address of the beam spot in the case of the eleventh embodiment. FIG. 22 indicates when the present address is initially at the inside of the target starting address, while FIG. 23 when the present address is initially at the outside of the target starting address.

In area A of FIG. 22, the present address of the beam spot is not within 50 clusters of the target starting address and the beam spot jumps 100 tracks in the direction of the target starting address (corresponding to steps 201, 202, 204 and 205 in FIG. 21). In area B of FIG. 22, the present address of the beam spot is within 5 clusters of the target starting address and the beam spot jumps 10 tracks in the FWD direction, i.e., the direction of the target starting address direction (corresponding to steps 201, 202, 204, 206 and 207 in FIG. 21). In area C of FIG. 22, the present address of the beam spot is within 5 clusters of the target starting address and the beam spot jumps 1 track in the FWD direction (corresponding to steps 201, 202, 204, 206 and 208–210 in FIG. 21). In area D, the present address of the beam spot is within 10 sectors from the start of the target program. The beam spot scans the track and normal playback operation is entered.

In area A of FIG. 23, the present address of the beam spot is not within 50 clusters of the target starting address and the beam spot jumps 100 tracks in the REV direction (corresponding to steps 201, 202, 204 and 205 in FIG. 21). In area B of FIG. 23, the present address of the beam spot is within 50 clusters, but not within 5 clusters, of the target starting address and the beam spot jumps 10 tracks in the REV direction (corresponding to steps 201, 202, 204, 206 and 207 in FIG. 21). In area C of FIG. 23, the present address of the beam spot is within 5 clusters of the target starting address and the beam spot jumps 1 track in the REV direction (corresponding to steps 201, 202, 204, 206 and 208–210 in FIG. 21). In area D, the present address of the beam spot position is within 10 sectors of the start of the target program. The beam spot scans the track and normal playback operation is entered.

In the above manner, in the case of a disc apparatus of the eleventh embodiment, as indicated in FIG. 22 or 23, whether the present address of the beam spot is at either the inside or outside of the target starting address, as the beam spot approaches the target starting address of the target program, the track jump amount is reduced. In this manner, as the beam spot approaches the target starting address, since the shift of the optical head 202 decelerates, the over-run of the optical head 202 due to inertia is reduced and cueing operation can be performed quickly.

Also, even when tracking error occurs, in the same manner as the tenth embodiment, since only the same number of tracks as the immediately previous track jump are jumped, tracking operation can be speeded.

Although the above description referred to track jump amounts selected from 100, 10 and 1 tracks, the track quantities are not limited to these values and different track quantities can be used.

Also, although the above description referred to 50 and 5 track jump clusters, these are not limited to these values.

Also, although the above description referred to the final track jump point as within 10 sectors prior to the target starting address, it is not limited to this value and another value can be used.

Twelfth Embodiment

Figure 24:
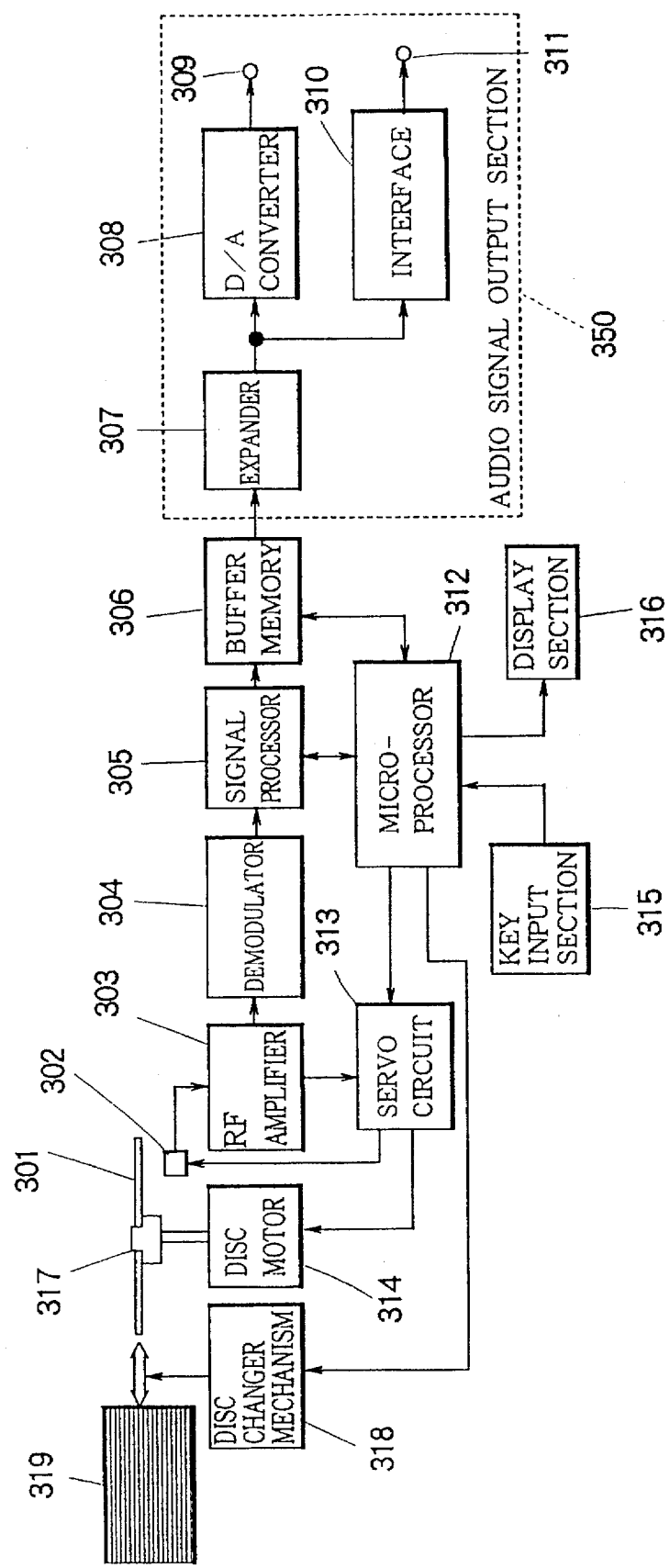
FIG. 24 is a block diagram indicating compositions of a disc apparatus (MD playback apparatus) in accordance with a twelfth embodiment of the present invention.

FIG. 24 is a block diagram indicating compositions of a disc apparatus (MD playback apparatus) in accordance with a twelfth embodiment of the present invention.

As indicated in FIG. 24, the disc apparatus of the twelfth embodiment comprises an optical pickup 302 for optically reading out data from a disc 301 as a data recording medium, for example, an opto-magnetic disc, an RF amplifier, a demodulator circuit 304, a signal processor circuit 305, a buffer memory 306 and an audio signal output section 350 for producing an audio signal output based on the data stored in the buffer memory 306. The audio signal output section 350 comprises an expander circuit 307, a D/A converter circuit 308, an analog audio output terminal 309, an interface circuit 310 and a digital audio output terminal 311.

The disc apparatus further comprises a microprocessor 312 for controlling an operation of the overall disc apparatus, a servo circuit 313, a disc motor 314, a key input section 315, a display section 316 and a turntable 317. In addition, the disc apparatus is provided with a disc loading section 319 for loading a plurality of discs and a disc changer mechanism 318 for exchanging the disc placed on the turntable 317 with the disc stored in the disc loading section 319.

The disc apparatus having the above mentioned compositions operates as follows. Laser light is emitted from the optical pickup 302 to the disc 301 and by detecting the reflected light, the optical pickup 302 reads out the data recorded on the disc 301. The optical pickup 302 converts the data into an electrical signal, which is amplified by the RF amplifier 303 and EFM or otherwise demodulated by the demodulator circuit 304 to return the original signal series. At the signal processor circuit 305, errors in the signal series are corrected utilizing an error correction code included in the signal series, and the signal series is rearranged by interleave processing, thereby restoring the original digital audio signal.

The output from the signal processor circuit 305 is temporarily stored in the buffer memory 306 and then sent to the expander circuit 307. The expander circuit 307 expands the audio signal encoded efficiently and restores the original audio signal. The restored audio signal is sent in one route via the D/A converter circuit 308 as the analog audio signal to the analog audio output terminal 309. In another route, the restored audio signal is sent via the interface circuit 310 to the digital audio output terminal 311 as the digital audio signal in accordance with the digital audio interface standard.

Figure 25:
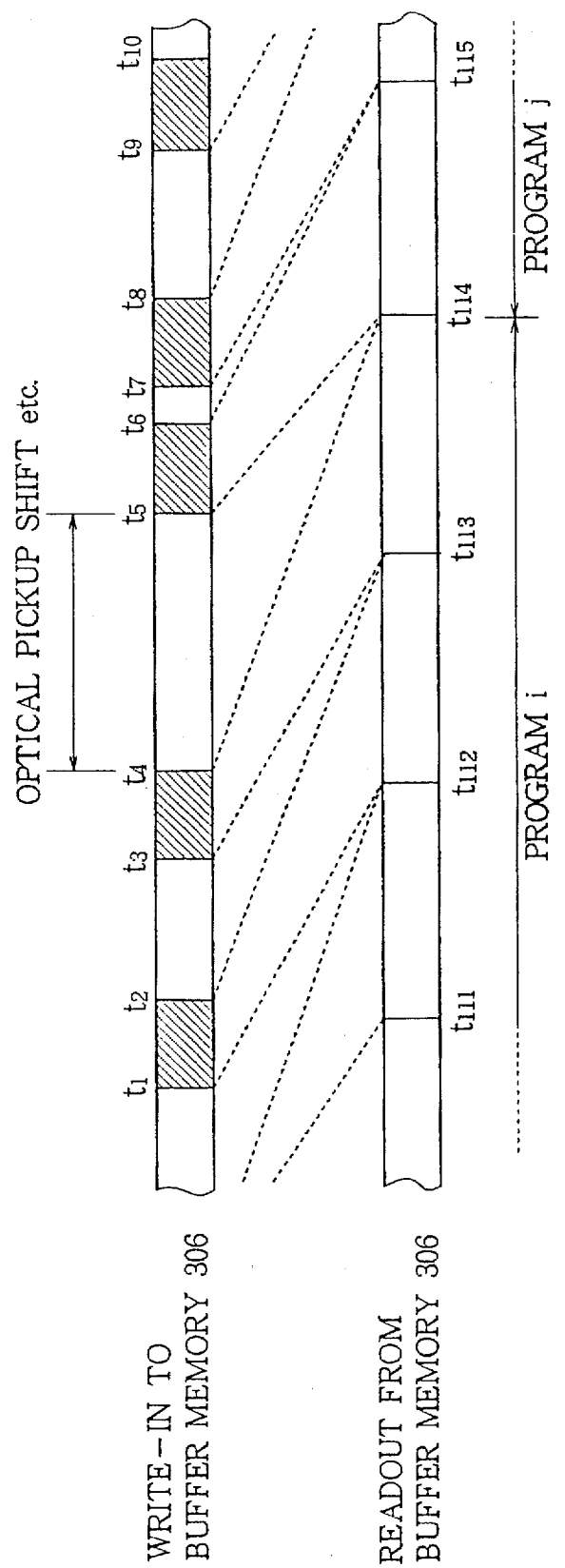
FIG. 25 is a descriptive drawing indicating intermittent data write-in to the buffer memory and data readout from the buffer memory in the case of the disc apparatus in accordance with the twelfth embodiment.

FIG. 25 is a descriptive drawing indicating the intermittent data write-in to the buffer memory 306 and the continuous data readout from the buffer memory 306.

When programmed so that a program j is to be played back after playback of a program i has been completed, as indicated in FIG. 25, data of program i are read out from the disc 301 and written into the buffer memory 306 between time points $t_1$ and $t_2$ and between time points $t_3$ and $t_4$, and then the data of program i are read out from the buffer memory 306 and sent as the audio signals to the audio output terminals 309 and 311 between time points $t_{112}$ and $t_{113}$ and between time points $t_{113}$ and $t_{114}$.

When the readout of the program i from the disc 301 is completed at time point $t_4$, the servo circuit 313 stops the readout from the disc 301 and shifts the optical pickup 302 to the beginning address of the program j. Data readout of the program j from the disc starts from time point $t_5$. Between time points $t_5$ and $t_6$, the audio data of the beginning portion in the program j are read out from the disc 301 and written into the buffer memory 306.

In the case of the disc apparatus of the twelfth embodiment, since the data of the program i remains in the buffer memory 306 while the data of the succeeding program j is read out (between time points $t_5$ and $t_6$) and the data of the succeeding program j are stored in the buffer memory 306 until the change of programs (time point $t_{114}$), the change from the program i to the program j can be made without interruption and a continuous audio signal output can be obtained from the audio output terminals 309 and 311.

As described above, as a result of the twelfth embodiment, when a continuous playback mode is selected, interruption between an initial program and a succeeding program can be eliminated and the programs can be played back continuously.

Thirteenth Embodiment

Although the disc apparatus of the twelfth embodiment has the function of switching of programs on a single disc without interruption, the disc apparatus of the thirteenth embodiment has a function of switching of programs on different discs without interruption.

With the exception of the function of the microprocessor 312, a disc apparatus of the thirteenth embodiment is the same as the disc apparatus of the twelfth embodiment indicated in FIG. 24. Therefore, the following description is in reference to FIGS. 24 and 25.

In the case of the disc apparatus of the thirteenth embodiment, when a program i and a program j are recorded on different discs, in accordance with a command from the microprocessor 312, immediately after the completion of write-in to the buffer memory 306 of data of the program i read out from the disc 302 (time point $t_4$), the disc changer mechanism 318 begins changing the disc on the turntable 317 and the optical pickup 302 begins shifting. Disc change and optical pickup 302 shift occur between time points $t_4$–$t_5$. Data readout from the separate disc program j by the optical pickup 302 and write into the buffer memory 306 begin from time point $t_5$.

In this manner, in the case of the disc apparatus of the thirteenth embodiment, the data of the program i remains in the buffer memory 306 between time points $t_4$–$t_5$. Since the data are stored in the buffer memory 306 until the change of programs (time point $t_{11}4$), the change from program i to program j can be made without interruption and even if the programs are recorded on different discs, a continuous audio signal output can be obtained from the output terminals 309 and 311.

Fourteenth Embodiment

The twelfth and thirteenth embodiments include the functions that allow continuous playback without interruption when the program is changed. In the case of the fourteenth embodiment, when the key input section 315 is operated to stop a program in progress and switch to another program, the programs can be played continuously without interruption between them.

Figure 26:
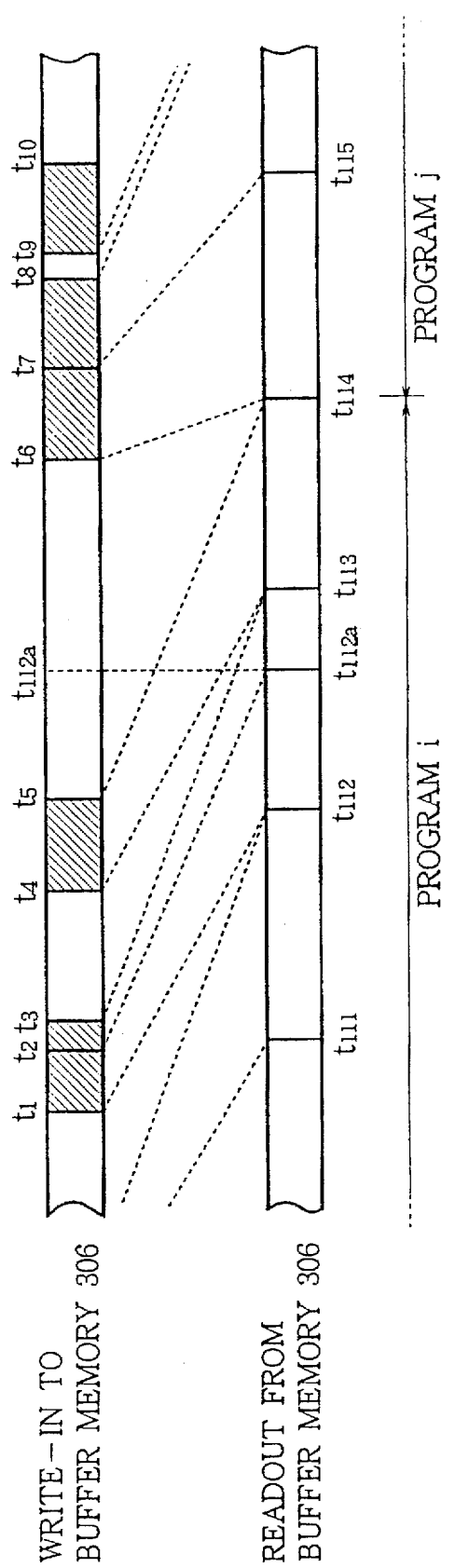
FIG. 26 is a descriptive drawing indicating intermittent data write-in to the buffer memory and data readout from the buffer memory in the case of the disc apparatus in accordance with the fourteenth embodiment.

With the exception of the function of the microprocessor 312, a disc apparatus of the fourteenth embodiment has the same compositions as that of the twelfth embodiment indicated in FIG. 24. Therefore, the following description is in reference to FIG. 24. Also, FIG. 26 is a descriptive drawing indicating the intermittent data write-in to the buffer memory 306 and the continuous data readout from the buffer memory 306.

For example, while a program i is being played back, when another program j on the same disc is selected from the key input section 315 (time point $t_{112a}$), data readout of the program i from the disc is immediately stopped and the optical pickup 302 is shifted to the starting address of the program j. At completion of preparation for reading out the program j (time point $t_6$), data of the program j begins to be read out from the disc. The audio data of the beginning portion of program j are written intermittently by predetermined periods ($t_6$–$t_7$, $t_7$–$t_8$ and $t_9$–$t_{10}$) into the buffer memory 306. The audio data of the program j begins to be read out when the audio data of the program i stored in the buffer memory 306 has been outputted (time point $t_{114}$).

In this manner, in accordance with the fourteenth embodiment, since the data of the program i remains in the buffer memory 306 during time period $t_5$–$t_6$ and until the change of program at time point $t_{114}$ the data of the next program j are stored in the buffer memory 306, the programs i and j can be played back continuously. Consequently, the program i is not stopped simultaneously with the playback command from the key input section (time point $t_{112a}$ in FIG. 26) as in the case of a conventional apparatus, but the audio signal of the programs i and j can be obtained continuously from the audio output terminals 309 and 311 as if the programs i and j are single one.

The above description referred to two programs recorded on the same disc, but these can also be recorded on different discs. For example, if the programs i and j are recorded on different discs, when the program j is selected from the key input section 315 while the program i is in progress, as indicated in FIG. 26, at time points $t_{112a}$–$t_6$, the disc is exchanged by the disc changer mechanism 318 and the optical pickup 302 is shifted. Data readout of the program j from the separate disc by the optical pickup 302 and write-in to the buffer memory 306 begins from time point $t_6$. In this manner, even if the selected program is on a different disc, a continuous playback audio output can be obtained without interruption between the programs.

Fifteenth Embodiment

In the twelfth and thirteenth embodiments, continuous playback of different programs is described. However, some users might be disturbed by a lack of clear differentiation between programs or discs. Therefore, in the case of a disc apparatus in accordance with the fifteenth embodiment, the outputs of a program i and a succeeding program j are not continuous, but a silent portion of only a predetermined period is provided between the programs i and j.

With the exception of a function of the microprocessor 312, a disc apparatus (MD playback apparatus) of the fifteenth embodiment has the same compositions as those of the twelfth embodiment indicated in FIG. 24. Therefore, the following description is in reference to FIG. 24. Also, FIG. 27 is a descriptive drawing indicating the intermittent data write-in to the buffer memory 306 and the continuous data readout from the buffer memory 306.

Figure 27:
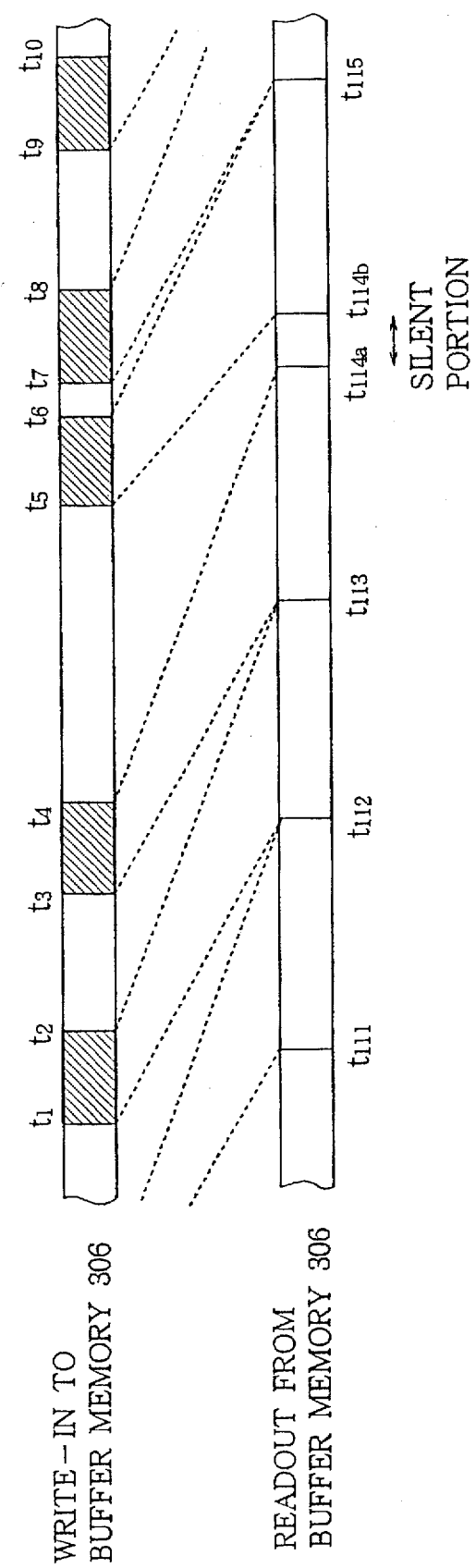
FIG. 27 is a descriptive drawing indicating intermittent data write-in to the buffer memory and data readout from the buffer memory in the case of the disc apparatus in accordance with the fifteenth embodiment.

As indicated in FIG. 27, when playback of a program i is completed (time point $t_{114a}$), data readout from the buffer memory 306 is temporarily stopped for only a predetermined period (between time points $t_{114a}$–$t_{114b}$). After this time (time point $t_{114b}$), data readout from the buffer memory 306 resumes. In this manner, a silent portion is produced between programs and the change of program can be discerned by the user.

If programs i and j are recorded on different discs, a silent portion can be provided in the same manner and the user can discern the change of disc.

Sixteenth Embodiment

Continuous playback of different programs was described for the twelfth and thirteenth embodiments. In accordance with the sixteenth embodiment, when the key input section 315 is operated to stop a program in progress and change to the next program, a predetermined silent portion is provided between the stopped program and the start of the next program.

Figure 28:
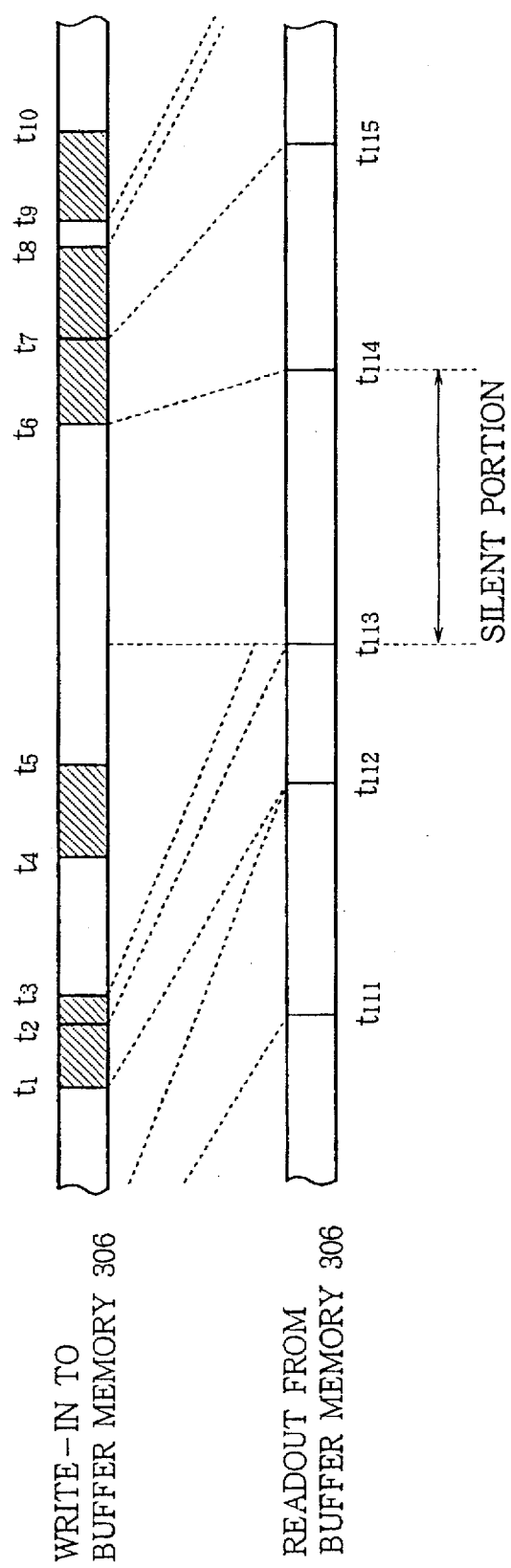
FIG. 28 is a descriptive drawing indicating intermittent data write-in to the buffer memory and data readout from the buffer memory in the case of the disc apparatus in accordance with the sixteenth embodiment.

With the exception of a function of the microprocessor 312, a disc apparatus (MD playback apparatus) of the sixteenth embodiment has the same compositions as those of the twelfth embodiment indicated in FIG. 24. Therefore, the following description is in reference to FIG. 24. Also, FIG. 28 is a descriptive drawing indicating the intermittent data write-in to the buffer memory 306 and the continuous data readout from the buffer memory 306.

For example, while a program i is in progress, when another program j on the same disc is selected for playback from the key input section 315 (time point $t_{113}$), the readout of the program i is stopped immediately and the optical pickup 302 is shifted to the starting address of the program j. At the end of readout preparation (time point $t_6$), the data readout of the program j from the disc 301 begins. The audio data of the beginning portion of the program j are read out intermittently for predetermined periods (time points $t_6$–$t_7$, $t_7$–$t_8$, and $t_9$–$t_{10}$) and written into the buffer memory 306. Data readout from the buffer memory 306 begins after a predetermined silent portion (time points $t_{113}$–$t_{114}$) has elapsed (from time point $t_{114}$).

In this manner, at time point $t_{113}$, although the data readout from the disc 301 during time periods $t_2$–$t_3$ and $t_4$–$t_5$ are held in the buffer memory 306, on the basis of a command from the microprocessor 312, the data readout from the buffer memory 306 and the audio signal data outputs from the output terminals 309 and 311 stop. Since this provides a silent portion directly after input from the key input section 315, the selection of a separate program can be discerned from the silent portion.

The above description referred to two programs recorded on the same disc, but these can also be recorded on different discs. For example, if the programs i and j are recorded on different discs, when the program j is selected from the key input section 315 while the program i is in progress, as indicated in FIG. 28, at time point $t_{113}$, the disc is exchanged by the disc changer mechanism 318 and the optical pickup 302 is shifted. Data readout from the separate disc program j by the optical pickup 302 and write-in to the buffer memory 306 begin from time point $t_6$.

In this manner, at time point $t_{113}$, although the data readout from the disc 301 during time periods $t_2$–$t_3$ and $t_4$–$t_5$ are held in the buffer memory 306, the data readout from the buffer memory 306 and the audio signal data outputs from the output terminals 309 and 311 stop. Since this provides a silent portion directly after input from the key input section 315, the selection of a separate program can be discerned from the silent portion.

Seventeenth Embodiment

In the case of a seventeenth embodiment, when a separate program or a separate program on a separate disc is selected from the key input section 315 immediately prior to the end of a program in progress, playback is not stopped immediately, but the audio output continues until the end of the program which is in progress. After the end of the program in progress, a silent portion is inserted, then playback of the next program begins.

With the exception of a function of the microprocessor 312, a disc apparatus (MD playback apparatus) of the seventeenth embodiment has the same compositions as those of the disc apparatus indicated in FIG. 24. Therefore, the following description is in reference to FIG. 24. Also, FIG. 29 is a descriptive drawing indicating the intermittent data write-in to the buffer memory 306 and the data readout from the buffer memory 306.

Figure 29:
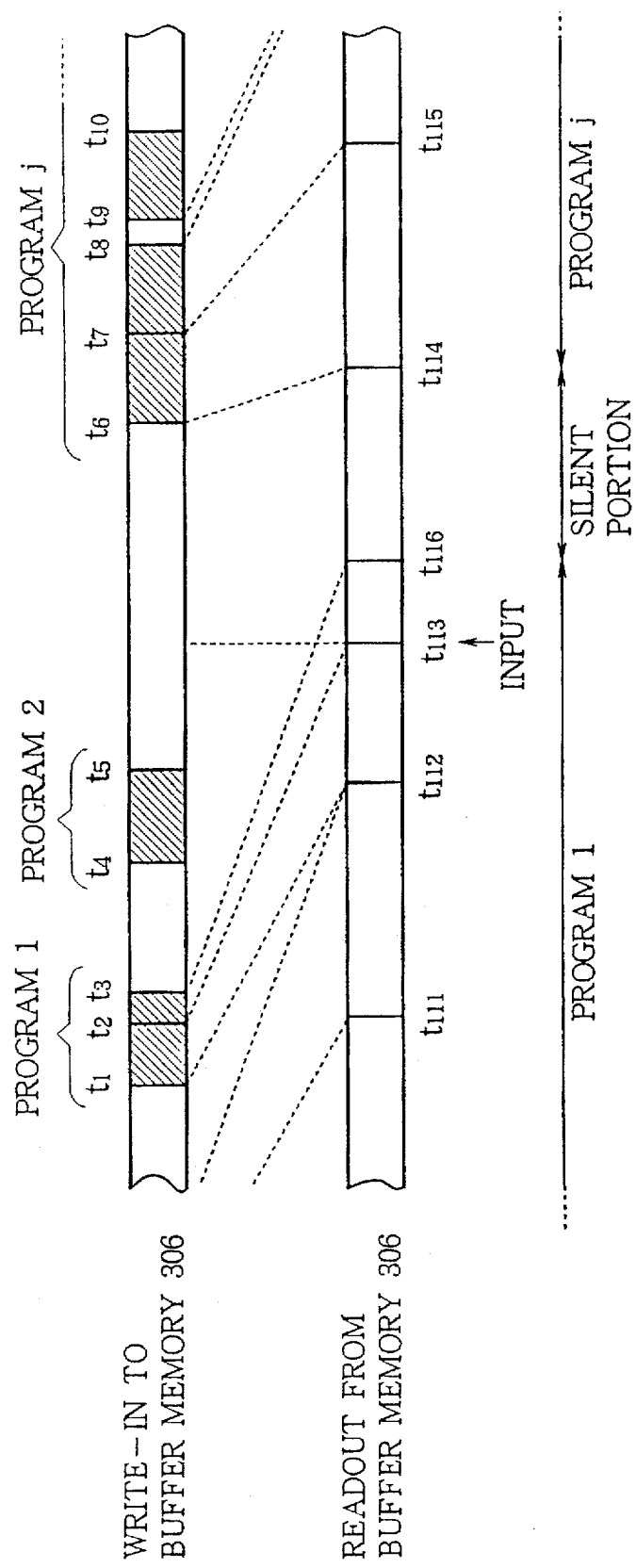
FIG. 29 is a descriptive drawing indicating intermittent data write-in to the buffer memory and data readout from the buffer memory in the case of the disc apparatus in accordance with the seventeenth embodiment.

As indicated in FIG. 29, for example, at time point $t_{113}$ while a program 1 is in progress, when a separate disc is selected from the key input section 315, the program 1 playback output does not immediately stop at time point $t_{113}$, but the final portion audio data already written into the buffer memory 306 (between time points $t_2$–$t_3$) are readout and sent as the audio signals to the output terminals 309 and 311.

As also indicated in FIG. 29, prior to the input from the key input section 315 (between time points $t_4$–$t_5$), the audio data of the beginning portion of program 2 are readout from the disc 301 and written into the buffer memory 306. However, in the case of the seventeenth embodiment, by a command from the microprocessor 312, simultaneously with the completion of program 1, readout from the buffer memory 306 is stopped, and a silent portion (between time points $t_{116}$–$t_{114}$) is produced in order not to obtain the audio signals from the audio data of the beginning portion of the program 2 at the output terminals 309 and 311. At time point $t_{113}$, the selected program j (either on the same disc or a different disc from the program 1) audio signal output begins. In this manner, not only is a silent portion produced between programs, but at the conclusion of the program 1, the output of the beginning portion of the program 2 is not produced, and after the silent portion, the output of the program j can begin.

Eighteenth Embodiment

In the twelfth and thirteenth embodiments, continuous playback of different programs is described. However, some users might be disturbed by a lack of clear differentiation between programs or discs. In the case of a disc apparatus in accordance with the eighteenth embodiment, a buzzer or other synthetic sound is provided between or overlapped at the transition of the programs i and j.

Figure 30:
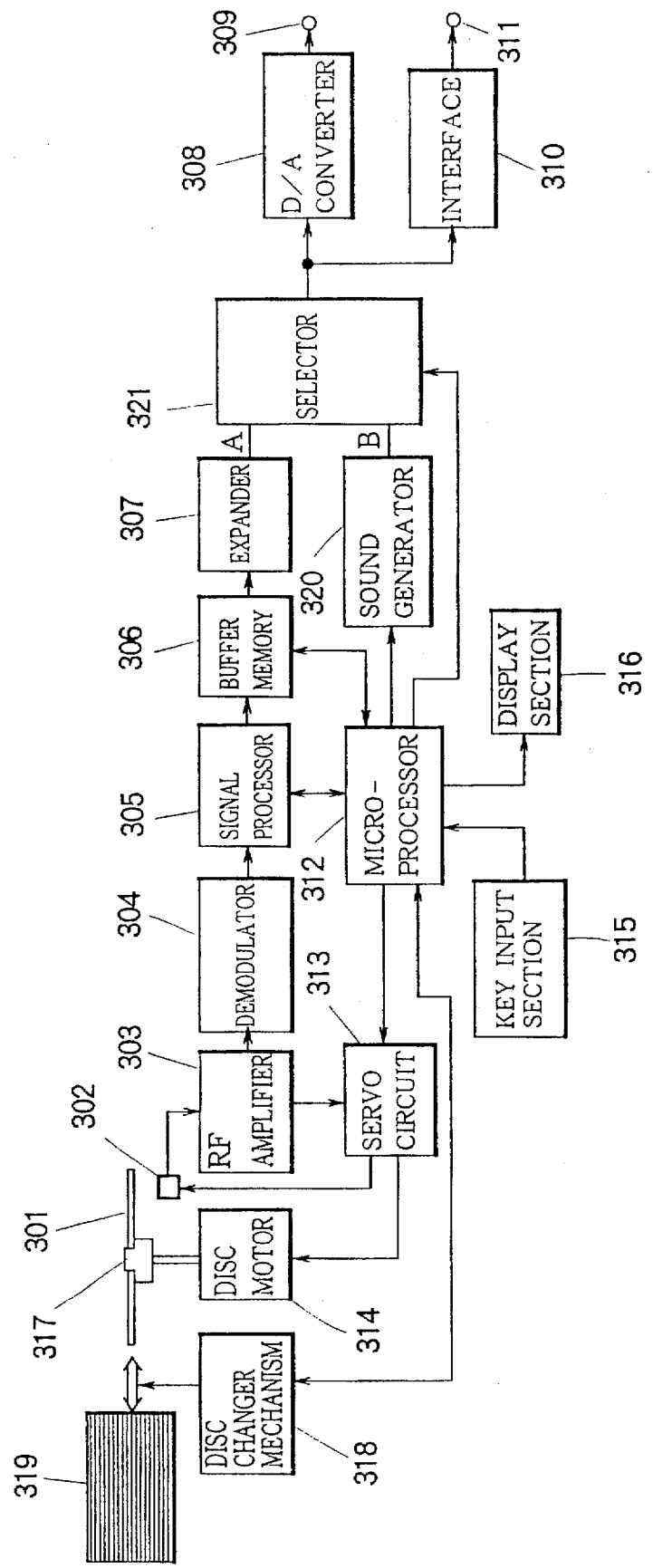
FIG. 30 is a block diagram indicating compositions of a disc apparatus (MD playback apparatus) in accordance with an eighteenth embodiment of the present invention.

FIG. 30 is a block diagram indicating compositions of a disc apparatus (MD playback apparatus) of the eighteenth embodiment of the present invention.

The eighteenth embodiment differs from the disc apparatus indicated in FIG. 24 by comprising an audio generator circuit 320 for generating a buzzer or other audio signal and a switching circuit 321 for switching between the audio signal based on the data read out from the disc 301 and the audio signal produced by the audio generator circuit 320 for sending to the audio output terminals 309 and 311. Also, a function of the microprocessor is different from that of FIG. 24. Other aspects of the eighteenth embodiment are the same as that of FIG. 24. Thus the same symbols are assigned to the compositions which is the same as or corresponds to those of FIG. 24 and their descriptions are omitted below.

The following description is in reference to FIGS. 25 and 27, which indicated intermittent data write-in to the buffer memory 306 and data readout from the buffer memory 306. The silent portion indicated in FIG. 27 corresponds to the buzzer or other synthesized sound sent from the audio generator circuit 320 via the switching circuit 321 to the output terminals 309 and 310.

In this manner, a buzzer or other output can be produced at the transition between programs and the user can discern the change of programs.

If the programs i and j are recorded on different discs, the buzzer or other sound output can be produced in the same manner and the user can discern the change of discs.

Although the above description referred to stopping the readout from the buffer memory 306 and producing only the audio signal output from the audio generator circuit 320 between time points $t_{114a}$–$t_{114b}$, as indicated in FIG. 25, it is also acceptable to overlap a synthesized sound on the continuous audio signal output from the disc 301 prior to the change of programs. Also, for example, as indicated in FIG. 25, it is acceptable to overlap the synthesized sound on the program for only a predetermined time after the program changing time point $t_{114}$ during continuous output of programs i and j.

Nineteenth Embodiment

With the exception of a control function of the microprocessor 312, the compositions of the nineteenth embodiment is the same as those of the disc apparatus indicated in FIG. 30. Therefore, the following description is in reference to FIG. 30.

The operation of the disc apparatus of the nineteenth embodiment differs from that of the sixteenth embodiment in the following respects. In the case of the sixteenth embodiment, by the key input section 315, when a program in progress is stopped and the next program is selected, a silent portion of a predetermined period is produced between the stopped program and the start of the next program. In the nineteenth embodiment, this silent portion corresponds to the buzzer or other synthesized sound output. Therefore, the description is also in reference to FIG. 28.

In this manner, a buzzer or other output can be produced at the transition between programs and the user can discern the change of programs.

If the programs i and j are recorded on different discs, the buzzer or other sound output can be produced in the same manner and the user can discern the change of discs.

Although the above description referred to stopping the readout from the buffer memory 306 and producing only the audio signal output from the audio generator circuit 320 between time points $t_{113}$–$t_{114}$, as indicated in FIG. 25, it is also acceptable to overlap a synthesized sound on the continuous audio signal output from the disc 301 prior to the change of programs. Also, for example, as indicated in FIG. 25, it is acceptable to overlap the synthesized sound on the program for only a predetermined time after the program changing time point $t_{114}$ during continuous output of programs i and j.

Twentieth Embodiment

Figure 31:
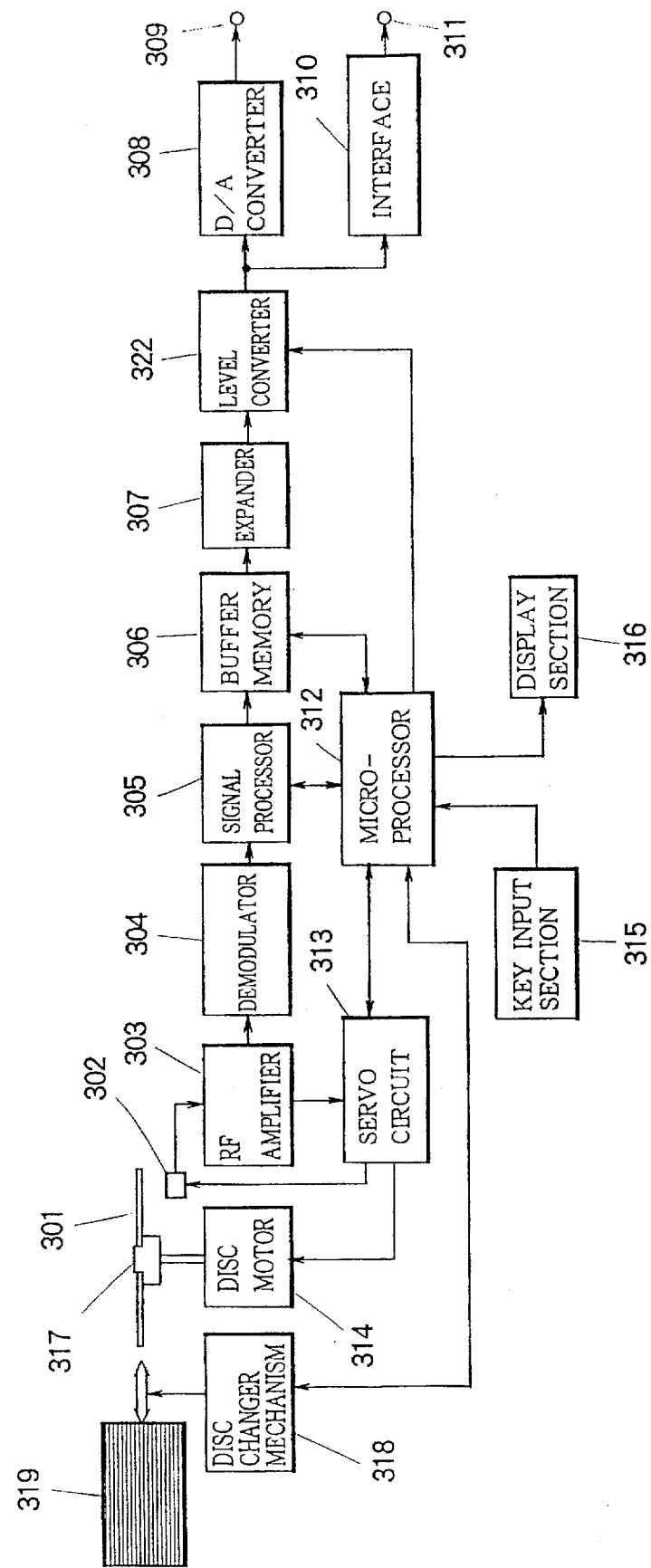
FIG. 31 is a block diagram indicating compositions of a disc apparatus (MD playback apparatus) in accordance with a twentieth embodiment of the present invention.

FIG. 31 is a block diagram indicating compositions of a disc apparatus (MD playback apparatus) in accordance with a twentieth embodiment of the present invention.

The twentieth embodiment differs from the disc apparatus indicated in FIG. 24 by including a level converter circuit 322 for changing the output level of the audio signal outputted from the expander circuit 307 and differing control functions of the microprocessor 312. The same symbols are assigned to the compositions which are the same as or corresponds to those of FIG. 24 and their descriptions are omitted.

In the case of the disc apparatus of the twentieth embodiment, in accordance with commands from the microprocessor 312, for example, the level converter circuit 322 gradually reduces the audio signal from time point $t_{112a}$ indicated in FIG. 26, and when programs are continuously changed, the audio signal level is raised from time point $t_{114}$, thereby rendering extraneous sound produced at time point $t_{114}$ inaudible.

If the programs are recorded on different discs, the audio signal level can be reduced in the same manner.

Also, when a desired playback program is selected from the key input section 315, the audio signal level can be reduced in the same manner.

Twenty-first Embodiment

With the exception of the level change process by the level converter circuit 322, compositions of the twenty-first embodiment is the same as those of the twentieth embodiment indicated in FIG. 31.

According to the twenty-first embodiment, while a program is being played back, when another program on the same or a different disc is selected for playback, the playback audio output level is reduced in step fashion. For example, in FIG. 26, when a program i is being played, and a program j is selected from the key input section 315 (time point $t_{112a}$), although the audio signal output of program i stored in the buffer memory 306 continues between time points $t_{113}$–$t_{114}$, the level converter circuit 322 reduces the audio signal by e.g., 3 dB. In this manner, since the audio signal level is reduced at time point $t_{113}$, the key input registration can be confirmed from the sound, while playback audio interruption can be prevented and extraneous sound can be rendered inaudible.

Twenty-second Embodiment

Figure 32:
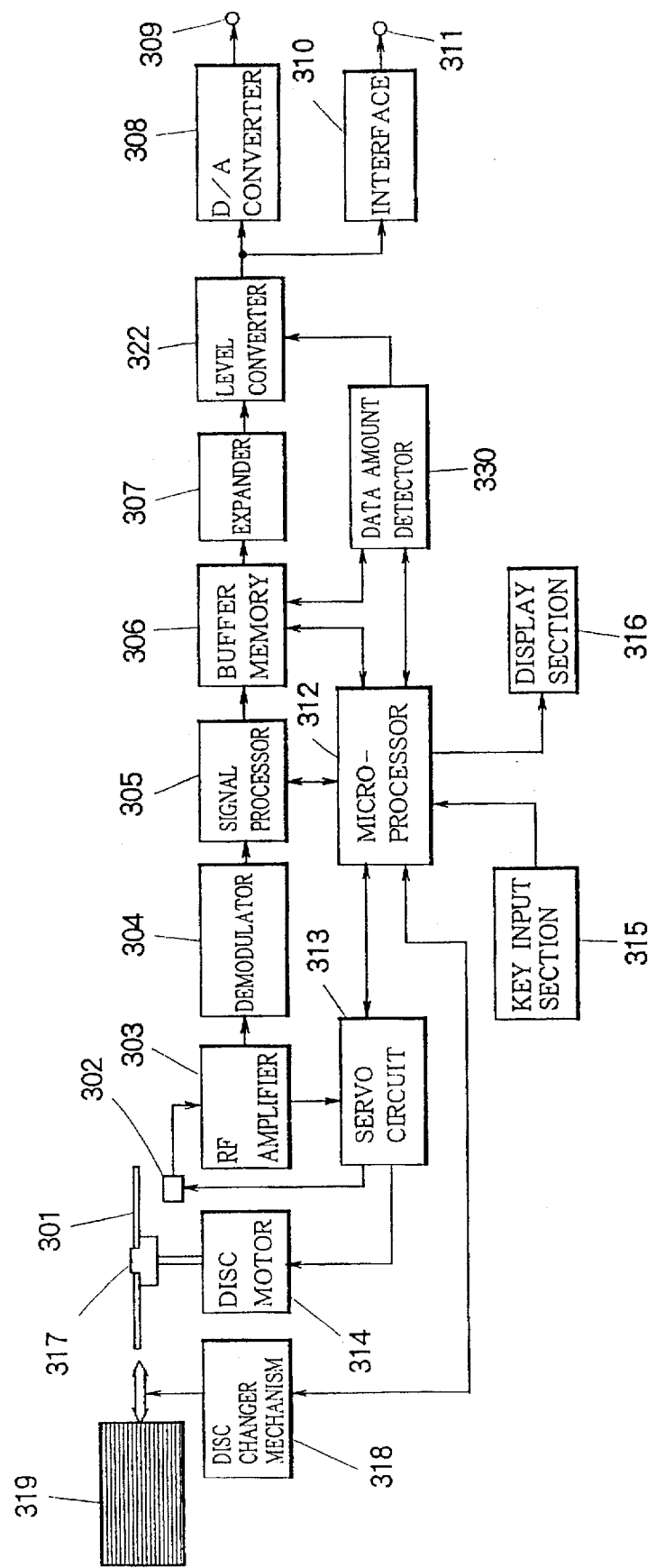
FIG. 32 is a block diagram indicating compositions of a disc apparatus (MD playback apparatus) in accordance with a twenty-second embodiment of the present invention.

FIG. 32 is a block diagram indicating compositions of a disc apparatus (MD playback apparatus) in accordance with a twenty-second embodiment of the present invention.

In the case of the twenty-second embodiment, a data amount detector circuit 330 detects the amount of data in the buffer memory 306. When this detected data amount declines below a predetermined lower limit, a level converter circuit 322 varies the output level of the audio signal from the expander circuit 307. Only these points and the functions of the microprocessor 312 differ from the disc apparatus indicated in FIG. 24. Consequently, regarding aspects other than these, the same symbols as those in FIG. 24 are used in FIG. 32 and their descriptions are omitted.

Figure 33:
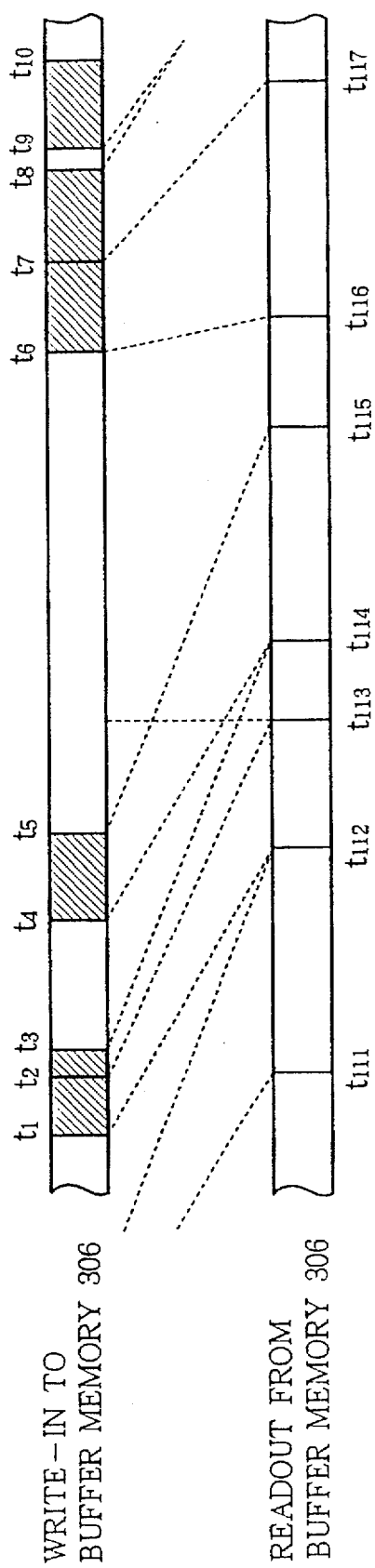
FIG. 33 is a descriptive drawing indicating intermittent data write-in to the buffer memory and data readout from the buffer memory in the case of the disc apparatus in accordance with the twenty-second embodiment.

FIG. 33 is a descriptive drawing indicating the operation of the disc apparatus of the twenty-second embodiment. FIG. 33 indicates that the project j is selected from the key input section 315 at time point $t_{113}$, the audio signal output is obtained from the output terminals 309 and 311 until time point $t_{115}$, the program i signal ceases and the audio signal output is stopped due to a trouble, and the audio output of the next program j begins at time point $t_{116}$.

In this case, an abnormal sound can occur at time point $t_{115}$. However, in the twenty-second embodiment, since when the data amount detector circuit 330 detects the data amount of the buffer memory 306 has declined below a predetermined lower limit, the audio signal level is gradually reduced from, for example, immediately before time point $t_{115}$ indicated in FIG. 33, the occurrence of abnormal sound at time point $t_{115}$ is not a significant problem.

Although the above description referred to gradually reducing the audio signal level, it is also acceptable to reduce the audio signal level in step fashion to a fixed level just prior to time point $t_{115}$.

Twenty-third Embodiment

Figure 34:
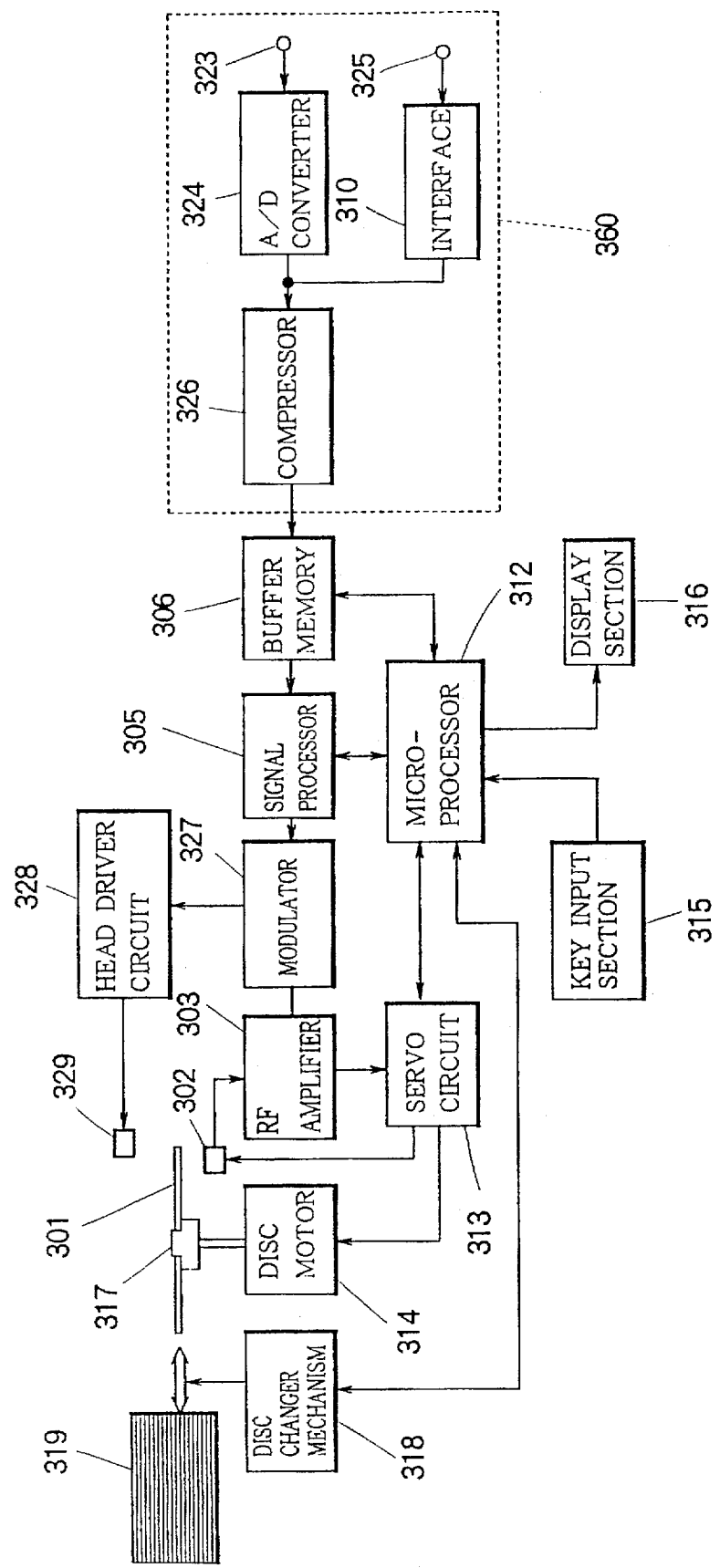
FIG. 34 is a block diagram indicating compositions of a disc apparatus (MD recording apparatus) in accordance with a twenty-third embodiment of the present invention.

FIG. 34 is a block diagram indicating compositions of a disc apparatus (MD recording apparatus) in accordance with a twenty-third embodiment of the present invention.

As indicated in FIG. 34, the disc apparatus comprises an optical pickup 302, an RF amplifier 303, a modulator circuit 327, a signal processor circuit 305, a buffer memory 306, a magnetic head 329 for recording data on the disc 301 and a head drive circuit 328 for driving the magnetic head 329 and an audio data input section 360. The audio data input section 360 comprises a compressor circuit 326, an A/D (analog to digital) converter circuit 324, an analog audio input terminal 323, an interface circuit 310 and a digital audio input terminal 325.

The disc apparatus further comprises a microprocessor 312 for controlling an operation of the overall apparatus operation, a servo circuit 313, a disc motor 314, a key input section 315, a display section 316 and a turntable 317. The disc apparatus also includes a disc loading section 319 for loading a plurality of discs and a disc changer mechanism 318 for exchanging a disc placed on the turntable 317 with on of the discs stored in the disc loading section 319.

The disc apparatus having the above compositions records data on the disc 301 in the following manner. A analog audio input signal inputted from the analog audio input terminal 323 is converted into digital form by the A/D converter circuit 324 and applied to the compressor circuit 326. If a digital audio input signal is supplied to the digital audio input terminal 325, this is sent via the interface circuit 310 to the compressor circuit 326.

The compressor circuit 326 selects the audio signal from either the analog audio input terminal 323 or the digital audio input terminal 325 and compresses the signal to yield the audio signal having a high efficiency encoded time series. The audio data obtained from the compressor circuit 326 are temporarily stored in the buffer memory 306, applied interleave processing in the signal processing circuit 305, added the error correction code for correcting data error, EFM modulated at the modulator circuit 327 and sent via the head drive circuit 328 to the magnetic head 329. The magnetic head 329 records the magnetic audio data by opto-magnetic recording on the portion of the disc 301 illuminated by laser light from the optical pickup 302.

Figure 35:
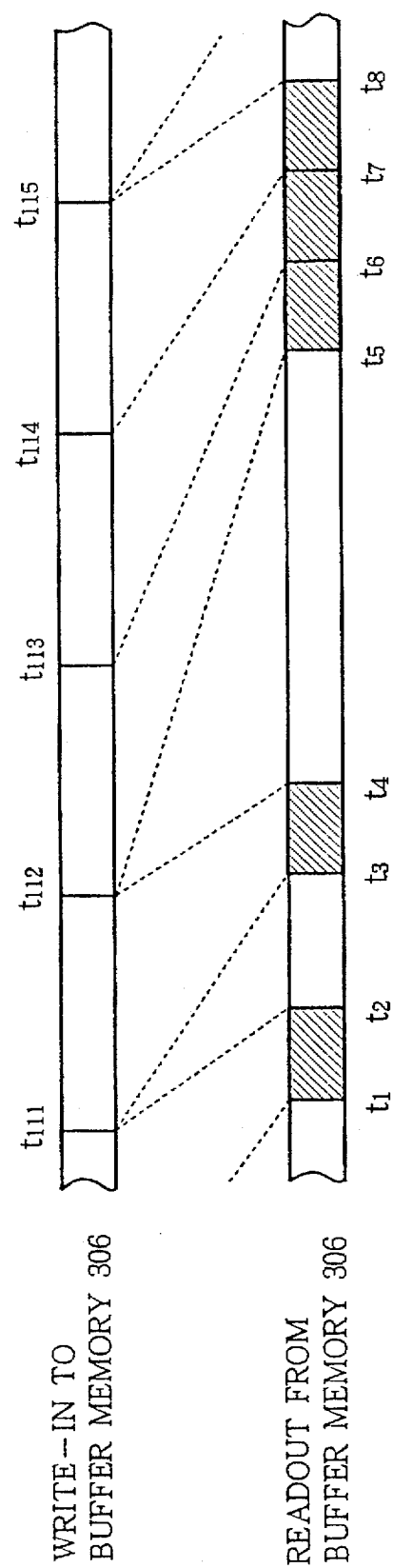
FIG. 35 is a descriptive drawing indicating continuous data write-in to the buffer memory and intermittent data readout from the buffer memory in the case of the disc apparatus in accordance with the twenty-third embodiment.

FIG. 35 is a descriptive drawing indicating the data recording operation.

As indicated in FIG. 35, by using the compressor circuit 326 and buffer memory 306, the continuous audio data input is recorded intermittently on the disc 301. The audio data input during time period $t_{111}$–$t_{112}$ is written into the buffer memory 306 and read out from the buffer memory during time period $t_3$–$t_4$ for recording on the disc 301. Similarly, the audio data input during time period $t_{112}$–$t_{113}$ is written into the buffer memory 306 and read out from the buffer memory during time period $t_5$–$t_6$ for recording on the disc 301, and the audio data input during time period $t_{113}$–$t_{114}$ is written into the buffer memory 306 and read out from the buffer memory during time period $t_6$–$t_7$ for recording on the disc 301. In this manner, in the case of recording data on an MD for example, approximately 74 minutes of continuous audio can be recorded.

Also, by using the buffer memory 306 and exchanging the disc 301 on the turntable 317 with a disc contained in the disc loading section 319 by the disc changer mechanism 318 during the time readout from the buffer memory 306 is stopped (between time points $t_4$–$t_5$ in FIG. 35), continuous audio data can be recorded on a plurality of discs 301. Consequently, for example, in FIG. 35, when the audio data up to time point $t_{112}$ to be recorded on a first disc are written into the buffer memory 306 and at time point $t_4$ the disc 301 recording area is filled, further recording becomes impossible. In accordance with a microprocessor 312 command, the disc changer mechanism 318 exchanges the disc 301 in time period $t_4$–$t_5$ and sets the next disc 301 on the turntable 317. During the disc exchange, the input audio data are temporarily held in the buffer memory 306 and after recording is enabled at time point $t_5$, the audio data subsequent to time point $t_{112}$ written into the buffer memory 306 can be recorded on the disc 301. As a result of this type of construction, the audio data can be continuously recorded without interruption over a plurality of discs.

Also, by combining the construction of the twenty-third embodiment indicated in FIG. 34 with a disc apparatus in accordance with the twelfth embodiment indicated in FIGS. 24 and 25, not only can sound be recorded continuously without interruption over a plurality of discs, but also the sound based on the data recorded on a plurality of discs can be played back continuously without interruption. Consequently, by using a quantity n of MD each with a recording and playback time of 74 minutes, long period (74×n minutes) recording and playback can be performed as if using a single disc.

Twenty-fourth Embodiment

Figure 36:
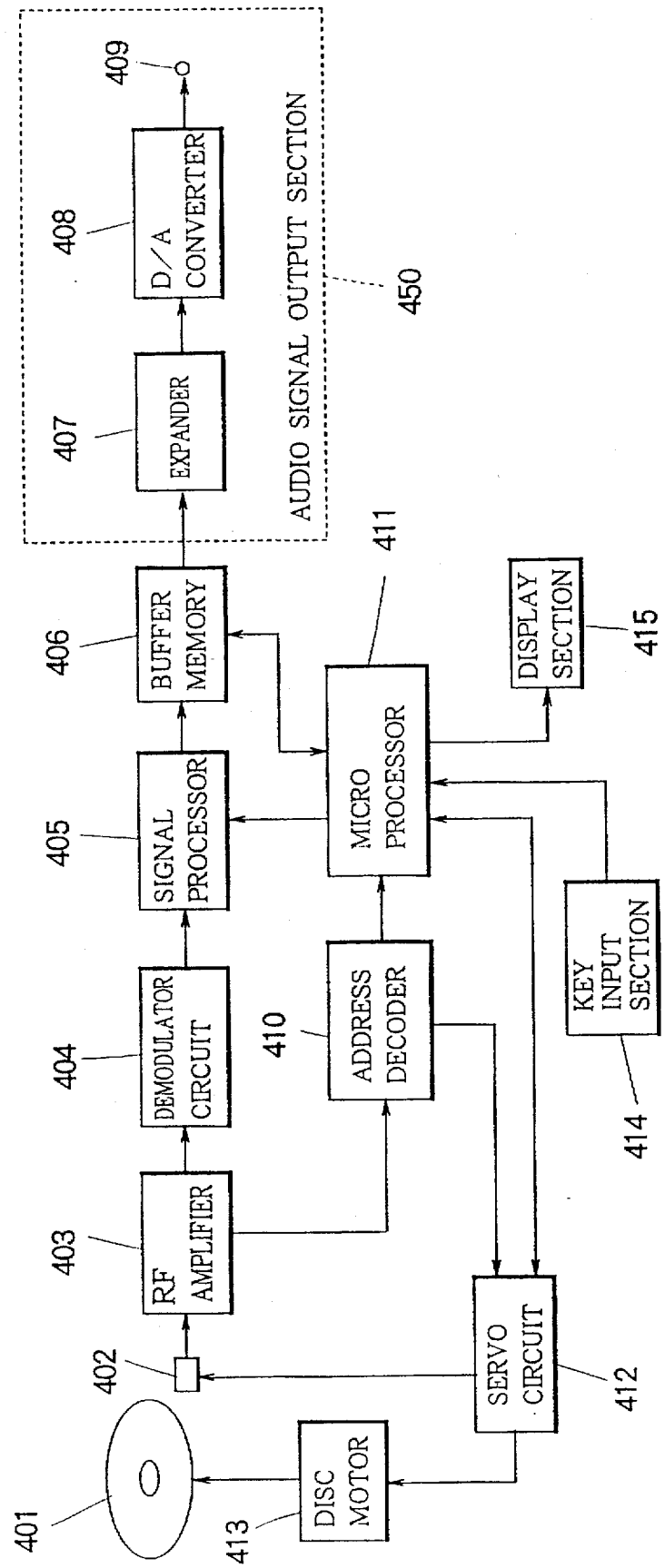
FIG. 36 is a block diagram indicating compositions of a disc apparatus in accordance with a twenty-fourth embodiment of the present invention.

FIG. 36 is a block diagram indicating compositions of a disc apparatus (MD playback apparatus) in accordance with a twenty-fourth embodiment of the present invention, e.g., for use in language study.

As indicated in FIG. 36, the disc apparatus comprises an optical pickup 402 for reading out data from the disc (MD) 401, an RF amplifier 403, a demodulator circuit 404, an signal processor circuit 405, a buffer memory 406 and an audio signal output section 450 for producing an audio signal output based upon the audio data stored in the buffer memory 406. The audio signal output section 450 comprises a expander circuit 407, a D/A converter circuit 408 and an audio signal output terminal 409. In addition, the disc apparatus further comprises an address decoder 410, a microprocessor 411 for controlling operations of the overall disc apparatus, a servo circuit 412, a disc motor 413 for rotating the disc 401, a key input section 414 and a display section 415.

Laser light is emitted toward the disc 401 from the optical pickup 402 controlled by the servo circuit 412, and by detecting the reflected light, data recorded on the disc 401 are read out intermittently and converted into an electrical signal by the optical pickup 402. The signal is amplified by the RF amplifier 403 and EFM or otherwise demodulated by the demodulator circuit 404 to return the original signal series.

The address decoder 410 reads out the address data recorded beforehand over the entire disc 401 from the output of the RF amplifier 403 to obtain the tracking data, and then supplies the tracking data to the servo circuit 412. The servo circuit 412 functions to operate the tracking servo in order for the optical pickup 402 to scan a track, and to maintain the disc rotation at a constant linear velocity.

At the signal processor circuit 5, errors in the signal series are corrected utilizing an error correction code included in the signal series, and the signal series is rearranged by interleave processing, thereby restoring the original digital audio signal. The buffer memory 406 temporarily stores the audio data inputted intermittently and provides a continuous output of the audio data.

When the data amount stored in the buffer memory 406 exceeds a predetermined upper limit (threshold $S_1$), the data write-in to the buffer memory 406 is stopped. When the data amount stored in the buffer memory 406 falls below a predetermined lower limit (threshold $S_2$) by a continuous data readout, the data write-in to the buffer memory 406 is resumed.

At the expander circuit 407, the data compressed to ¼ and outputted from the buffer memory 406 are expanded 4 times to restore the digital audio signal with original time series. This restored signal is sent via the D/A converter 408 as the analog audio signal to the analog audio signal output terminal 409. The microprocessor 411 performs playback control for the servo circuit 412, buffer memory 406 and other systems.

Figure 37:
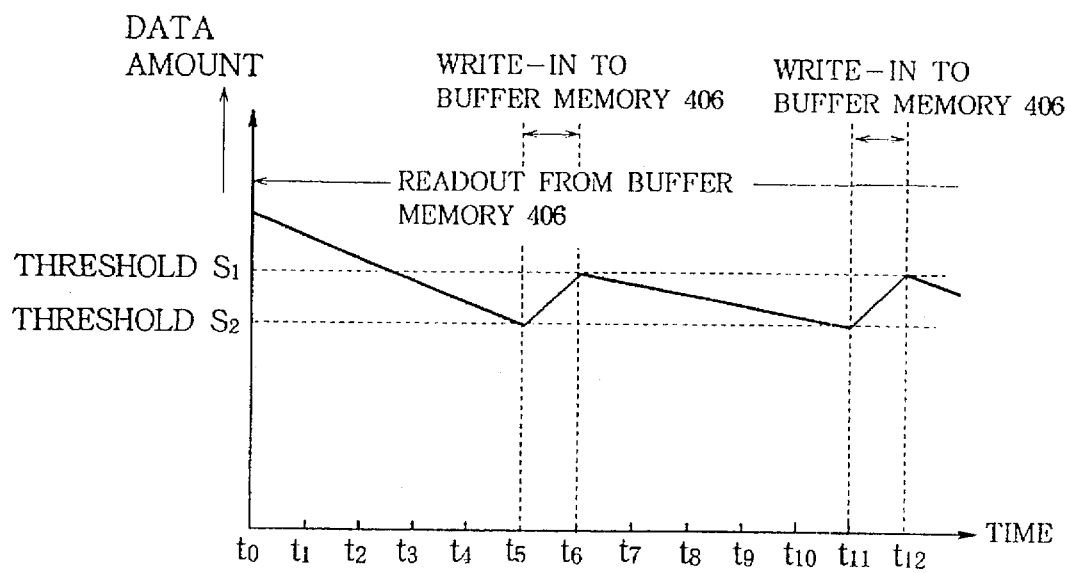
FIG. 37 is a graph indicating change of the data amount in the buffer memory with respect to time during normal playback and the repeat playback mode $R_1$ in the case of the disc apparatus in accordance with the twenty-fourth embodiment.

FIG. 37 is a graph indicating the data amount stored in the buffer memory 406 with respect to time.

As indicated in FIG. 37, at time point $t_0$, since the buffer memory 406 is filled with audio data, data readout from the disc 401 and data write-in to the buffer memory 406 is stopped and the address on the disc 401 at time point $t_0$ is stored. The audio data are read out from the buffer memory 406 and the data amount declines in the period $T_0$-$t_5$. When the data amount reaches threshold $S_2$ (time point $t_5$), a control signal is sent from the microprocessor 411 to the servo circuit 412, whereby the motor 413 returns the optical pickup 402 to the address stored at time point $t_1$ and then data readout from the disc 401 and data write-in to the buffer memory 406 resume. Also, the audio data is read out from the buffer memory 406 continuously in the period $t_5$-$t_6$.

At time point $t_6$, when the data amount of the buffer memory 406 reaches threshold $S_1$, data readout from the disc 401 and data write-in to the buffer memory 406 are stopped, and then the address on the disc 401 at time point $t_6$ is stored. The audio data are read out from the buffer memory 406 during the time period $t_6$-$t_{11}$ and when the data amount reaches threshold $S_2$ (time point $t_{11}$), the optical pickup 402 is returned to the address stored at time point $t_6$ and then the data readout from the disc 401 and data write-in to the buffer memory 406 resume. In this manner, the audio data are written intermittently into the buffer memory 406, but read out continuously from the buffer memory 406.

FIGS. 38(a)-38(f) are conceptual drawings indicating changes of the data amount in the buffer memory 406 during normal playback and the repeat playback mode $R_1$ described below.

In FIGS. 38(a)-38(f), data in the buffer memory 406 are expressed as twelve squares, while higher numerals within the squares indicate newer data. Shaded squares indicate data already read out. The following description refers to an example of threshold $S_1$ comprising ten squares and threshold $S_2$ comprising eight squares.

Figure 38A:
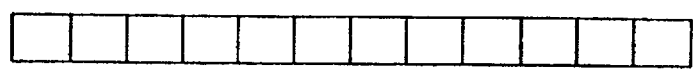
FIGS. 38(a)–38(f) are conceptual drawings indicating change of the data amount in the buffer memory during normal playback and the repeat playback mode $R_1$ in the case of the disc apparatus in accordance with the twenty-fourth embodiment.
Figure 38B:
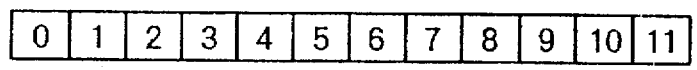

As shown in FIG. 38(a), the buffer memory 406 is vacant initially. As shown in FIG. 38(b), data are sequentially written into the buffer memory 406 and then all squares are filled the data (0-11). FIG. 38(b) corresponds to time point to in FIG. 37. Since the threshold $S_1$ is ten squares, in practice, the buffer memory 406 is not initially filled with data, but in order for ease of description, it is hypothetically assumed data readout is performed until the buffer memory 406 is initially filled with data.

Figure 38C:
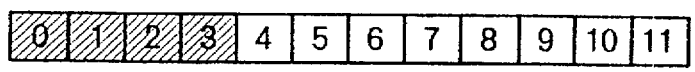
Figure 38D:
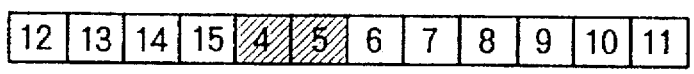

As shown in FIG. 38(c), the data (0-3) of the buffer memory 406 are then read out sequentially, thereby the data amount reaches the threshold S2. FIG. 38(c) corresponds to time point $t_5$ in FIG. 37. Then, written-in to the buffer memory 406 resumes and new data (12-15) is written into the four squares of the buffer memory 406, thereby the data amount reaches the threshold $S_1$ again as shown in FIG. 38(d). FIG. 38(d) corresponds to time point $t_6$ in FIG. 37.

Figure 38E:
Figure 38F:
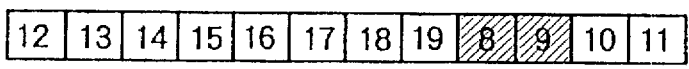

As shown in FIG. 38(e), the data (6-7) in the buffer memory 406 are sequentially read out and then the data amount reaches the threshold $S_2$. FIG. 38(e) corresponds to the time point $t_{11}$ in FIG. 37. Then, data write-in to the buffer memory 406 resumes and the new data (16-19) are written into the four squares, thereby the data amount reaches the threshold $S_1$ as shown in FIG. 38(f). FIG. 38(f) corresponds to time point $t_12$ in FIG. 37.

Afterwards, the data amount of the buffer memory 406 increases and decreases repeatedly in the same manner. Since unread data above the threshold $S_2$ are always stored in the buffer memory 406, even if due to external disturbance or other reason, data readout from the disc 401 ceases, by returning the pickup 402 while data stored in the buffer memory 406 are read out, the audio signal recorded on the disc 401 can be played back continuously. This type of operation is termed a shock proof operation.

Figure 39:
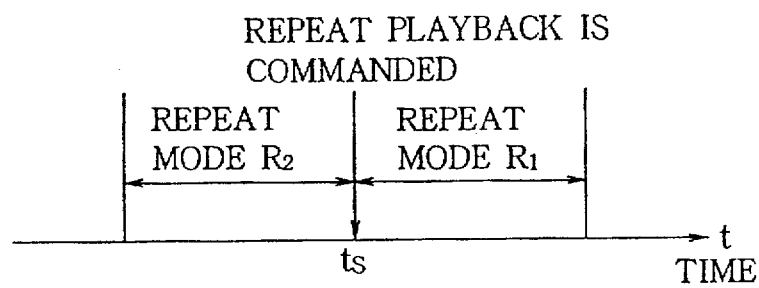
FIG. 39 is a descriptive drawing indicating the differences between the repeat playback modes $R_1$ and $R_2$ in the case of the disc apparatus in accordance with the twenty-fourth embodiment.

FIG. 39 is a descriptive drawing indicating two repeat playback modes for the disc apparatus of the twenty-fourth embodiment. As indicated in FIG. 39, these two repeat modes comprise a first mode $R_1$, whereby the data after a time point $t_s$ when repeat is commanded are played back repeatedly, and a second mode $R_2$, whereby the data already played back before the time point $t_s$ are played back repeatedly. The control method of the buffer memory 406 by the microprocessor 411 in repeat playback mode $R_1$ is different from that in the repeat playback mode $R_2$.

The repeat playback mode $R_1$ will be described below. In this mode $R_1$, the control method is similar to that in the shock proof operation described above, except for the method of data readout.

When a repeat playback mode $R_1$ is selected, if repeat playback start command is operated by the key input section 415 during normal playback and the command is sent to the microprocessor 411, normal playback is temporarily stopped. As indicated in FIGS. 38(a)-(f) (unshaded areas), since the repeat playback data are already written into the buffer memory 406, by reading out the data from the buffer memory 406 for a desired number of times, repeat playback can be performed for a desired number of times. The duration of repeated playback is limited by the buffer memory 406 storage capacity. For example, assuming that the maximum storage capacity of data signal in the buffer memory 406 indicated in FIGS. 38(a)-(f) is twelve seconds (corresponding to the state in FIG. 38(b), data output for at least eight seconds corresponding to the threshold $S_2$ can be repeated.

Following is a description of the repeat playback mode $R_2$. In the repeat playback mode $R_2$, lower settings are used for the thresholds $S_1$ and $S_2$ compared to normal playback and the repeat playback mode $R_1$. Thus, in the repeat playback mode $R_2$, the threshold $S_1$ is set to a lower value than that in the repeat playback mode $R_1$, and the threshold $S_2$ is set to a lower value than that in the repeat playback mode $R_1$.

Figure 40:
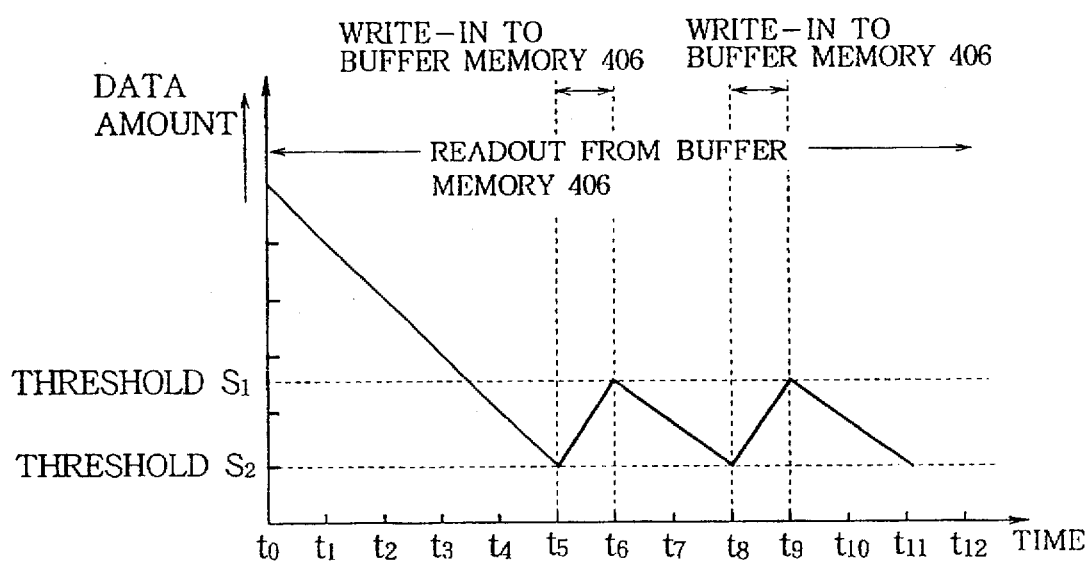
FIG. 40 is a graph indicating change of the data amount in the buffer memory with respect to time during the repeat playback mode $R_2$ in the case of the disc apparatus in accordance with the twenty-fourth embodiment.

FIG. 40 is a graph indicating the data amount stored in the buffer memory 406 with respect to time in the repeat playback mode $R_2$. FIG. 41 is a conceptual drawing indicating changes of data amount in the buffer memory 406 in the repeat playback mode $R_2$. In this example, the threshold $S_1$ is set for five squares and the threshold $S_2$ is set for two squares.

Figure 41A:
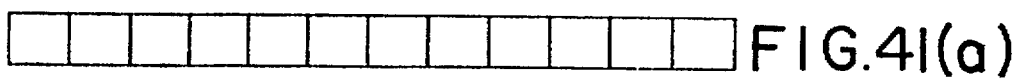
FIGS. 41(a)–41(f) are conceptual drawings indicating change of the data amount in the buffer memory during the repeat playback mode $R_2$ in the case of the disc apparatus in accordance with the twenty-fourth embodiment.
Figure 41B:
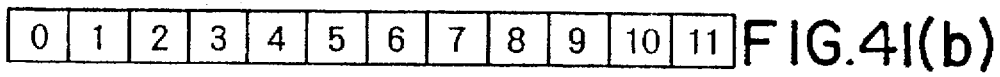

As shown in FIG. 41(a), the buffer memory 406 is vacant initially. As shown in FIG. 41(b), data are sequentially written into the buffer memory 406 and then all squares are filled with the data (0-11). FIG. 41 (b) corresponds to time point $t_0$ in FIG. 40. Since the threshold $S_1$ is five squares, in practice, the buffer memory 406 is not initially filled with data, but in order for ease of description, it is hypothetically assumed data readout is performed until the buffer memory 406 is initially filled with data.

Figure 41C:
Figure 41D:

As shown in FIG. 41(c), the data (0-9) of the buffer memory 406 are then read out sequentially, thereby the data amount reaches the threshold $S_2$. FIG. 41 (c) corresponds to time point $t_5$ in FIG. 40. Then, data write-in to the buffer memory 406 resumes and new data (12-16) is written into the five squares of the buffer memory 406, thereby the data amount reaches the threshold $S_1$ again as shown in FIG. 41(d). FIG. 41(d) corresponds to the time point $t_6$ in FIG. 40.

Figure 41E:
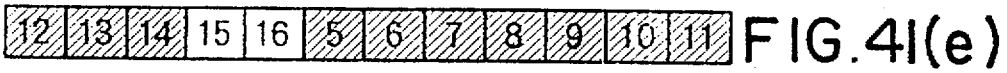
Figure 41F:
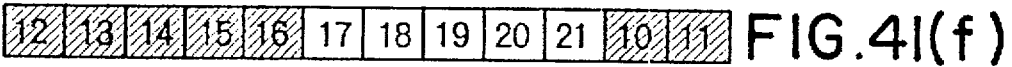

As shown in FIG. 41(e), the data (10-14) in the buffer memory 406 are sequentially read out and then the data amount reaches the threshold $S_2$. FIG. 41(e) corresponds to the time point $t_8$ in FIG. 40. Then, data write-in to the buffer memory 406 resumes and the new data (17-21) are written into the five squares, thereby the data amount reaches the threshold $S_1$ as shown in FIG. 41(f). FIG. 41(f) corresponds to time point $t_9$ in FIG. 40.

Afterwards, the data amount of the buffer memory 406 increases and decreases repeatedly in the same manner. Since unread data above the threshold $S_2$ are always stored in the buffer memory 406.

When a repeat playback mode $R_2$ is selected, if repeat playback start command is operated by the key input section 415 during normal playback and the command is sent to the microprocessor 411, normal playback is temporarily stopped. As indicated in FIGS. 41(a)–41(f) as unshaded areas, since the repeat playback data are already written into the buffer memory 406, by reading out the data from the buffer memory 406 for a desired number of times, repeat playback can be performed for a desired number of times. The duration of repeated playback is limited by the buffer memory 406 storage capacity. For example, assuming that the maximum storage capacity of data in the buffer memory 406 indicated in FIGS. 41(a)–41(f) is twelve seconds (corresponding to FIG. 41(b)), data output for at least seven seconds can be repeated.

In the above description, the thresholds $S_1$ and $S_2$ are fixed for each of two repeat playback modes $R_1$ and $R_2$. However, in order to vary the repeat playback duration, it is acceptable that the thresholds $S_1$ and $S_2$ is variable.

Twenty-fifth Embodiment

Figure 42:
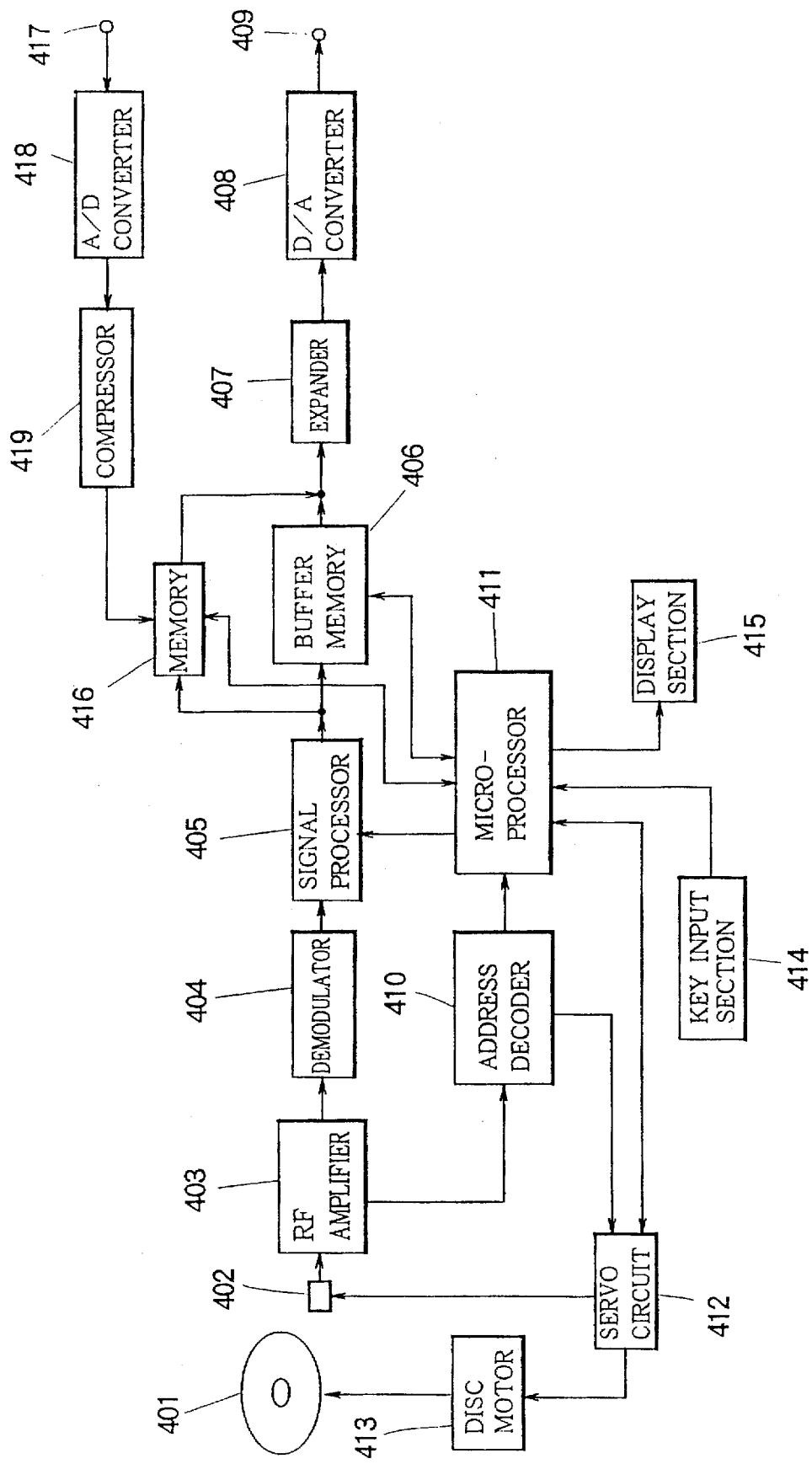
FIG. 42 is a block diagram indicating compositions of a disc apparatus in accordance with a twenty-fifth embodiment of the present invention.

FIG. 42 is a block diagram indicating compositions of a disc apparatus (MD playback apparatus) in accordance with a twenty-fifth embodiment of the present invention.

In FIG. 42, the same symbols are assigned to compositions that are the same as or correspond to the compositions of the twenty-fourth embodiment indicated in FIG. 36. Differing aspects with respect to the twenty-fourth embodiment are inclusion of a memory 416 for storing externally input data, an analog audio input terminal 417, an A/D (analog to digital) converter circuit 418 and a data compressor circuit 419, in addition to control functions of the microprocessor. In the case of the twenty-fifth embodiment, a voice or other analog data input signal is converted into digital form, then the data are compressed and written into the memory 416. Preferred applications of the twenty-fifth embodiment include language laboratory (L/L) recording and playback.

The L/L operation of the disc apparatus according to the twenty-fifth embodiment will be described below. Since the operations during normal playback and repeat playback are the same as that of the twenty-fourth embodiment, their descriptions are omitted.

In the case of L/L playback, if the user selects a desired spoken tutorial passage, for example, by selecting a track number from the key input section 414, the selected passage is stored in the buffer memory 406, and then the stored data are expanded, converted to analog form and sent to the audio output terminal 409. When the selected passage is stored in the buffer memory 406, data readout from the disc 401 is stopped.

Next, the user then verbally repeats the played back passage, and then the voice signal via the audio input terminal 417 is converted into digital form by the A/D converter circuit 418, compressed to about 1/4 in data amount by the data compressor circuit 419 and written into the external input memory 416.

Next, the data read out from the buffer memory 406 (tutorial passage) are expanded by the data expander circuit 407, converted into analog form by the D/A converter circuit 408 and sent as the audio signal to the audio output terminal 409.

In succession, the data stored in the memory 416 for external input are read out, processed in the same manner as the case of the data from the buffer memory 406, and sent to the audio output terminal 409, thereby one L/L playback operating cycle is completed.

Except for the above point, the disc apparatus of the twenty-fifth embodiment is the same as that of the twenty-fourth embodiment.

Twenty-sixth Embodiment

Figure 43:
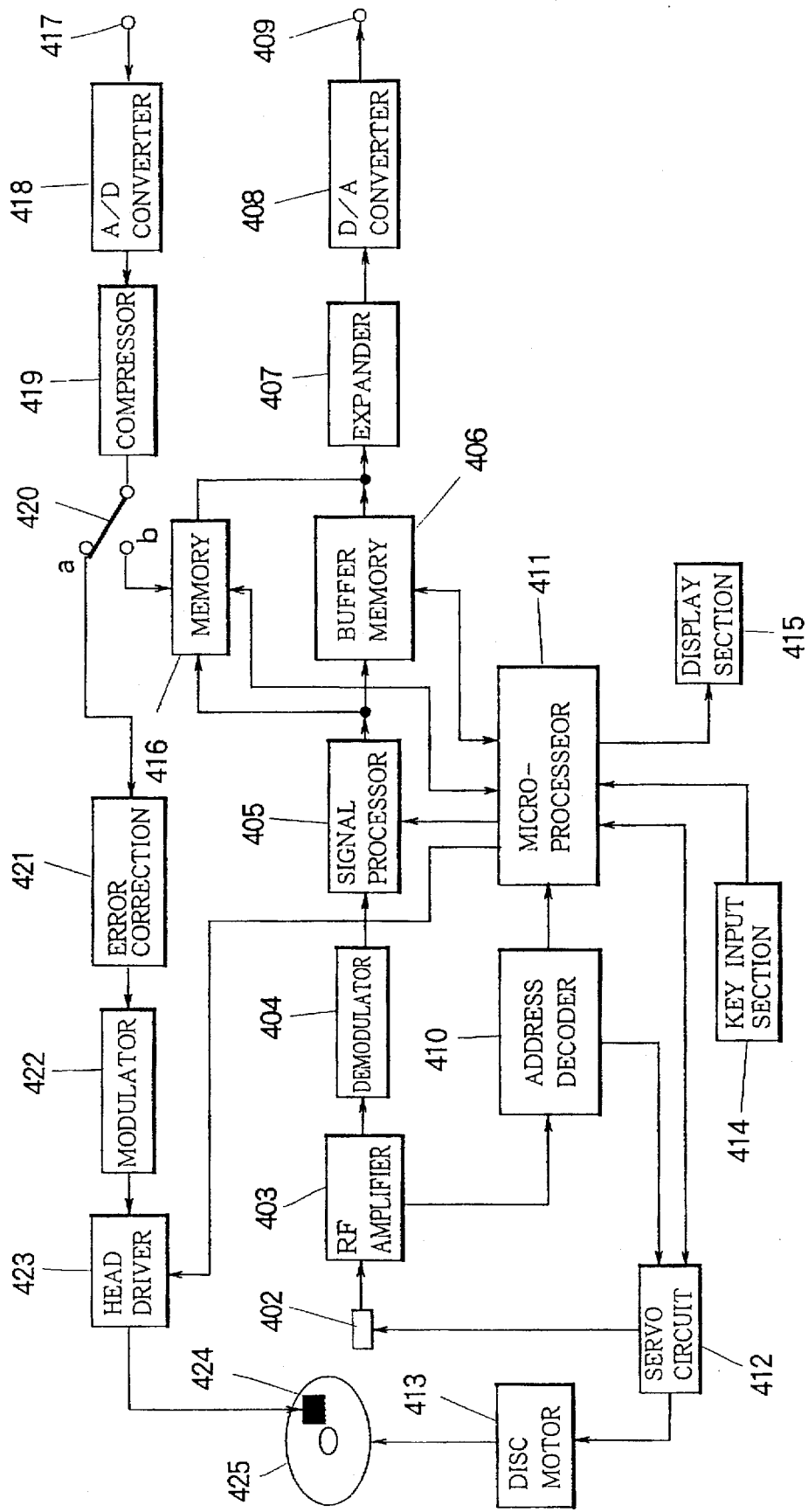
FIG. 43 is a block diagram indicating compositions of a disc apparatus in accordance with a twenty-sixth embodiment of the present invention.

FIG. 43 is a block diagram indicating compositions of a disc apparatus (MD recording and playback apparatus) in accordance with a twenty-sixth embodiment of the present invention.

In FIG. 43, the same symbols are assigned to compositions that are the same as or correspond to the compositions of the twenty-fourth embodiment indicated in FIG. 42. In the case of the twenty-sixth embodiment as, for example, an MD recording and playback apparatus capable of writing data onto a disc, the disc apparatus further comprises a recording head 424 for writing the data, a recording head drive circuit 423, a modulator circuit 422, an error correction circuit 421 for generating and adding an error correction code and a switching circuit 420 for selecting between the audio signal stored in the memory 416 or recorded on the disc 402. Except for the provision of these compositions and the control functions by the microprocessor 411, the disc apparatus of the twenty-sixth embodiment is same as that of the twenty-fifth embodiment.

When using the disc apparatus of the twenty-fifth embodiment for L/L applications, the lengths of the tutorial and response passages are limited by the capacities of the buffer memory 406 and external input memory 416. For example, if 4 Mbit memories are used, the maximum L/L playback time is twelve seconds. In the case of the disc apparatus of the twenty-sixth embodiment, since the response voice can be recorded on the disc 401, longer passages are possible in L/L playback.

Following is a description of the operation of the twenty-sixth embodiment as a L/L disc apparatus. Since the operations during normal playback and repeat playback are the same as the twenty-fourth embodiment, their descriptions are omitted.

In the case of L/L playback, the user selects a desired spoken tutorial passage, for example, by selecting a track number from the key input section 414, and then the selected passage is written into the buffer memory 406. If the microprocessor 411 detects the data amount of the selected passage exceeds a predetermined reference value, i.e., longer than twelve seconds, on a command from the microprocessor 411, the switch 420 changes from contact "b" to contact "a". In other words, when the tutorial passage in L/L playback is longer than twelve seconds, the microprocessor 411 determines that the user response will also be longer than twelve seconds and cannot be completely stored in the external input memory 416. The microprocessor 411 then commands the switch 420 to change from contact "b" to contact "a" in order to record the user's voice data on the disc 425. At the same time, based on a command from the microprocessor 411, the selected tutorial passage is sent via the same route as normal playback (i.e., via the buffer memory 406) to the audio output terminal 409.

The user then verbally repeats the played back passage. The voice signal via the audio input terminal 417 is converted into digital form by the A/D converter circuit 418, and compressed to about 1/4 by the data compressor circuit 419. Since the switch 420 select the contact "a", the data signal is not supplied to the external input memory 416, but to the compositions 421–424 for data write-in t6o the disc 425.

At the error correction circuit 421, interleave processing for rearranging the signal sequence in order to separate errors occurring in playback, and error correction code generation and addition are performed. The modulator circuit 422 concentrates the signal into the suitable frequency band for recording and playback, and applies modulation such as EFM to allow extracting the self timing clock during playback. The resulting signal is sent via recording head drive circuit 423 to the recording head 424 for recording on a recordable area of the disc 425. For example, in the case of a opto-magnetic disc, while a laser spot from the optical pickup 402 raises the temperature of the area for recording to erase previous magnetism, new recording is performed by the recording head 424.

At a command from the key input section 414, the pickup 402 again reads out the L/L playback passage from the recorded area of the disc 425, after which the data are sent in the same route as normal playback to the audio output terminal 409.

In succession, the user's voice response recorded in the recordable area of the disc 425 is read out by the pickup 402 and sent in the same route as normal playback to the audio output terminal 409. In this manner, one L/L playback cycle is completed.

On the other hand, if the microprocessor 411 determines that the L/L playback data amount is below the predetermined reference value (i.e., the passage length is less than twelve seconds when using a buffer memory 406 with a 4 Mbit capacity), the microprocessor 411 commands the switch 420 to select contact "b", after which operation is performed in the same manner as the twenty-fifth embodiment.

During L/L playback, control is also possible for setting the switch 420 to contact "a" even when the passage data amount is less than the maximum capacity of the buffer memory 406.

Except for the above point, the disc apparatus of the twenty-fifth embodiment is the same as that of the twenty-fourth embodiment.

Twenty-seventh Embodiment

Figure 44:
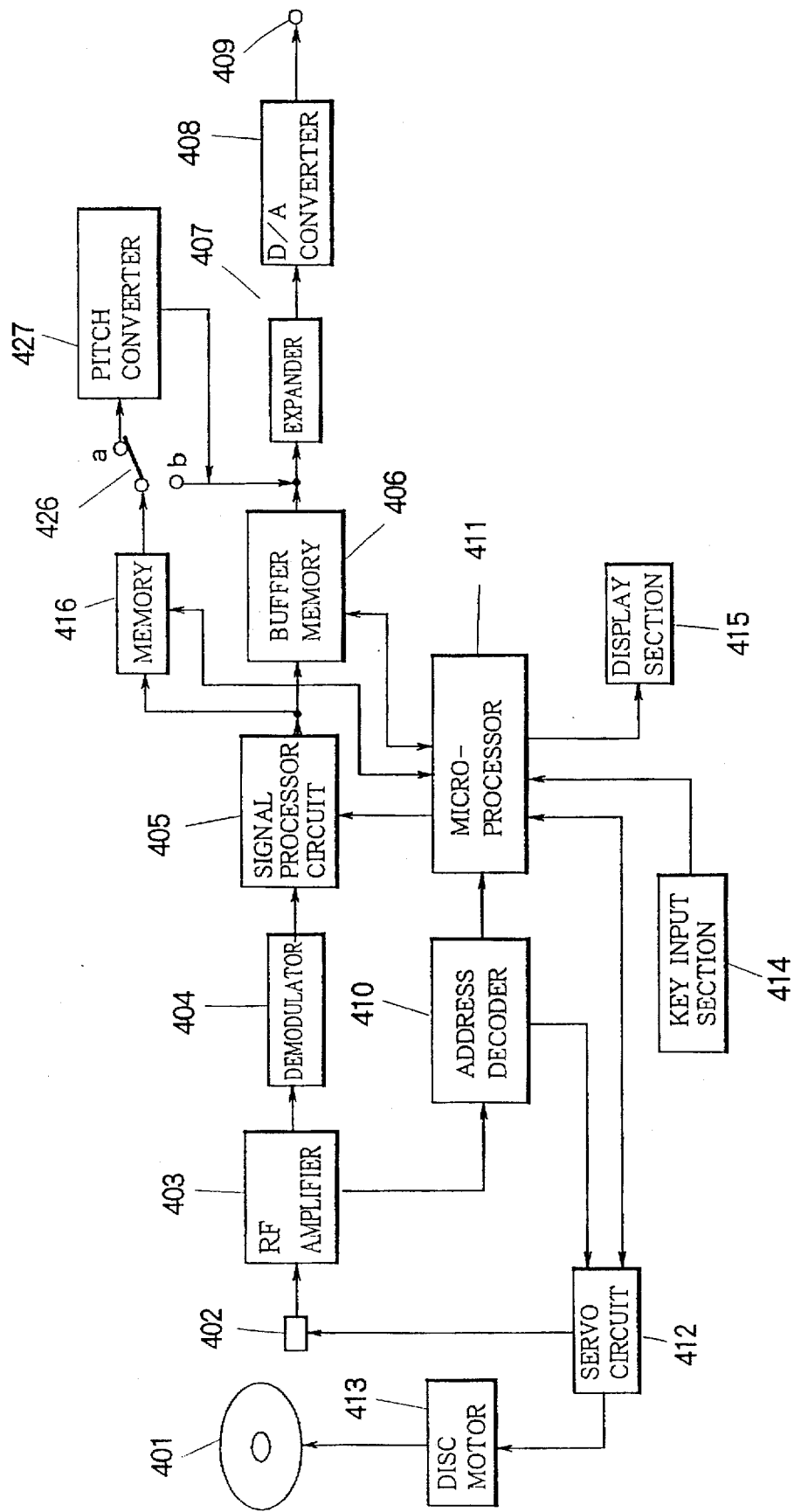
FIG. 44 is a block diagram indicating compositions of a disc apparatus in accordance with a twenty-seventh embodiment of the present invention.

FIG. 44 is a block diagram indicating compositions of a disc apparatus in accordance with a twenty-seventh embodiment of the present invention.

In FIG. 44, the same symbols are assigned to the compositions that are the same or correspond to that of the twenty-fourth embodiment indicated in FIG. 36. The disc apparatus of the twenty-seventh embodiment further comprises a selector switch 426 for selecting the output route from the memory 416 and a pitch converter circuit 427. Furthermore, the control function of the microprocessor 411 is different from that of the twenty-fourth embodiment. In the case of the twenty-seventh embodiment, a data pitch conversion function for the data written into the memory is added in order to, for example, render a difficult to understand passage more intelligible. This allows special types of playback such as slow speed playback, while retaining the pitch.

Since the normal playback operation is the same as the twenty-fourth embodiment, following is a description of the repeat and pitch conversion operations of the twenty-seventh embodiment in special playback.

The repeat playback operation is described with reference to FIG. 44. When the desired repeat playback data (e.g., a language conversation passage) is selected, for example, from the key input section 414, normal playback is temporarily stopped. In the same manner as the twenty-fourth embodiment, the repeat playback data are read out by the optical pickup 402, demodulated, error corrected and written into the buffer memory 406. Since the selector switch 426 selects contact "b", the data of the buffer memory 406 are processed in the same manner as the twenty-fourth embodiment and sent as the analog audio signal to the audio output terminal 409.

Following is a description of special playback using pitch conversion. When the desired repeat playback data (e.g., a language conversation passage) is selected, for example, from the key input section 414, normal playback is temporarily stopped. In the same manner as the repeat playback, the special playback data are read out by the optical pickup 402, demodulated, error corrected and written into the memory 416. Since the selector switch 426 selects contact "a", the data from the signal processor circuit 405 stored in the memory 416 are supplied to the data pitch converter circuit 427.

In retaining the original pitch while slowing the playback speed, in accordance with control by the microprocessor 411, the data readout rate from the buffer memory 406 is reduced and the pitch is raised by the pitch converter circuit 427.

Figure 45:
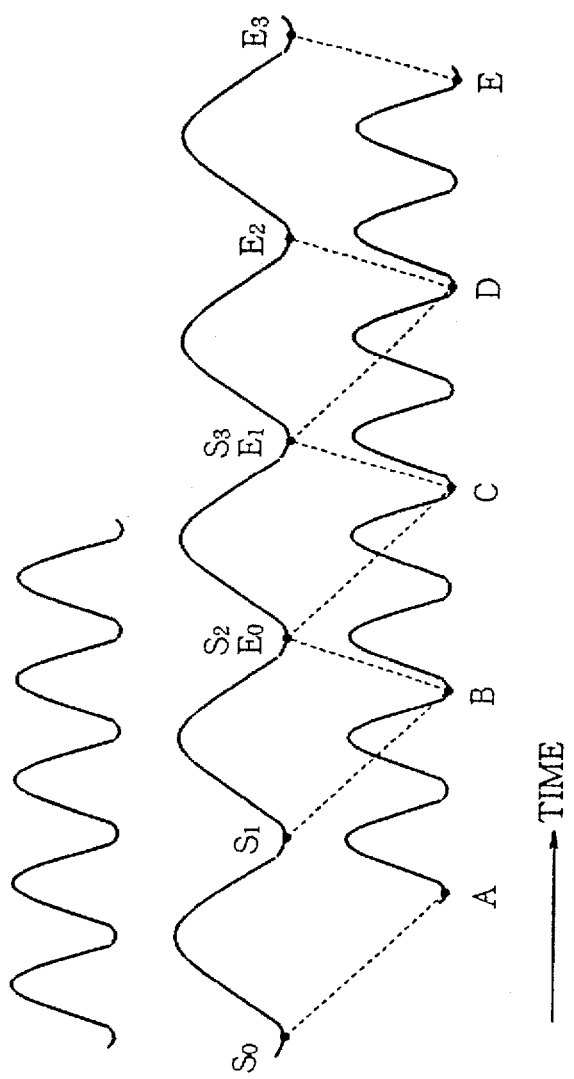
FIGS. 45(a)–45(c) are descriptive drawings indicating signal processing by the pitch converter circuit in the case of the disc apparatus in accordance with the twenty-seventh embodiment.

FIGS. 45(a)–45(c) are descriptive drawings indicating process by the pitch converter circuit 427. An example of retaining the pitch while reducing the playback speed by half is described below.

FIG. 45(a) indicates a waveform from the audio output terminal 409 when data readout from the buffer memory 406 is performed at the data readout rate which is the same as a rate during normal playback. When the readout rate is set at half the rate of normal playback, a waveform of FIG. 45(b) is produced from the analog output terminal. If the waveform of FIG. 45(b) is outputted, the playback sound pitch becomes ½ that of the waveform of FIG. 45(a), thereby processing is required to raise the pitch 2 times.

Figure 2:
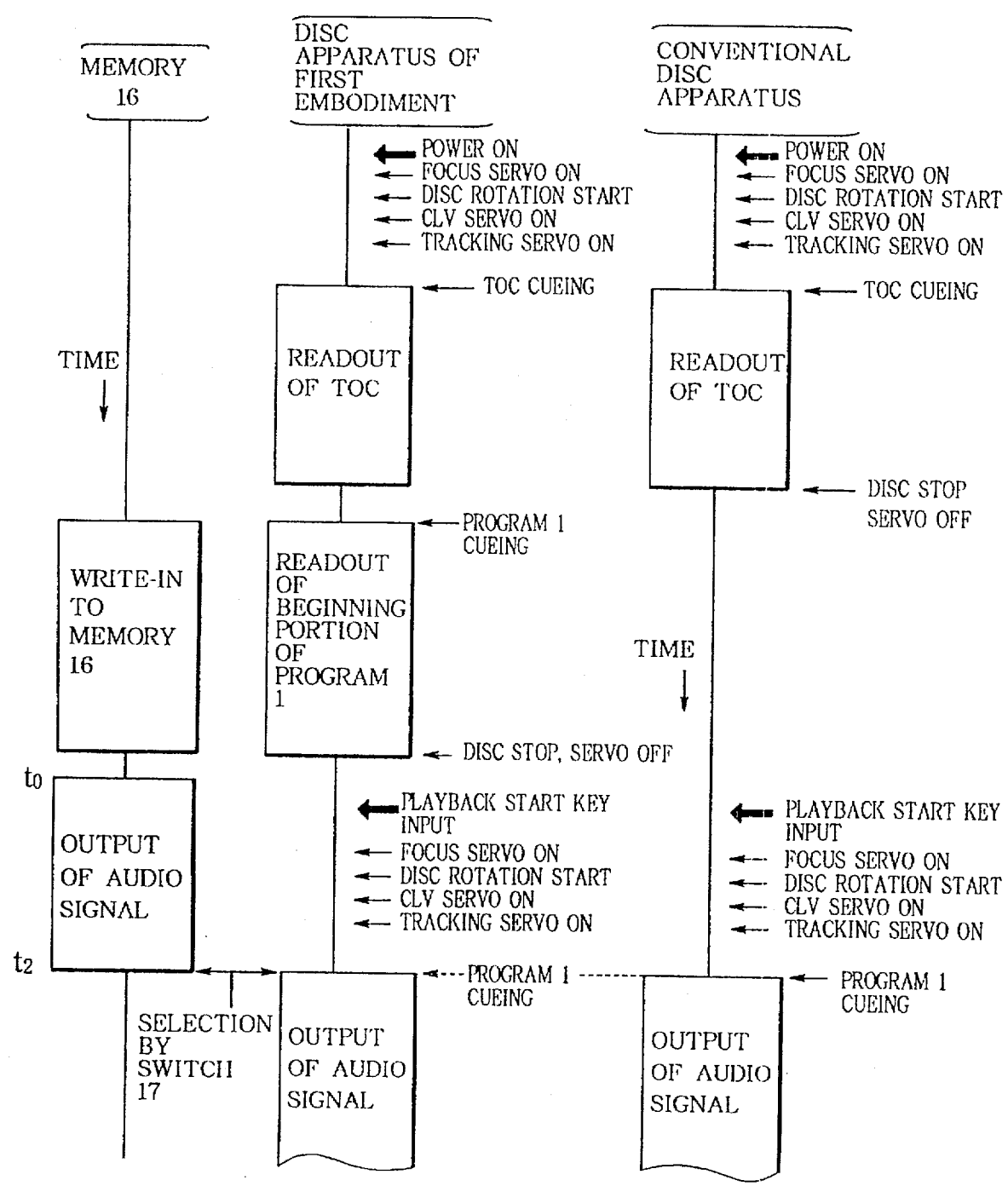
FIGS. 2(a)–2(b) are descriptive drawings indicating operation of the disc apparatus in accordance with the first embodiment.

In order to raise the waveform of FIG. 45(b) 2 times, the signal of area $S_0$–$E_0$ is first played back at twice the speed to produce the waveform indicated in area A–B of the waveform of FIG. 45(c). Next, the signal of area $S_1$–$E_1$ is played back at twice the speed to produce the waveform indicated in area B–C of the waveform of FIG. 45(c). In the same manner, the signals of areas $S_2$–$E_2$, and $S_3$–$E_3$ are played back at twice the speed to respectively produce the waveforms indicated in areas C–D, and D–E.

When the waveform of FIG. 45(b) is converted into the waveform of FIG. 45(c), since the respective areas $S_1$–$S_2$, $S_2$–$S_3$ and $S_3$–$E_2$ are each played back twice, the waveform of FIG. 45(c) has the same pitch but half the playback speed compared to the waveform of the FIG. 45(a).

The audio signal processed in the above manner is then sent via the data expander circuit 407 and D/A converter 408 circuits in the same manner as normal and repeat playback to the audio output terminal 409 to complete special playback.

Although the above description referred to varying the readout rate from the buffer memory 406, it is also acceptable to vary the readout rate from the pitch converter circuit 427.

Twenty-eighth Embodiment

Figure 46:
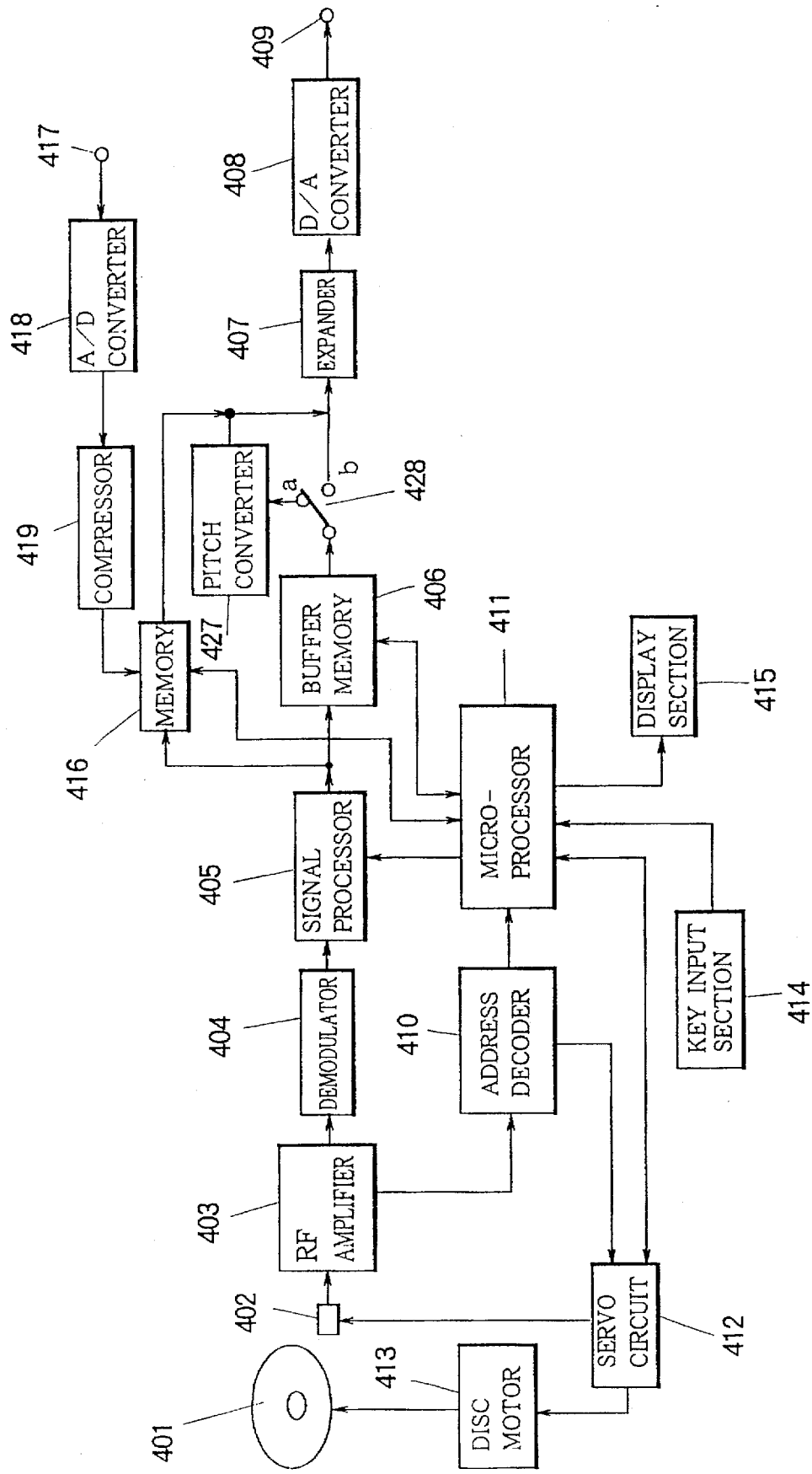
FIG. 46 is a block diagram indicating compositions of a disc apparatus in accordance with a twenty-eighth embodiment of the present invention.
Figure 47:
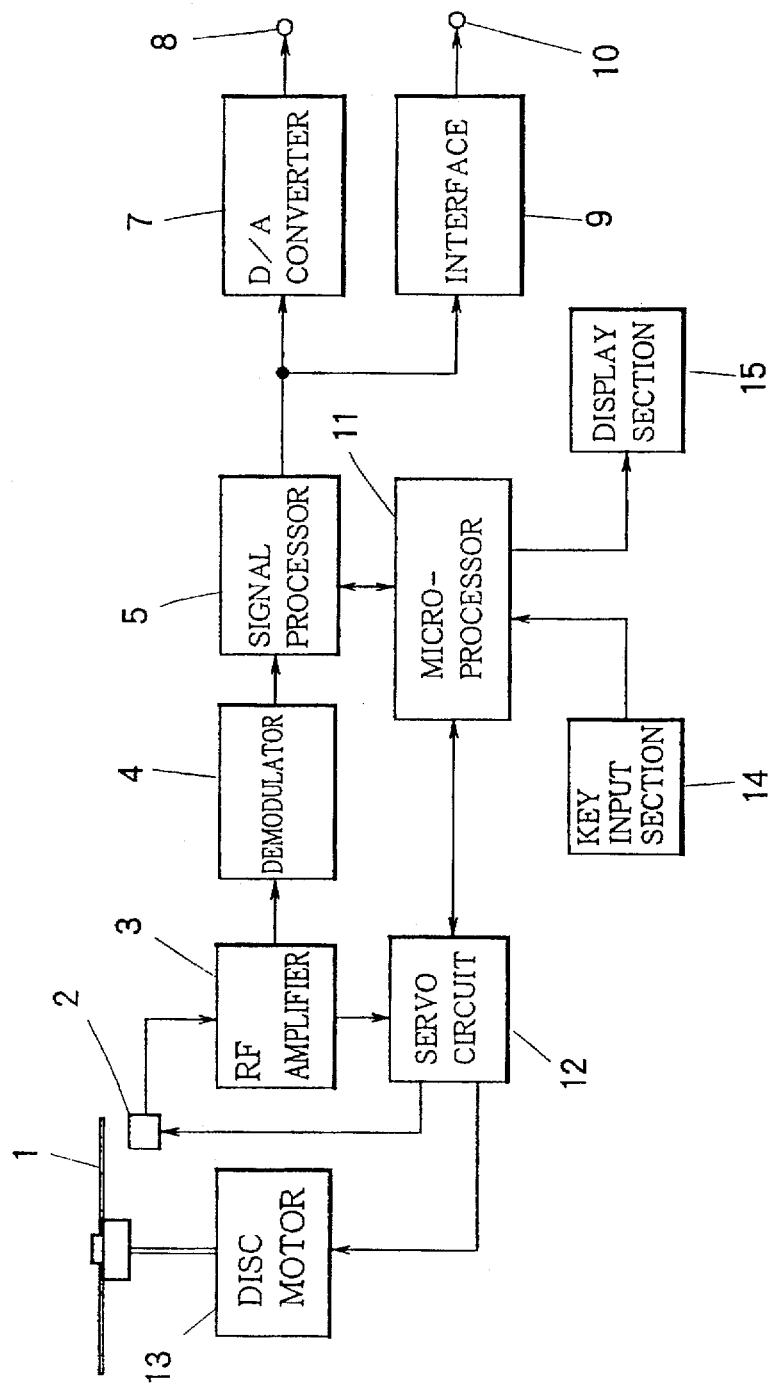
FIG. 47 is a block diagram indicating compositions of a conventional disc apparatus (CD playback apparatus)

FIG. 46 is a block diagram indicating compositions of a disc apparatus (MD playback apparatus) in accordance with a twenty-eighth embodiment of the present invention.

In FIG. 46, the same symbols are assigned to the compositions that are the same as or correspond to that of the twenty-fifth embodiment indicated in FIG. 42. The disc apparatus of the twenty-eighth embodiment further comprises a selector switch 428 for selecting the output route from the memory 416 and a pitch converter circuit 427. The control function of the microprocessor 411 is different from that of the twenty-fifth embodiment. In the case of the twenty-eighth embodiment, a data pitch conversion function for the data written into the memory is added in order to, for example, render a difficult to understand passage more intelligible. This allows special types of playback such as slow speed playback, while retaining the pitch.

Since the normal playback operation is the same as that of the twenty-fifth embodiment, following is a description of the repeat and pitch conversion operations of the twenty-eighth embodiment in special playback.

In the operation combining L/L and special playback, the user selects a desired spoken tutorial passage, for example, by selecting a track number from the key input section 414. In the same manner as normal playback, the selected passage is then written into the buffer memory 406. Since the selector switch 428 is set to contact "a", the output of the buffer memory 406 is supplied to the pitch converter circuit 427. The pitch converter circuit 427 processes the signal in the same manner as the twenty-seventh embodiment and produces an audio signal output from the audio output terminal 409 at a playback speed desired by the user. Afterwards, the user's voice data via the audio input terminal is compressed and written into the external input memory 416 by the same operation as the twenty-fifth embodiment.

Next, a contact "b" is selected by the selector switch 428, the data of the buffer memory 406 (tutorial passage selected by the key input section 414) are read out and supplied directly to the expander circuit 407. The signal from the expander circuit 407 is supplied to the D/A converter circuit 408, after which subsequent L/L operation is the same as that of the twenty-fifth embodiment.

It is also acceptable to add a function such as indicated for the twenty-sixth embodiment whereby if the passage length exceeds the memory 416 capacity, the user's voice can be recorded on the disc.

Although the above description referred to varying the readout rate from the buffer memory 406, it is also acceptable to vary the readout rate from the pitch converter circuit 427.

What is claimed is:

1. A disc apparatus comprising:

readout means for reading out data from a disc, said data including at least digital audio data;

audio signal output means for producing an audio signal output in accordance with said digital audio data;

memory means for storing said digital audio data read out from said disc by said readout means;

switching means for switching said digital audio data supplied to said audio signal output means between said digital audio data stored in said memory means and said digital audio data currently being read out by said readout means; and control means for controlling said readout means and said memory means so that, prior to a playback start operation, said digital audio data of a first predetermined period from a beginning of at least one program are automatically read out by said readout means and stored in said memory means without a user having first selected a special operational mode, and for controlling said switching means so that, at a beginning of said playback start operation, said audio signal output means produces said audio signal output based on said digital audio data stored in said memory means, and for controlling said switching means so that, a second predetermined period after said start operation, said audio signal output means produces said audio signal output based on said digital audio data currently being read out by said readout means.

2. The disc apparatus of claim 1, wherein said second predetermined period is a period of time to complete a preparatory operation, said preparatory operation including positioning a portion of said readout means with respect to said disc to read out digital audio data from said disc.

3. The disc apparatus of claim 1, wherein said readout means reads out data from said disc which includes table of contents data; and said control means controls said readout means and said memory means so that said digital audio data of said first predetermined period from said beginning of said program are read out at a point in time prior to said playback operation when said table of contents data are read out from said disc after one of said disc is located in said disc apparatus and power is supplied for energizing said disc apparatus.

4. The disc apparatus of claim 1, further comprising:

buffer memory means for storing said digital data currently being read out by said readout means; and wherein said switching means switches said digital audio data supplied to said audio signal output means between said digital audio data stored in said memory means and said digital audio data stored in said buffer memory means.

5. The disc apparatus of claim 1, wherein said audio signal output means comprises:

a digital-to-analog converter for converting said digital audio data into an analog audio signal output; and an interface for outputting said digital audio signal output.

6. The disc apparatus of claim 5, wherein said audio signal output means further comprises an expander having an input connected to said switching means and outputs connected to said digit-to-analog converter and said interface.

7. A disc apparatus comprising:

readout means for reading out data from a disc, said data including at least digital audio data;

audio signal output means for producing an audio signal output in accordance with said digital audio data;

memory means for storing said digital audio data read out from said disc by said readout means;

switching means for switching said digital audio data supplied to said audio signal output means between said digital audio data stored in said memory means and said digital audio data currently being read out by said readout means; and control means for controlling said readout means and said memory means so that, prior to a playback start operation, said digital audio data of a first predetermined period from a beginning of all programs are read out by said readout means and stored in said memory means, and for controlling said switching means so that, at a beginning of said playback start operation for a selected program, said audio signal output means produces said audio signal output based on said digital audio data for said selected program stored in said memory means, and for controlling said switching means so that, a second predetermined period after said start operation, said audio signal output means produces said audio signal output based on said digital audio data for said selected program currently being read out by said readout means.

8. A disc apparatus comprising:

readout means for reading out data from a disc, said data including at least digital audio data;

audio signal output means for producing an audio signal output in accordance with said digital audio data;

memory means for storing said digital audio data read out from said disc by said readout means;

switching means for switching said digital audio data supplied to said audio signal output means between said digital audio data stored in said memory means and said digital audio data currently being read out by said readout means; and control means for controlling said readout means and said memory means so that, prior to a playback start operation, said digital audio data of a first predetermined period from a beginning of at least one program are read out by said readout means and stored in said memory means, and for controlling said switching means so that, at a beginning of said playback start operation, said audio signal output means produces said audio signal output based on said digital audio data stored in said memory means, and for controlling said switching means so that, a second predetermined period after said start operation, said audio signal output means produces said audio signal output based on said digital audio data currently being read out by said readout means; and wherein said control means, responsive to a playback stop operation, controls said readout means and said memory means such that said digital audio data of a third predetermined period from a predetermined position on said disc are read out by said readout means and stored by said memory means.

9. The disc apparatus of claim 8, wherein said predetermined position is a position immediately prior to a position corresponding to a beginning of said playback stop operation.

10. The disc apparatus of claim 8, wherein said predetermined position is a beginning of said program being played back immediately prior to said playback stop operation.

11. The disc apparatus of claim 8, wherein said control means, responsive to a resume operation, controls said switching means so that said audio signal output means produces said audio signal output based on said digital audio data stored in said memory means responsive to said playback stop operation, and controls said switching means so that, a fourth predetermined period after said resume operation, said audio signal output means produces said audio signal output based on said digital audio data currently being read out by said readout means.

12. A disc apparatus comprising:

readout means for reading out data from a disc, said data including at least digital audio data;

audio signal output means for producing an audio signal output in accordance with said digital audio data;

memory means for storing said digital audio data read out from said disc by said readout means;

switching means for switching said digital audio data supplied to said audio signal output means between said digital audio data stored in said memory means and said digital audio data currently being read out by said readout means; and control means, responsive to a playback stop operation, for controlling said readout means and said memory means such that said digital audio data of a first predetermined period from a predetermined position on said disc are read out by said readout means and stored by said memory means, for controlling said switching means, responsive to a resume operation, so that said audio signal output means produces said audio signal output based on said digital audio data stored in said memory means, and for controlling said switching means so that, a second predetermined period after said resume operation, said audio signal output means produces said audio signal output based on said digital audio data currently being read out by said readout means.

13. The disc apparatus of claim 12, wherein said predetermined position is a position immediately prior to a position corresponding to a beginning of said playback stop operation.

14. The disc apparatus of claim 12, wherein said predetermined position is a beginning of said program being played back immediately prior to said playback stop operation.

* * * * *